(12) United States Patent
Sánchez De La Fuente et al.

(10) Patent No.: US 12,556,684 B2
(45) Date of Patent: *Feb. 17, 2026

(54) VIDEO CODING WITH GUIDED SEPARATE POST-PROCESSING STEPS

(71) Applicant: Fraunhofer-Gesellschaft zur Foerderung der angewandten Forschung e.V., Munich (DE)

(72) Inventors: Yago Sánchez De La Fuente, Berlin (DE); Benjamin Bross, Berlin (DE); Robert Skupin, Berlin (DE); Cornelius Hellge, Berlin (DE); Thomas Schierl, Berlin (DE); Thomas Wiegand, Berlin (DE); Detlev Marpe, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 143 days.

This patent is subject to a terminal disclaimer.

(21) Appl. No.: 18/615,671

(22) Filed: Mar. 25, 2024

(65) Prior Publication Data
US 2025/0119525 A1    Apr. 10, 2025

Related U.S. Application Data

(63) Continuation of application No. 18/481,800, filed on Oct. 5, 2023, now Pat. No. 11,962,765.

(51) Int. Cl.
*H04N 19/105* (2014.01)
*H04N 19/117* (2014.01)
(Continued)

(52) U.S. Cl.
CPC ......... *H04N 19/105* (2014.11); *H04N 19/117* (2014.11); *H04N 19/159* (2014.11); *H04N 19/172* (2014.11); *H04N 19/70* (2014.11)

(58) Field of Classification Search
CPC .. H04N 19/105; H04N 19/117; H04N 19/159; H04N 19/172; H04N 19/70
See application file for complete search history.

(56) References Cited

U.S. PATENT DOCUMENTS

| | | | |
|---|---|---|---|
| 11,695,965 B1 | 7/2023 | Sánchez De La Fuente et al. |
| 2022/0256194 A1 | 8/2022 | Kimura |
| 2023/0308674 A1 | 9/2023 | Hendry et al. |

OTHER PUBLICATIONS

Hannuksela, Miska, "AHG9: Indicating processing order of NNPFs and SEI messages", 30. JVET Meeting; Apr. 21, 2023-Apr. 28, 2023; Antalya; (The Joint Video Exploration Team of ISO/IEC JTC1/SC29/WG11 and ITU-T SG.16), No. JVET-AD0059; m62660; Apr. 14, 2023 (Apr. 14, 2023), XP030308646.

(Continued)

*Primary Examiner* — Joseph W Becker
(74) *Attorney, Agent, or Firm* — Perkins Coie LLP; Michael A. Glenn

(57) ABSTRACT

An apparatus for video decoding receives a video data stream having pictures of a video encoded thereinto. The video data stream comprises a plurality of access units, a plurality of SEI (supplemental enhancement information) messages and processing order information which defines a processing order of the plurality of SEI messages. The apparatus is configured to determine the processing order information to obtain information on the processing order of the plurality of SEI messages. The processing order information comprises information on an identifier for each SEI message of two or more SEI messages of the plurality of SEI messages, wherein the identifier of each SEI message of the two or more SEI messages is unique among the two or more SEI messages. The apparatus is configured to decode a current AU using inter-picture prediction from a referenced reference picture stored in the DPB to acquire a decoded picture, and to insert the decoded picture into the DPB, (Continued)

assign to each reference picture stored in the DPB a classification as one of a short-term reference picture, a long-term reference picture and an unused-for-reference picture, read DPB mode information from the current AU, if the DPB mode information indicates a first mode, remove one or more reference pictures classified as a short-term picture, according to a first-in-first-out (FIFO) strategy, from the DPB, if the DPB mode information indicates a second mode, read memory management control information comprising at least one command in the current AU and process the at least one command so as to change the classification assigned to at least one of the reference pictures stored in the DPB, and use the classification of the reference pictures in the DPB, for managing reference picture removal from the DPB.

30 Claims, 8 Drawing Sheets

(51) Int. Cl.
*H04N 19/159* (2014.01)
*H04N 19/172* (2014.01)
*H04N 19/70* (2014.01)

(56) References Cited

OTHER PUBLICATIONS

Hendry, "AHG9: On the signalling of complexity information in NNPFC SEI message", 29. JVET Meeting; Jan. 11, 2023-Jan. 20, 2023; Teleconference; (The Joint Video Exploration Team of ISO/IEC JTC1/SC29/WG11 and ITU-T SG.16), No. JVET- AC0128; m61706; Jan. 4, 2023 (Jan. 4, 2023), XP030306706.

McCarthy, S., et al., "SEI processing order SEI message in VVC (draft 5)", Joint Video Experts Team (JVET) of ITU-T SG 16 WP 3 and ISO/IEC JTC 1/SC 29; 31st meeting, Geneva, CH Jul. 11-19, 2023.

VIDEO CODING WITH GUIDED SEPARATE POST-PROCESSING STEPS

CROSS-REFERENCE TO RELATED APPLICATIONS

This application claims priority to pending U.S. patent application Ser. No. 18/481,800, filed Oct. 5, 2023, which application is incorporated herein in its entirety by this reference thereto.

TECHNICAL FIELD

The present application is concerned with video coding and guided separate post-processing steps in video coding.

BACKGROUND OF THE INVENTION

Post processing of decoded video is getting more and more important in the last years. Many processes have been lately specified and used into products, such as SDR-to-HDR reconstruction, Film Grain Synthesis or super-resolution, which are typically using metadata included into SEI messages.

As the number of SEI messages for post-processing start to proliferate, it becomes a challenge to identify which is the order of processing associated with the metadata in the SEIs that leads to the best result or the result that the content provider had intended.

When more than one SEI messages (e.g. for post-processing) need to be applied, the order of application might be important. For instance, first upsampling and then HDR-WCG or vice-versa; or first RWP and then upsampling or vice-versa; etc.

This problem has been identified and an SEI message has been defined that indicates the order (see [1]) and is explained in the following with reference to FIG. 3.

Example of such a Processing Order SEI (herein referred to PRO SEI message) can be found in the following where there is a for loop indicating an SEI type/id and associating it to a particular order. Note that the same order could be assigned (number 2) and the decoder could decide which process to run first.

| sei_processing_order( payloadSize ) { | Descriptor |
|---|---|
|   po_num_sei_messages_minus2 | u(8) |
|   for( i = 0; i < po_num_sei_messages_minus2 + 2; i++ ) { | |
|     Identify_SEI[ i ] | u(8) |
|     po_sei_processing_order[ i ] | u(8) |
|   } | |
| } | |

With that SEI message, the order would be indicated and the appearance of an SEI in the bitstream would not play any role, which could be problematic in cases such as the one discussed below.

In the example of FIG. 4, SEI 2 applies to all AUs (e.g. from IDR-AU 0-onwards) and as such it appears at the beginning of the bitstream preceding A0. SEI 1 only applies to AU2 and as such appears later in the bitstream, e.g. only preceding AU2. If the SEI order would imply a particular order SEI 2 would be processed before SEI 1 for AU2; but since the content provider might have design the processes to be performed differently, the PRO SEI indicates that SEI 1 needs to be processed before SEI 2 for AU2.

A further aspect that has been identified is that some of the processes associated to SEI messages might be only useful if other processing steps have been carried out. For instance, in the example above, applying the process associated to SEI 2 might only make sense if the process associated with SEI 1 has been carried out. As such, the PRO SEI can include the payload (full SEI message) within itself so that a particularly important SEI is only parsed if the PRO SEI is understood and otherwise not seen by the receiver, e.g. the SEI message is wrapped within the PRO SEI message. In addition, a flag can be set to indicate that if an important SEI message is not understood or cannot be processed the PRO SEI and SEI associated with it should not be processed (since some processing would be missing).

An example of the SEI payload of PRO SEI is shown in the following.

| sei_processing_order( payloadSize ) { | Descriptor |
|---|---|
|   po_num_sei_messages_minus2 | u(8) |
|   for( i = 0; i < po_num_sei_messages_minus2 + 2; i++ ) { | |
|     po_sei_wrapping_flag[ i ] => SEI message included in this SEI message | u(1) |
|     po_sei_importance_flag[ i ] ] => If SEI message not understood, the whole processing order should be ignored | u(1) |
|     if( po_sei_wrapping_flag[ i ] ) { | |
|       reserved_alignment_6bits | u(6) |
|       sei_message( ) => The wrapped SEI message | |
|     } else { | |
|       Identify_SE/[ i ] => Identification of non-wrapped SEI message (SEI type/id) | u(8) |
|     } | |
|     po_sei_processing_order[ i ] | u(8) |
|   } | |
| } | |

A further aspect that has been identified is that for a particular SEI message type, there might be complexity issues associated. For instance, for SEI messages for post-processing using a Neural Network, there might be cases where two alternative SEI messages (e.g., a complex one and a simple one, both doing super-resolution) could be provided. Both of them would be associated with a particular order and the user would pick one or another depending on their capabilities. This is illustrated in FIG. 5.

An alternative signalling to the one discussed before explicitly indicating the order would be the following.

| SEI( payloadSize ) { | Descriptor |
|---|---|
|   po_operation_mode => it distinguishes between cascading or alternative | u(3) |
|   po_num_sei_messages_minus2 | u(8) |
|   for( i = 0; i <= po_num_sei_messages_minus2 + 1; i++ ) | |
|     Identify_SE/[ i ] => Identification of associated SEI messages | ue(v) |
|   } | |
| } | |

This would indicate that the order of appearance could be the order in which the associated SEIs are to be processed if the mode is cascading, or that any of the SEIs can be played because they are alternatives to each other. Also, it could be signaled that all need to be processed to each generate a different version of the content, e.g. having as many outputs as different processing are described.

However, it would be appreciated, if improved concepts for guided separate post-processing steps in video coding would be provided.

SUMMARY

It is, accordingly, the object of the present invention to provide improved concepts for guided separate post-processing steps in video coding.

An apparatus for video decoding according to an embodiment is provided. The apparatus is configured to receive a video data stream having pictures of a video encoded thereinto. The video data stream comprises a plurality of access units (AU), a plurality of SEI (supplemental enhancement information) messages and processing order information which defines a processing order of the plurality of SEI messages. The apparatus is configured to determine the processing order information to obtain information on the processing order of the plurality of SEI messages.

Moreover, a method for video decoding according to an embodiment is provided. The method comprises receiving a video data stream having pictures of a video encoded thereinto. The video data stream comprises a plurality of access units (AU), a plurality of SEI (supplemental enhancement information) messages and processing order information which defines a processing order of the plurality of SEI messages. The method comprises determining the processing order information to obtain information on the processing order of the plurality of SEI messages.

According to an embodiment, the processing order information defines one or more subsets of SEI messages, wherein each of the one or more subsets comprises one or more SEI messages of the plurality of SEI messages. The apparatus is configured to/the method comprises to process the plurality of SEI messages depending on the information on the one or more subsets defined by the processing order information.

In an embodiment, the processing order information comprises information on an identifier (po_SEI_id[i]) for each SEI message of one or more SEI messages of the plurality of SEI messages, wherein the identifier of each SEI message of the one or more SEI messages is unique among the one or more SEI messages. The one or more SEI messages may, e.g., be two or more SEI messages.

According to an embodiment, the processing order information comprises an indicator (po_sei_prefix_flag[i]) indicating whether an associated SEI message of the plurality of SEI messages is identified by a portion of bytes or by a portion of bits of the associated SEI message, or whether the plurality of SEI messages is identified by another unique identifier, wherein the apparatus is configured to/the method comprises to analyze said indicator.

In an embodiment, the processing order information comprises subset information indicating a subset of bytes or a subset of bits of an SEI message of the plurality of SEI messages. The processing order information comprises portion information which portions of the subset of bytes or of the subset of bits are used to identify the SEI message. The apparatus is configured to/the method comprises to analyze the subset information and the portion information.

According to an embodiment, the processing order information comprises an identifier identifying another processing order information for referencing the other processing order information (e.g., such that said processing order information inherits said other processing order information, or, e.g., such that said other processing order information inherits said processing order information). The apparatus is configured to/the method comprises to determine from the processing order information the identifier identifying the other processing order information.

In an embodiment, the processing order information assigns the processing order to said SEI message of the plurality of SEI messages by indicating that the processing order of the SEI message is equal to the processing order of a previously indicated SEI message, or by indicating that the processing order of the SEI message is one value higher than the processing order of the previously indicated SEI message, or by indicating that the processing order of the SEI message is equal to the processing order of the previously indicated SEI message and only one of both SEI messages needs to be processed; wherein the apparatus is configured to/the method comprises to determine from the processing order information the processing order of said SEI message.

According to an embodiment, the processing order information comprises complexity information on a complexity of processing one or more SEI messages of the plurality of SEI messages, wherein the apparatus is configured to/the method comprises to determine the information on the complexity of processing the one or more SEI messages from the processing order information.

In an embodiment, the processing order information comprises additional processing information indicating if additional processing shall be processed before, between or after processing one or more SEI messages of the plurality of SEI messages or as an alternative to processing at least one SEI message of the plurality of SEI messages. The apparatus is configured to/the method comprises to process additional processing depending on the additional processing information.

According to an embodiment, the processing order information comprises information on a group of filters (e.g., NNPFs) or comprises one or more references to the information on the group of filters, wherein the apparatus is configured to/the method comprises to apply one or more or all of the group of filters using the information on the group of filters.

In an embodiment, the apparatus is configured to/the method comprises to decode a current AU using inter-picture prediction from a referenced reference picture stored in the DPB to acquire a decoded picture, and to insert the decoded picture into the DPB, assign to each reference picture stored in the DPB a classification as one of a short-term reference picture, a long-term reference picture and an unused-for-reference picture, read DPB mode information from the current AU, if the DPB mode information indicates a first mode, remove one or more reference pictures classified as a short-term picture, according to a first-in-first-out (FIFO) strategy, from the DPB, if the DPB mode information indicates a second mode, read memory management control information comprising at least one command in the current AU and process the at least one command so as to change the classification assigned to at least one of the reference pictures stored in the DPB, and use the classification of the reference pictures in the DPB, for managing reference picture removal from the DPB.

Moreover, an apparatus for video encoding, to encode a video into a video data stream, according to an embodiment is provided. The apparatus for video encoding is configured to encode pictures of a video into a video data stream in a coding order as a sequence of access units (AU). The apparatus for video encoding is configured to generate the video data stream, such that the video data stream comprises a plurality of access units (AU), a plurality of SEI (supplemental enhancement information) messages and processing order information which defines a processing order of the plurality of SEI messages.

Furthermore, a method for video encoding, to encode a video into a video data stream, according to an embodiment is provided. The method comprises encoding pictures of a video into a video data stream in a coding order as a sequence of access units (AU). Moreover, the method comprises generating the video data stream, such that the video data stream comprises a plurality of access units (AU), a plurality of SEI (supplemental enhancement information) messages and processing order information which defines a processing order of the plurality of SEI messages.

Furthermore, a video data stream, having pictures of a video encoded thereinto, is provided. The video data stream comprises an encoding of pictures of a video in a coding order as a sequence of access units (AU). The video data stream comprises a plurality of access units (AU), a plurality of SEI (supplemental enhancement information) messages and processing order information which defines a processing order of the plurality of SEI messages, According to an embodiment, the processing order information defines one or more subsets of SEI messages, wherein each of the one or more subsets comprises one or more SEI messages of the plurality of SEI messages.

In an embodiment, the processing order information comprises information on an identifier (po_SEI_id[i]) for each SEI message of one or more SEI messages of the plurality of SEI messages, wherein the identifier of each SEI message of the one or more SEI messages is unique among the one or more SEI messages. The one or more SEI messages may, e.g., be two or more SEI messages.

According to an embodiment, the processing order information comprises an indicator (po_sei_prefix_flag[i]) indicating whether an associated SEI message of the plurality of SEI messages is identified by a portion of bytes or by a portion of bits of the associated SEI message, or whether the plurality of SEI messages is identified by another unique identifier.

In an embodiment, the processing order information comprises subset information indicating a subset of bytes or a subset of bits of an SEI message of the plurality of SEI messages, wherein the processing order information comprises portion information which portions of the subset of bytes or of the subset of bits are used to identify the SEI message.

According to an embodiment, the processing order information comprises an identifier identifying another processing order information for referencing the other processing order information (e.g., such that said processing order information inherits said other processing order information, or, e.g., such that said other processing order information inherits said processing order information).

In an embodiment, the processing order information assigns the processing order to said SEI message of the plurality of SEI messages by indicating that the processing order of the SEI message is equal to the processing order of a previously indicated SEI message, or by indicating that the processing order of the SEI message is one value higher than the processing order of the previously indicated SEI message, or by indicating that the processing order of the SEI message is equal to the processing order of the previously indicated SEI message and only one of both SEI messages needs to be processed.

According to an embodiment, the processing order information comprises complexity information on a complexity of processing one or more SEI messages of the plurality of SEI messages.

In an embodiment, the processing order information comprises additional processing information indicating if additional processing shall be processed before, between or after processing one or more SEI messages of the plurality of SEI messages or as an alternative to processing at least one SEI message of the plurality of SEI messages.

According to an embodiment, the processing order information comprises information on a group of filters (e.g., NNPFs) or comprises one or more references to the information on the group of filters.

In an embodiment, in encoding the AUs, the apparatus for video encoding is configured for/the video is encoded into the video data stream by: encoding a current picture using inter-picture prediction from a referenced reference picture stored in a DPB into a current AU, and inserting a decoded version of the current picture in the DPB into the DPB, assigning to each reference picture stored in the DPB a classification as one of a short-term reference picture, a long-term reference picture and an unused-for-reference picture, writing DPB mode information into the current AU, if the DPB mode information indicates a first mode, removing one or more reference pictures classified as a short-term picture, according to a FIFO strategy, from the DPB, if the DPB mode information indicates a second mode, writing memory management control information comprising at least one command into the current AU, the command being instructive to change the classification assigned to at least one of the reference pictures stored in the DPB, wherein the classification of the reference pictures in the DPB, is used for managing reference picture removal from the DPB.

Moreover, a non-transitory computer readable medium comprising the video data stream as described above is provided.

Furthermore, a computer program for implementing one of the methods described above is provided. Moreover, a non-transitory computer-readable medium comprising the computer program is provided.

Moreover, a system is provided comprising the apparatus for video encoding according to one of the above-described embodiments and the apparatus for video decoding according to one of the above-described embodiments is provided.

BRIEF DESCRIPTION OF THE DRAWINGS

Embodiments of the present application are described below with respect to the figures among which.

DETAILED DESCRIPTION OF THE INVENTION

Before resuming the description of the introductory portion of the specification and illustrating the issues involved with the wish of providing of high flexibility, preliminary, examples for a video codec are provided into which the subsequently described embodiments could be built. It should be noted, however, that these examples for a video codec should not be treated as limiting the subsequently explained embodiments of the present application.

Figure 1:
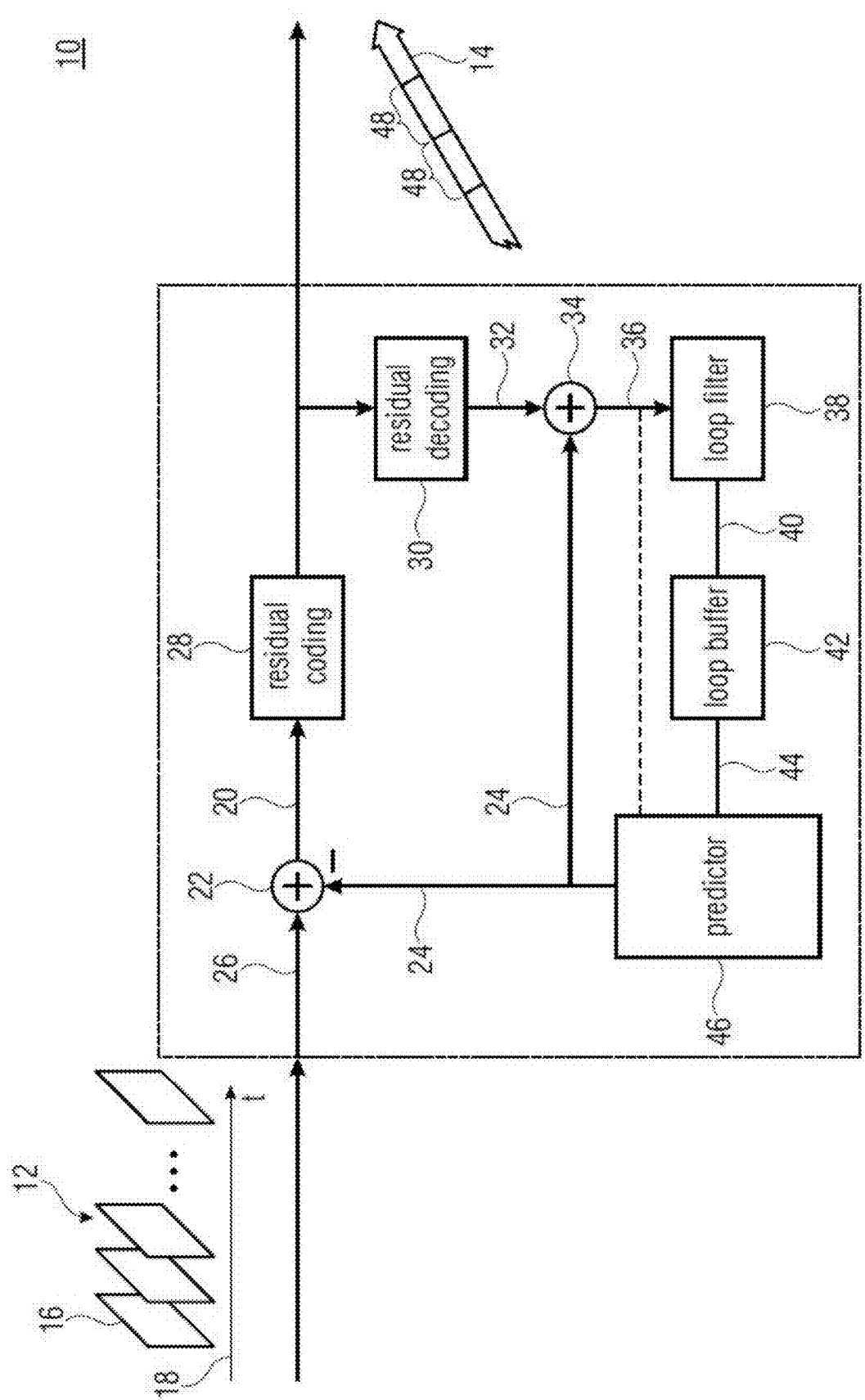
FIG. 1 illustrates a block diagram of a possible implementation of an encoder according to which embodiments of the present application might be implemented.

FIG. 1 illustrates an encoder 10 configured to encode a video 12 into a bitstream 14. The encoder 10 encodes pictures 16 of video 12 into bitstream 14 using a picture coding order which may differ from a presentation time order 18 at which pictures 16 are sequentially presented or output when presenting video 12. FIG. 1 also shows a possible implementation of encoder 10, but it is again noted that the details set out with respect to FIG. 1 are not limiting the embodiments of the present application described in more detail below. Although subsequently applied, the encoding of encoder 10 may not involve intra prediction, may not involve inter-prediction, may not operate blockwise, may not use transform residual coding, may operate lossy or lossfree or combinations thereof.

Encoder 10 of FIG. 1 performs the encoding by use of prediction. In a block-wise manner, encoder 10 predicts a current picture, or more precisely, a currently encoded portion of this picture, and forms a prediction residual 20 by subtracting at a subtractor 22 a prediction signal 24 from the original version of the current picture 26. A residual coder 28 then encodes the prediction residual 20 into bitstream 14, wherein the residual coding may be lossy and may, for instance, involve subjecting the residual signal 20 to a transformation into a transform domain and entropy coding of the transform coefficients resulting from the transformation. In order to obtain the prediction signal 24 on the basis of the reconstructable version of the already encoded portions of video 12, a residual decoder 30 reverses the residual coding and yields from the transform coefficients, by reverse transformation, a residual signal 32 which differs from residual signal 20 by the loss introduced by residual coder 28. In order to reconstruct the current picture or, to be more precise, a currently encoded block of the current picture, the residual signal 32 is added to prediction signal 24 by an adder 34 so as to yield a reconstructed signal 36. Optionally, a loop filter 38 subjects the reconstructed signal 38 to some loop filtering and the filtered signal 40 is entered into a loop buffer 42. The loop buffer 42 buffers, accordingly, reconstructed versions of already coded pictures and reconstructed portions of the current picture, respectively. Based on these reconstructed versions 44 and, optionally, based on an unfiltered reconstructed version 36 of the already coded portions of the current picture, a prediction stage 46 determines the prediction signal 24.

The encoder 10 performs many coding decisions using rate distortion optimization. For instance, predictor 46 selects one of several coding modes including, for instance, one or more inter-prediction modes and one or more intra-predication modes and, optionally, combinations thereof at a granularity of coding blocks. At a granularity of these coding blocks or, alternatively, at a granularity of prediction blocks into which these coding blocks are further sub-divided, predictor 46 determines prediction parameters fitting to the selected prediction mode such as one or more motion vectors for inter-predicted blocks, or intra prediction modes for intra-predicted blocks. The residual coder 28 performs the residual coding at a granularity of residual blocks which, optionally, may coincide with any of the coding blocks or prediction blocks, or may be a further subdivision of any of the these blocks or may result from another, independent subdivision of the current picture into the residual blocks. Even the aforementioned subdivision is determined by encoder 10. These coding decisions, e.g. subdivision information, prediction modes, prediction parameters and residual data, is coded by encoder 10 into bitstream 14 using, for instance, entropy coding.

Each picture 16 is encoded by encoder 10 into a contiguous portion 48 of bitstream 14, called access unit. Thus, the sequence of access units 48 in bitstream 14 has the pictures 16 sequentially encoded thereinto, namely along the aforementioned picture coding order.

Figure 2:
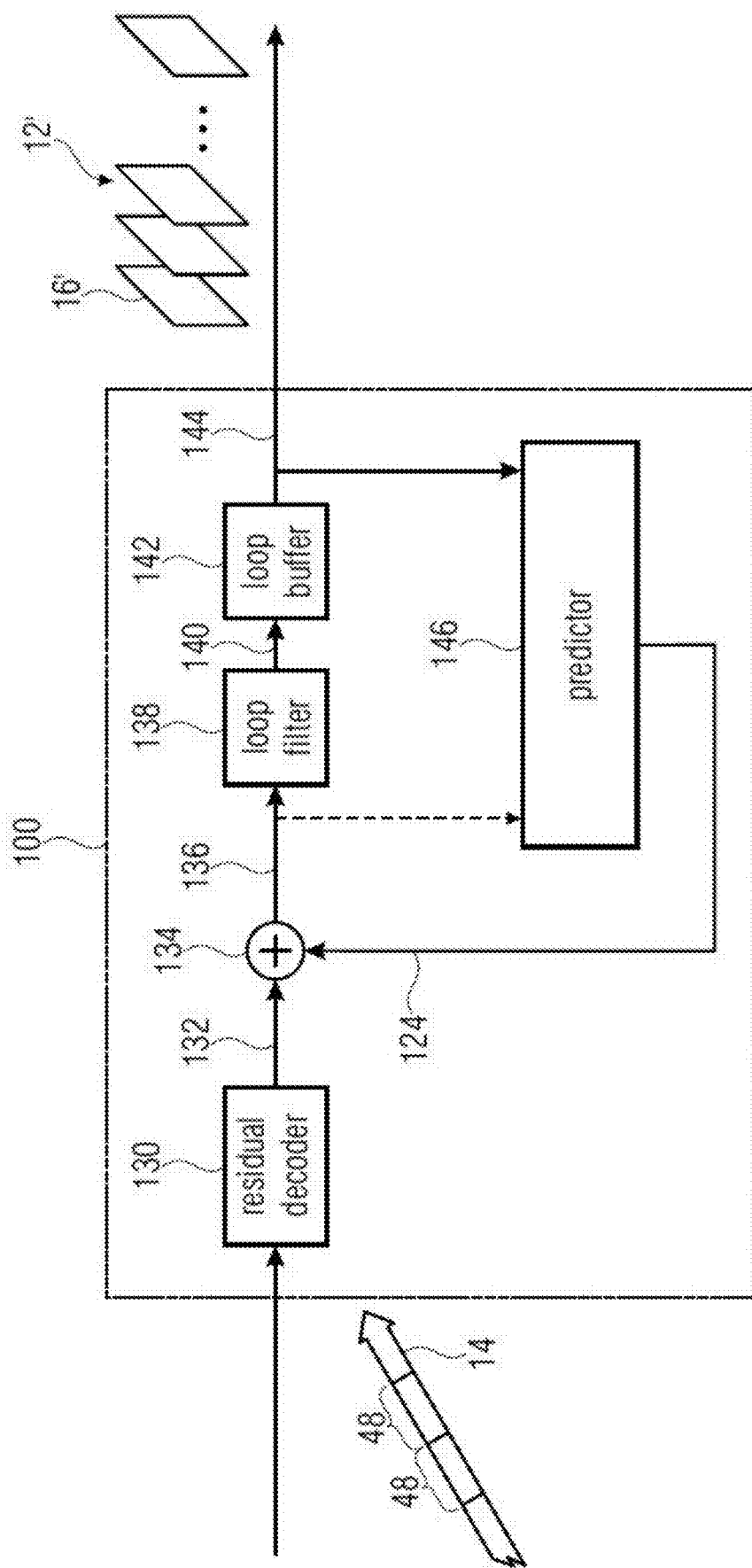
FIG. 2 illustrates a block diagram of a possible implementation of a decoder according to which embodiments of the present application might be implemented, and the decoder fitting to the encoder of FIG. 1.
Figure 3:
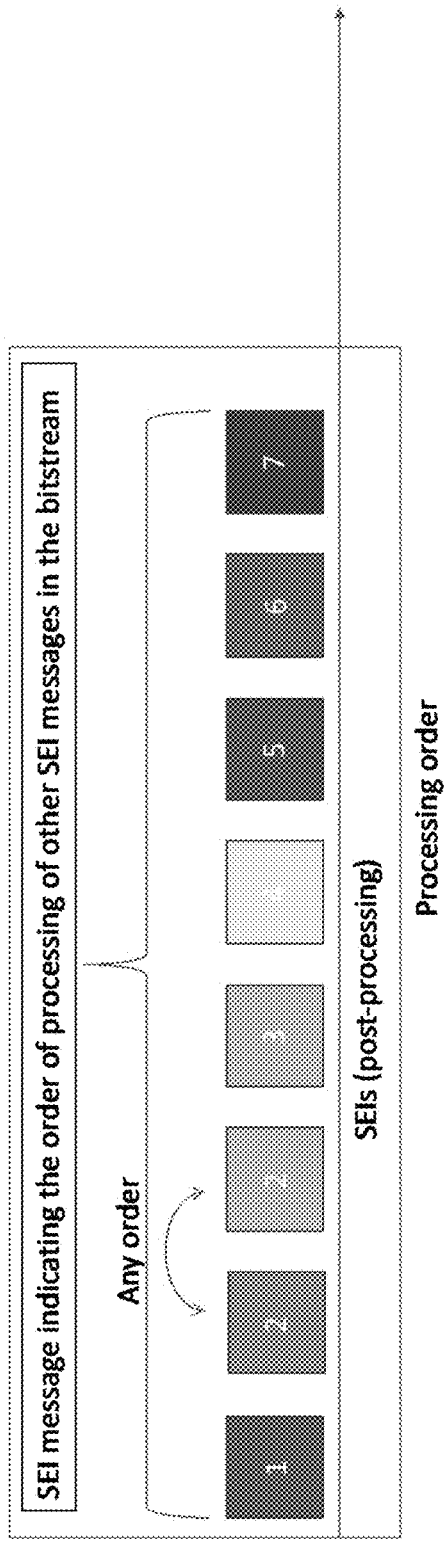
FIG. 3 illustrates an order of processing as indicated by an SEI message, wherein the order of processing indicates an order of processing of other SEI messages in a bitstream according to a first example.
Figure 4:
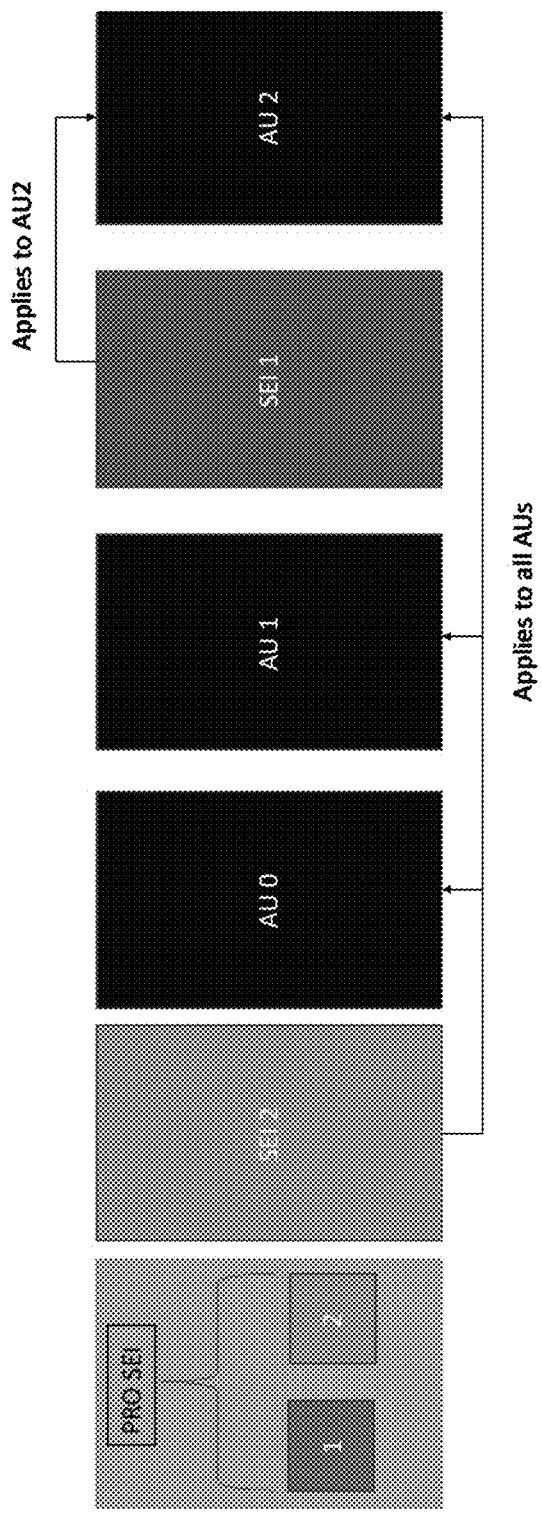
FIG. 4 illustrates an applicability of SEI messages for subsequent access units as defined by a PRO SEI.
Figure 5:
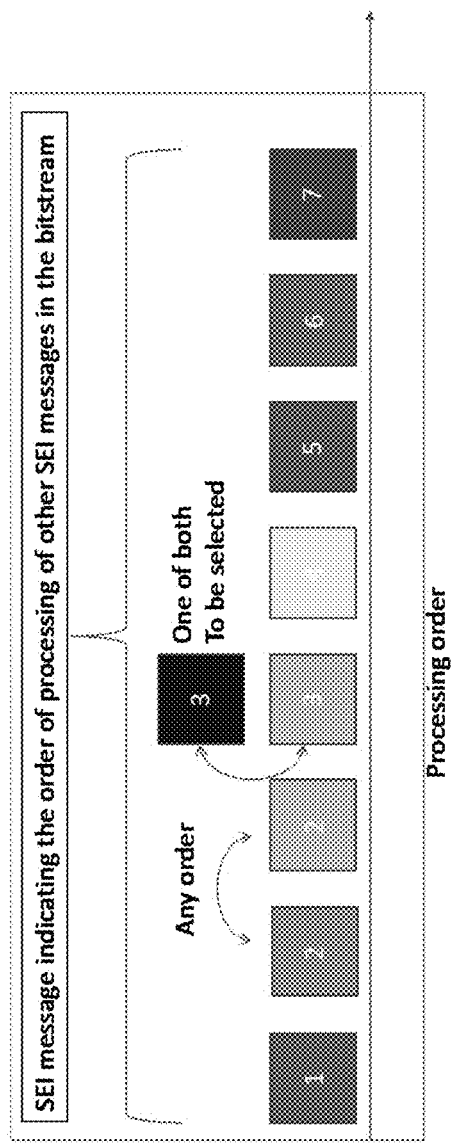
FIG. 5 illustrates an order of processing as indicated by an SEI message, wherein the order of processing indicates an order of processing of other SEI messages in a bitstream according to a second example.
Figure 6:
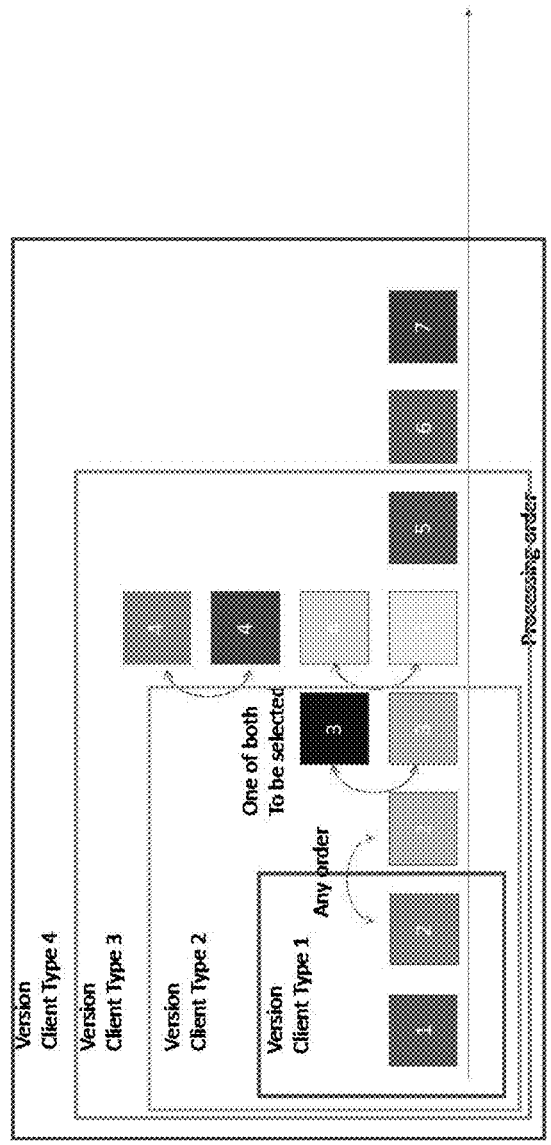
FIG. 6 illustrates wrapping of processing order SEI messages according to an embodiment.

FIG. 2 illustrates a decoder 100 fitting to the encoder 10 of FIG. 1. The decoder 100 decodes from bitstream 14 a reconstructed version 12' of the video 12 of FIG. 1 by decoding, from each access unit 48, the corresponding picture 16' of video 12'. To this end, decoder 100 is internally construed like the reconstruction part of the prediction loop of encoder 10 of FIG. 1. That is, decoder 100 comprises a residual decoder 130 which reconstructs the residual signal 32 from bitstream 14. The prediction signal 124 is added to this residual signal 132 at adder 134 to yield the reconstructed signal 136. The optional loop filter 138 filters the reconstructed signal 136 to yield the filtered reconstructed signal 140 which is then buffered in loop buffer 142. From this buffer, the buffered and filtered reconstructed signal 144 is output by decoder 100, e.g., the buffered and reconstructed signal contains the reconstructed pictures 16' and from the buffer 142 these pictures 16' are output in presentation time order. Further, the predictor or prediction unit 146 performs the prediction based on signal 144 and, optionally, reconstructed signal 136 to yield the prediction signal 124. The decoder obtains all necessary information for decoding and determined by encoder 10 using rate/distortion optimization from bitstream 14 such as the subdivision information, prediction mode decision, prediction parameters and residual data such as using entropy decoding. The residual data may comprise, as discussed above, transform coefficients.

In the following, particular embodiments are described.

According to a first group of embodiments, wrapping makes the PRO SEI message robust against processing an SEI message alone when not intended for it. But it makes the PRO SEI message big. There are cases where different options are desirable for different Client capabilities. Multiple PRO SEIs as alternative generate a big overhead.

Figure 8:
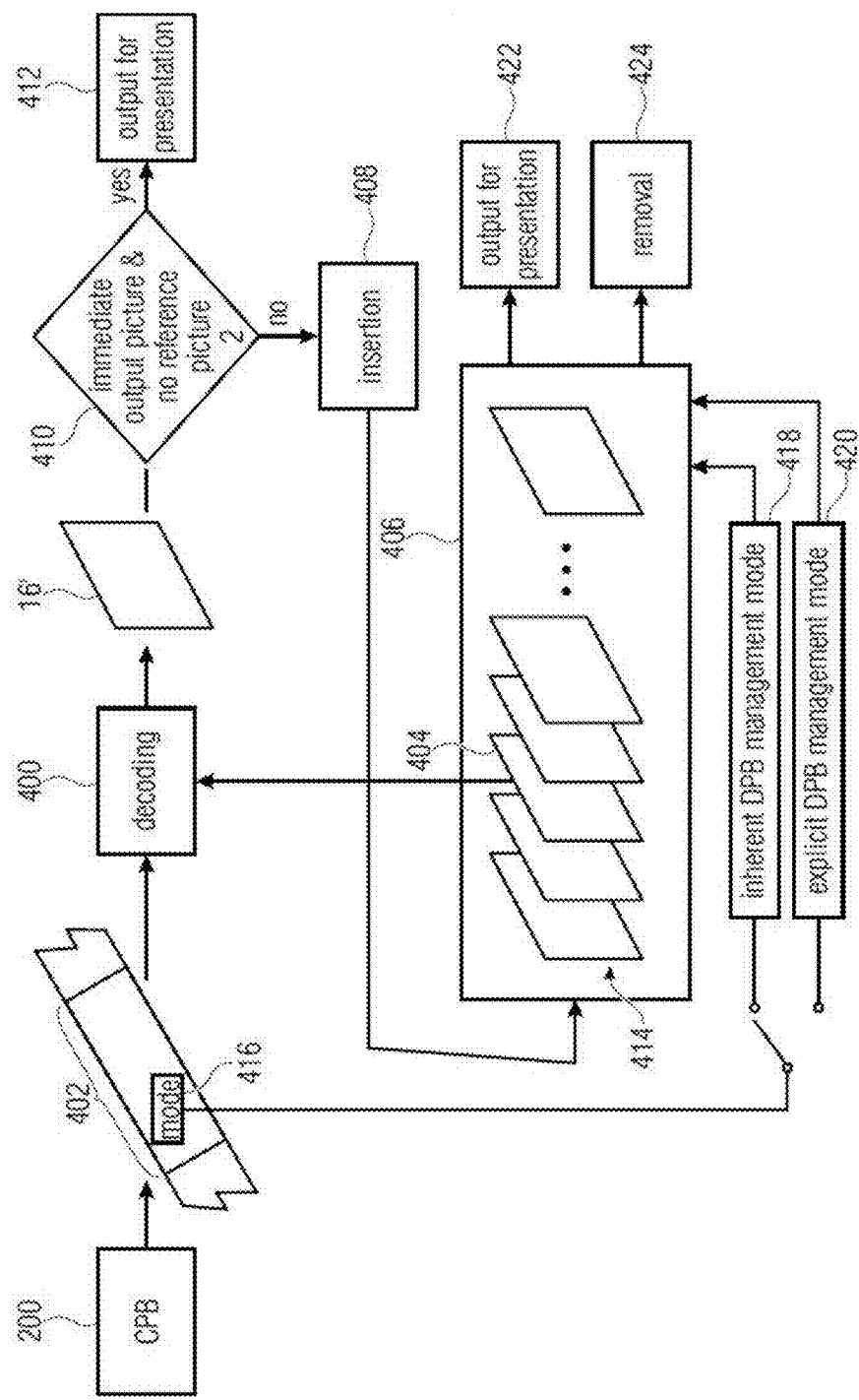
FIG. 8 illustrates a schematic diagram of an example of a mode of operation for managing a DPB.

For instance, as shown in FIG. 8 the SEI message to be processed as second would be present in 4 different PRO SEI messages if those are offered as options for 4 different client types as separate PRO SEI messages. If such an SEI message (the second SEI message in those PRO SEI messages) was wrapped and big in size, the overhead would be too big.

As a first embodiment, valid subsets are defined that are considered as an acceptable subset of processing steps defined within the PRO SEI message.

An example of syntax is shown in the following.

| sei_processing_order( payloadSize ) { | Descriptor |
|---|---|
|   po_num_sei_messages_minus2 | u(8) |
|   for( i = 0; i < po_num_sei_messages_minus2 + 2; i++) { | |
|     po_sei_wrapping_flag[ i ] => SEI message included in this SEI message | u(1) |
|     po_sei_importance_flag[ i ] ] => If SEI message not understood, the processing order depending on the subsets as described below should be ignored | u(1) |
|     po_end_of_subset_flag[ i ] => When 1 it defines a new subset of valid SEI processing steps | u(1) |
|     if( po_sei_wrapping_flag[ i ] ) { | |
|       reserved_alignment_5bits | u(5) |
|       sei_message( ) => The wrapped SEI message | |
|     } else { | |
|       Identify_SE/[ i ] => Identification of non-wrapped SEI message (SEI type/id) | u(8) |
|     } | |
|     po_sei_processing_order[ i ] | u(8) |
|   } | |
| } | | po_end_of_subset_flag[i] indicates that the i-th indicated SEI message is the last SEI message of a valid processing subset of SEI messages.

The assignment of the i-th SEI message to subsets (poSeiSubsetMapping[i]) is done as follows:

```
poSubsetId=0
poSubsetNumMinus1=0;
for ( i = 0; i < po_num_sei_messages_minus2 + 2; i++) {
    poSeiSubsetMapping[ i ] = poSubsetId
    if(po_end_of_subset_flag[ i ]==1)
        poSubsetId +=1
}
``` po_sei_importance_flag[i] indicates the degree of importance determined by the encoder for the SEI message with index i.

If the decoding system cannot interpret or does not support any indicated SEI message that has po_sei_importance_flag[i] equal to 1, it should ignore the processing subset of SEI messages that the i-th SEI message belongs to (with optionally also ignoring any following subset) or the entire SEI processing order SEI message.

When not all processing subsets are ignored, the decoding system may follow the processing order of the SEI messages associated with the SEI processing order SEI message up to the latest non-ignored processing subset, Note that the same could apply if the SEI message is understood but not present in the bitstream, e.g. the ignoring of the PRO SEI message described for the case that the receiver/decoder does not understand an associated SEI message that is included into the PRO SEI message could also apply when the decoder/receiver understands such an associated SEI message but this is not present in the bitstream.

Or alternatively to the end of subset flag,

| sei_processing_order( payloadSize ) { | Descriptor |
|---|---|
|   po_num_subset_minus2 | u(8) |
|   numSEI =0 | |
|   for( i = 0; i < po_num_subset_minus2 + 2; i++) { | |
|     po_num_sei_messages_minus2[ i ] | u(8) |
|     for( j = 0; j < po_num_sei_messages_minus2[ i ] + 2; j++) { | |
|       po_sei_wrapping_flag[ numSEI] => SEI message included in this SEI message | u(1) |
|       po_sei_importance_flag[ numSEI] ] => If SEI message not understood, the processing order depending on the subsets as described below should be ignored | u(1) |
|       if( po_sei_wrapping_flag[ numSEI] ) { | |
|         reserved_alignment_5bits | u(5) |
|         sei_message( ) => The wrapped SEI message | |
|       } else { | |
|         Identify_SE/[ numSEI ] => Identification of non-wrapped SEI message (SEI type/id) | u(8) |
|       } | |
|       po_sei_processing_order[ numSEI ] | u(8) |
|     } | |
|     numSEI +=1 | |
|   } | |
| } | |

The same as before applies with the difference that the number of subsets is explicitly signalled and the number of SEI messages per subset is indicated.

As a further part of the embodiment different options on how to treat subsets can be considered:
1) Subsets in order of appearance are important (assuming at least one importance flag is present). For instance if there are three subsets A, B and C (in order of appearance). The decoder can select to do the processing associated with A, with A+B or A+B+C. (No A+C)
2) An indication is added as how to treat the subsets, e.g., po_depend_on_prev_subsets.

An alternative solution of the embodiment to solve the described problem is specified in the following.

A different standalone SEI message is used to wrap SEI messages that should only be processed if the PRO SEI message is understood. Hereafter, such an SEI message is referred to as Processing Order Wrapper (POW) SEI message. In order to allow a compact referencing to such an SEI message from the PRO SEI message and a unique Id.

| sei_processing_order_wrapper( payloadSize ) { | Descriptor |
|---|---|
| pow_id | ue(v) |
| sei_message( ) => The wrapped SEI message | |
| } | |

With such a construct the PRO SEI message can be simplified to refer only to IDs. In order to be able to reference also SEI message that already have an ID the PRO SEI would need to include a type associate to the ID as follows.

| sei_processing_order( payloadSize ) { | Descriptor |
|---|---|
| po_num_sei_messages_minus2 | u(8) |
| for( i = 0; i < po_num_sei_messages_minus2 + 2; i++) { | |
| po_sei_importance_flag[ i ] => If SEI message not understood, the whole processing order should be ignored. Same if the SEI message is not found (in the bitstream) | u(1) |
| po_sei_type[ i ] => it indicates to which SEI message the ID refers to | ue(v) |
| po_sei_id[ i ] => it indicates the ID of SEI message with type po_sei_type[ i ] that is associated to the PRO SEI with the order indicated in the following | ue(v) |
| po_sei_processing_order[ i ] => it indicates the order of the associated SEI message | u(8) |
| } | |
| } | |

A further aspect of this embodiment is that some of the wrapped SEI messages might have already an Id. In such a case the POW SEI could contain a gating flag (e.g., pow_id_present_flag or a reserved value of for instance 0) indicating whether the Id is to be used or not (e.g., the wrapped SEI message has already an ID). If the POW SEI does not have an ID, the PRO SEI could have, in addition po_sei_type flag indicating that the id is to be found in the POW SEI message, an additional flag indicating whether the Id is found in the POW SEI itself at the beginning or in the payload of the SEI message wrapped in the POW SEI message (e.g., pow_id_in_wrapped_Sei_flag).

The described approach would allow to even refer to a PRO SEI message Id, concatenating groups of SEIs so that a more compact representation is done (e.g., no need of repeating a set of id-s since they are covered already in another PRO SEI message with a particular Id).

As a further aspect, the PRO SEI could have a gating flag that indicates whether the po_sei_type is the same for all associated SEI messages in the loop or not, and if so, a single value for po_sei_type could be indicated. An example is shown in the following:

| sei_processing_order( payloadSize ) { | Descriptor |
|---|---|
| po_num_sei_messages_minus2 | u(8) |
| po_single_sei_type_flag | u(1) |
| if( po_single_sei_type_flag) { | |
| po_general_sei_type | ue(v) |
| for( i = 0; i < po_num_sei_messages_minus2 + 2; i++) { | |
| po_sei_importance_flag[ i ] => If SEI message not understood, the whole processing order should be ignored. Same if the SEI message is not found (in the bitstream) | u(1) |
| if( po_single_sei_type_flag == 0) | |

-continued

| sei_processing_order( payloadSize ) { | Descriptor |
|---|---|
|     po_sei_type[ i ] => it indicates to which SEI message the ID refers to | ue(v) |
|     po_sei_id[ i ] => it indicates the ID of SEI message with type po_sei_type[ i ] that is associated to the PRO SEI with the order indicated in the following | ue(v) |
|     po_sei_processing_order[ i ] => it indicates the order of the associated SEI message | u(8) |
|     } |  |
| } |  |

When po_single_sei_type_flag is equal to 1, then a po_general_sei_type is indicated and no po_sei_type[i] is indicated which is inferred equal to po_general_sei_type for each value of i. Otherwise, when po_single_sei_type_flag is equal to 0, a po_general_sei_type is not indicated and po_sei_type[i] is directly indicated in the PRO SEI message.

As a further aspect, a POW SEI message could wrap more than one SEI message if they had to be processed together indicating already a particular order, e.g. the decoding order into which they appear in the bitstream (wrapped within the POW SEI message).

Note that the subsets defined in the embodiment can be also combined with the invention regarding referencing only by Id-s using the POW SEI message functionality and Id referencing that has been described.

Note also that in some cases some SEI message might not have an Id and wrapping them would be undesirable as it would be hidden from decoders/receivers that do not process SEI messages following the PRO SEI message. Existing solutions add a subset of the SEI message (prefix that needs to be matched) in order to identify the associated SEI message as follows:

| sei_processing_order( payloadSize ) { | Descriptor |
|---|---|
|     po_num_sei_messages_minus2 | u(8) |
|     for( i = 0; i < po_num_sei_messages_minus2 + 2; i++) { |  |
|         ... | u(1) |
|         po_sei_prefix_flag[ i ] => a bit of payload of an SEI message included here | u(1) |
|         po_sei_payload_type[ i ] | u(13) |
|         if( po_sei_prefix_flag[ i ]) { |  |
|             po_num_prefix_bytes[ i ] | b(8) |

-continued

| sei_processing_order( payloadSize ) { | Descriptor |
|---|---|
|         for( j = 0; j < po_num_prefix_bytes[ i ]; j++ ) |  |
|             po_prefix_byte[ i ][ j ] | b(8) |
|         } |  |
|     } |  |
|     po_sei_processing_order[ i ] | u(8) |
|     } |  |
| } |  |

A further alternative would be that the POW SEI assigns an Id either when an SEI message is included within it or to the following SEI message. An instantiation of this aspect is shown in the following.

| sei_processing_order_wrapper( payloadSize ) { | Descriptor |
|---|---|
|     pow_id | ue(v) |
|     pow_included | u(1) |
|     if( pow_included ) |  |
|         sei_message( ) => The wrapped SEI message |  |
| } |  | pow_included equal to 1 means that the ID corresponds to the SEI message within the payload of the POW SEI message that follows the flag. pow_included equal to 0 means that the ID corresponds to the SEI message that directly follows the POW SEI message.

A sensible requirement for the case that pow_included is equal to 0 could be that the following SEI message to the POW SEI message to which the ID corresponds is contained within the same NAL unit as the POW SEI message and there is no SEI message in between.

As an instantiation of the described aspect, the PRO SEI message could be reused with the specific case of the PRO SEI message having only one associated SEI message. This is shown in the following:

| sei_processing_order( payloadSize ) { | Descriptor |
|---|---|
|     po_id | u(8) |
|     po_num_sei_messages_minus1 | u(8) |
|     for( i = 0, i < po_num_sei_messages_minus1 + 1; i++) { |  |
|         if( po_num_sei_messages_minus1 > 0) { |  |
|             po_sei_wrapping_flag[ i ] | u(1) |
|             po_sei_importance_flag[ i ] | u(1) |
|             if( po_sei_wrapping_flag[ i ] ) |  |
|                 reserved_alignment_6bits | u(6) |
|         } |  |
|         if( po_sei_wrapping_flag[ i ] ) |  |
|             sei_message( ) |  |
|         } else { |  |
|             po_sei_association_idc[ i ] | u(2) |
|             po_sei_payload_type[ i ] | u(12) |
|             if( po_sei_association_idc[ i ] == 1) |  |

| sei_processing_order( payloadSize ) { | Descriptor |
|---|---|
|     po_sei_payload_id[ i ] | u(8) |
|    if( po_sei_association_idc[ i ] = = 2) { | |
|     po_num_prefix_bytes_minus1[ i ] | b(7) |
|     po_all_prefix_bytes used for_association_flag[ i ] | u(1) |
|     if( po_all_prefix_bytes_used_for_association_flag[ i ]) | |
|       po_prefix_association_length_minus1[ i ] | u(16) |
|     for( j = 0; j < po_num_prefix_bytes_minus1[ i ] + 1; j++ ) | |
|       po_prefix byte[ i ][ j ] | b(8) |
|     } | |
|    } | |
|   if( po_num_sei_messages_minus1 > 0) | |
|     po_sei_processing_order[ i ] | u(8) |
|  } | |
| } | | po_num_sei_messages_minus1 plus 1 indicates the number of SEI messages that have a processing order indicated in the SEI processing order SEI message.

po_sei_importance_flag[i] indicates the degree of importance determined by the encoder for the SEI message with index i. When the po_sei_payload_type[i] is equal to the payload type of the SEI processing order SEI message, and the associated SEI processing order SEI message has po_num_sei_messages_minus1 equal to 0, po_sei_importance_flag[i] indicates the degree of importance determined by the encoder for the SEI message in sei_message( ) of the associated SEI processing order SEI message.

If the decoding system cannot interpret or does not support any indicated SEI message that has po_sei_importance_flag[i] equal to 1, it should ignore the entire SEI processing order SEI message.

When the po_sei_payload_type[i] is equal to the payload type of the SEI processing order SEI message, and the associated SEI processing order SEI message has po_num_sei_messages_minus1 greater than 0, po_sei_importance_flag[i] shall be equal to 1 if there is at least one SEI message j in the associated SEI processing order SEI message that has po_sei_importance_flag[j] equal to 1. Otherwise, when the po_sei_payload_type[i] is equal to the payload type of the SEI processing order SEI message and the associated SEI processing order SEI message has po_num_sei_messages_minus1 greater than 0, po_sei_importance_flag[i] shall be equal to 0. Otherwise, when the po_sei_payload_type[i] is equal to the payload type of the SEI processing order SEI message and the associated SEI processing order SEI message has po_num_sei_messages_minus1 is equal to 0, po_sei_importance_flag[i] indicates the degree of importance determined by the encoder for the SEI message in sei_message ( ) of the associated SEI processing order SEI message.

If po_sei_wrapping_flag[i] is equal to 0, an SEI message should be present outside of the SEI processing order SEI message with payloadType equal to po_sei_payload_type[i]. When not present, the value of po_sei_wrapping_flag[i] is inferred to be equal to 1. However, if po_sei_wrapping_flag[i] is equal to 0 and no SEI message is present with payloadType equal to po_sei_payload_type[i], the following applies:

If po_sei_importance_flag[i] is equal to 1, the decoder should ignore the entire SEI processing order SEI message.

Otherwise, the decoder should ignore all data associated with the loop variable value of i.

NOTE—po_sei_wrapping_flag[i] equal to 1 enables SEI messages to be carried within the SEI processing order SEI message to prevent such SEI messages from being incorrectly interpreted by decoders that do not process the SEI processing order SEI message. Thus, po_sei_wrapping_flag[i] equal to 1 is intended to be used when po_sei_wrapping_flag[i] equal to 0 can lead to unintended results being produced by such decoders.

In some cases, it could be beneficial to have both Id referencing and prefix information. The solution using the prefix allows for including part of the payload of a particular SEI message that allows for a decoder/receiver to understand specific characteristics of an SEI message and as such determine whether it is capable of processing such an SEI message. For instance, in the case of a Neural Network Post Filter SEI message, the complexity information such as number of operations/multiplications would be provided. Therefore, a flag indicating whether the referencing is done using an ID or the prefix solution needs to be included into the PRO SEI message. An example is shown in the following.

| sei_processing_order( payloadSize ) { | Descriptor |
|---|---|
|   po_num_sei_messages_minus2 | u(8) |
|   for( i = 0; i < po_num_sei_messages_minus2 + 2; i++) { | |
|     . . . | u(1) |
|     po_sei_prefix_flag[ i ] => a bit of payload of an SEI message included here | u(1) |
|     po_sei_payload_type[ i ] | u(13) |
|     if ( po_sei_prefix_flag[ i ]) { | |
|       po_num_prefix_bytes[ i ] | b(8) |
|       for( j = 0; j < po_num_prefix_bytes[ i ]; j++ ) | |

| sei_processing_order( payloadSize ) { | Descriptor |
|---|---|
|         po_prefix_byte[ i ][ j ] | b(8) |
|     }else { | |
|         po_sei_type[ i ] => it indicates to which SEI message the ID refers to | u(1) |
|         po_sei_id[ i ] => it indicates the ID of SEI message with type po_sei_type[ i ] that is associated to the PRO SEI with the order indicated in the following | ue(v) |
|     } | |
|   } | |
|     po_sei_processing_order[ i ] | u(8) |
|   } | |
| } | |

According to a first group of embodiments, when the prefix solution is used to associate SEI message with the PRO SEI message to provide an operational order, complete prefix matching might be undesirable. The prefix might be longer than the part that needs to be match when dynamic SEI messages are used for which some fields are kept static but others not (e.g. more prefix is included to indicate a maximum complexity associated with a particular SEI message).

On this embodiment a matching length is provided as for instance shown in the following in combination with the previous invention, while it also applies for itself without the described invention.

| sei_processing_order( payloadSize ) { | Descriptor |
|---|---|
|   po_num_sei_messages_minus2 | u(8) |
|   for( i = 0; i < po_num_sei_messages_minus2 + 2; i++) { | |
|     ... | u(1) |
|     po_sei_prefix_flag[ i ] => a bit of payload of an SEI message included here | u(1) |
|     po_sei_prefix_complete_matching_flag[ i ] => indicates whether the whole prefix is used for matching and finding the associated SEI message for the indicated order | u(1) |
|     po_sei_payload_type[ i ] | u(12) |
|     if( po_sei_prefix_flag[ i ]) { | |
|       po_num_prefix_bytes[ i ] | b(8) |
|       if(po_sei_prefix_complete_matching_flag[ i ]) | |
|         po_num_prefix_matching_bits[ i ] => number of bits to be matched | b(8) |
|       for( j = 0; j < po_num_prefix_bytes[ i ]; j++ ) | |
|         po_prefix_byte[ i ][ j ] | b(8) |
|     }else { | |
|       po_sei_type[ i ] => it indicates to which SEI message the ID refers to | u(1) |
|       po_sei_id[ i ] => it indicates the ID of SEI message with type po_sei_type[ i ] that is associated to the PRO SEI with the order indicated in the following | ue(v) |
|     } | |
|   } | |
|   po_sei_processing_order[ i ] | u(8) |
|   } | |
| } | |

In the example given above, a gating flag is also introduce to indicate whether the whole prefix is used for matching or just a part thereof, in which case the length (smaller than the number of bytes of the provided prefix) is indicated.

Alternatively, a more complex version could be used such as a masking pattern of which fields to be used for matching or a skip field so that one or more parts in the middle of the prefix are ignored while doing the matching.

According to a third group of embodiments, even though the usage of Ids for referencing reduces the size of PRO SEI message, when several alternatives need to be signalled, having to send multiple complete SEI messages unnecessarily duplicates information leading to overhead.

On this embodiment, a first aspect is to include a PRO SEI Id as reference in another PRO SEI id, indicating that the referenced SEI messages in the reference PRO SEI are included in the processing order of the second PRO SEI as indicated.

An example of the combination of aspects described so far is shown in the following.

| sei_processing_order( payloadSize ) { | Descriptor |
|---|---|
| po_id | u(8) |
| po_num_sei_messages_minus2 | u(8) |
| for( i = 0, i < po_num_sei_messages_minus2 + 2; i++) { | |
|   po_sei_wrapping_flag[ i ] | u(1) |
|   po_sei_importance_flag[ i ] | u(1) |
|   if( po_sei_wrapping_flag[ i ] ) { | |
|     reserved_alignment_6bits | u(6) |
|     sei_message( ) | |
|   } else { | |
|     po_sei_association_idc[ i ] | u(2) |
|     po_sei_payload_type[ i ] | u(12) |
|     if( po_sei_association_idc[ i ] = = 1) | |
|       po_sei_payload_id[ i ] | u(8) |
|     if( po_sei_association_idc[ i ] = = 2) { | |
|       po_num_prefix_bytes_minus1[ i ] | b(7) |
|       po_all_prefix_bytes_used_for_association_flag[ i ] | u(1) |
|       if( po_all_prefix_bytes_used_for_association_ | |
|       flag[ i ]) | |
|         po_prefix_association_length_minus1[ i ] | u(16) |
|       for( j = 0; j < po_num_prefix_bytes_minus1[ i ] + 1; j++ ) | |
|         po_prefix_byte[ i ][ j ] | b(8) |
|     } | |
|   } | |
|   po_sei_processing_order[ i ] | u(8) |
| } | |
| } | |

The SEI processing order SEI message carries information indicating the preferred processing order, as determined by the encoder (i.e., the content producer), for different types of SEI messages that may be present in a CVS.

When an SEI processing order SEI message is present in any access unit of a CVS, an SEI processing order SEI message shall be present in the first access unit of the CVS. The SEI processing order SEI message persists in decoding order from the current access unit until the end of the CVS. When there are multiple SEI processing order SEI messages present in a CVS with the same po_id, they shall have the same content.

po_id contains an identifying number that may be used to identify a PO SEI message.

po_sei_association_idc[i], when equal to 0, indicates that the i-th SEI message for which preferred processing order information is provided in the SEI processing order SEI message is identified by the syntax element po_sei_payload_type[i]. po_sei_association_idc[i] equal to 1 indicates that the i-th SEI message for which preferred processing order information is provided in the SEI processing order SEI message is identified by the syntax elements po_sei_payload_type[i] and po_sei_payload_id[i]. po_sei_association_idc[i] equal to 2 indicates that the i-th SEI message for which preferred processing order information is provided in the SEI processing order SEI message is identified by the syntax elements po_sei_payload_type[i], po_prefix_association_length_minus1[i] and po_prefix_byte[i] [j]. The value 3 for po_sei_association_idc[i] is reserved for future use by ITU-T|ISO/IEC and shall not be present in bitstreams conforming to this edition of this document.

po_sei_payload_type[i] specifies the payloadType value of the i-th SEI message type for which preferred processing order information is provided in the SEI processing order SEI message. For any two different non-negative integer values of m and n, the values of po_sei_payload_type[m] and po_sei_payload_type[n] shall not be identical unless po_sei_association_idc[m] and po_sei_association_idc[n] are both equal to 1 and po_sei_payload_id[m] and po_sei_payload_id[n] are different or po_sei_association_idc[m] and po_sei_association_idc[n] are both equal to 2 and the value of po_prefix_byte[m] [j] and po_prefix_byte[m] [j] is different for at least one j in the range of 0 to min (po_num_prefix_bytes_minus1[m], po_num_prefix_bytes_minus1[n]).

po_sei_payload_id[i] specifies the payloadId value with payloadType equal to po_sei_payload_type[i] of the i-th SEI message for which preferred processing order information is provided in the SEI processing order SEI message.

When po_sei_payload_type[i] indicates a payloadType equal to the payload type of the SEI processing order SEI message, po_sei_association_idc[i] shall be equal to 1 and the same preferred processing order of the SEI messages specified within the SEI processing order SEI message with po_id equal to po_sei_payload_id[i] are inferred for the current SEI processing order SEI message.

po_num_prefix_bytes_minus1[i] plus 1, when present, specifies the number of bytes associated with the i-th SEI message for which preferred processing order information is provided in the SEI processing order SEI message.

po_all_prefix_bytes_used_for_association_flag[i] equal to 1 indicates that all prefix bytes po_prefix_byte[i] [j] are equal to the j-th byte value of any SEI message corresponding to i-th SEI message in the SEI processing order SEI message. po_all_prefix_bytes_used_for_association_flag[i] equal to 0 indicates that po_prefix_association_length_minus1[i] plus1 specifies the length in bits, prefixBitLen, up to which the bytes po_prefix_byte[i] [j] coincide with the SEI payload of any SEI message corresponding to i-th SEI message in the SEI processing order SEI message.

When po_prefix_association_length_minus1[i] is not present and po_sei_association_idc[i] is equal to 2, the value of prefixBitLen is derived as 8*(po_num_prefix_bytes_minus1[i]+1)

po_prefix_byte[i] [j], when present, specifies the j-th byte value of an SEI message corresponding to i-th SEI message in the SEI processing order SEI message.

po_sei_processing_order[i] indicates the preferred order of processing of the i-th SEI message type for which po_sei_processing_order[i−1]+1. For i greater than 0, when po_sei_payload_type[i−1] indicates a payloadType equal to the payload type of the SEI processing order SEI message, po_sei_processing_order[i] shall be equal to or greater than the value of po_sei_processing_order[po_num_sei_messages_minus2+1] of the SEI processing order SEI message with po_id equal to po_sei_payload_id[i] of the current SEI processing order SEI message.

The value of po_sei_processing_order[po_num_sei_messages_minus2+1] shall not be equal to 0.

As a further aspect, instead of indicating directly the order_id in the PRO SEI message another syntax element is used to indicate in the appearance order a particular property of the new referenced SEI message, which can indicate that an SEI message has an order_id equal to the previous indicated SEI message or an order that is one value higher than the previous SEI message, or that it has the same order and only one of both needs to be executed. An example is shown in the following:

| sei_processing_order( payloadSize ) { | Descriptor |
|---|---|
|   po_num_sei_messages_minus2 | u(8) |
|   for( i = 0; i < po_num_sei_messages_minus2 + 2; i++) { | |
|     ... | u(1) |
|     po_sei_prefix_flag[ i ] => a bit of payload of an SEI message included here | u(1) |
|     po_sei_prefix_complete_matching_flag[ i ] => indicates whether the whole prefix is used for matching and finding the associated SEI message for the indicated order | u(1) |
|     po_sei_payload_type[ i ] | u(12) |
|     if( po_sei_prefix_flag[ i ]) { | |
|       po_num_prefix_bytes[ i ] | b(8) |
|       if(po_sei_prefix_complete_matching_flag[ i ]) | |
|         po_num_prefix_matching_bits[ i ] => number of bits to be matched | b(8) |
|       for( j = 0; j < po_num_prefix_bytes[ i ]; j++ ) | |
|         po_prefix_byte[ i ][ j ] | b(8) |
|     }else { | |
|       po_sei_type[ i ] => it indicates to which SEI message the ID refers to | u(1) |
|       po_sei_id[ i ] => it indicates the ID of SEI message with type po_sei_type[ i ] that is associated to the PRO SEI with the order indicated in the following | ue(v) |
|     } | |
|   } | |
|   po_sei_processing_indication[ i ] | u(3) |
|   } | |
| } | | preferred processing order information is provided in the SEI processing order SEI message. For any two different integer values of m and n that are greater than or equal to 0, po_sei_processing_order[m] less than po_sei_processing_order[n] indicates any SEI message type with payloadType equal to po_sei_payload_type[m] and, when present, po_sei_payload_id[m] or bytes po_prefix_byte[m] [p] for p ranging from 0 to po_num_prefix_bytes_minus1[m], inclusive, should be processed before any SEI message type with payloadType equal to po_sei_payload_type[n], and, when present, po_sei_payload_id[n] or bytes po_prefix_byte[n] [q] for q ranging from 0 to po_num_prefix_bytes_minus1[n], inclusive, and po_sei_processing_order[m] equal to po_sei_processing_order[n] indicates that there is no preferred order of processing between the SEI message types.

For i greater than 0, when po_sei_payload_type[i−1] does not indicate a payloadType equal to the payload type of the SEI processing order SEI message, po_sei_processing_order[i] shall be equal to po_sei_processing_order[i−1] or Here, po_sei_processing_indication is used to indicate the following possibilities:

0: orderId=+1; one of the orderId+1 is played after orderId

1: same order (it does not matter) and not alternative so it can be played as decided by the decoder/receiver.

2: same order Id and alternative=>one of the alternative SEI messages to be chosen and executed.

3: same order Id and alternative but only one is active for a picture (e.g., some pictures have a different resolution and they have different upsampling filters to be used=>Two different SEI messages to be executed but not simultaneously)

Figure 7:
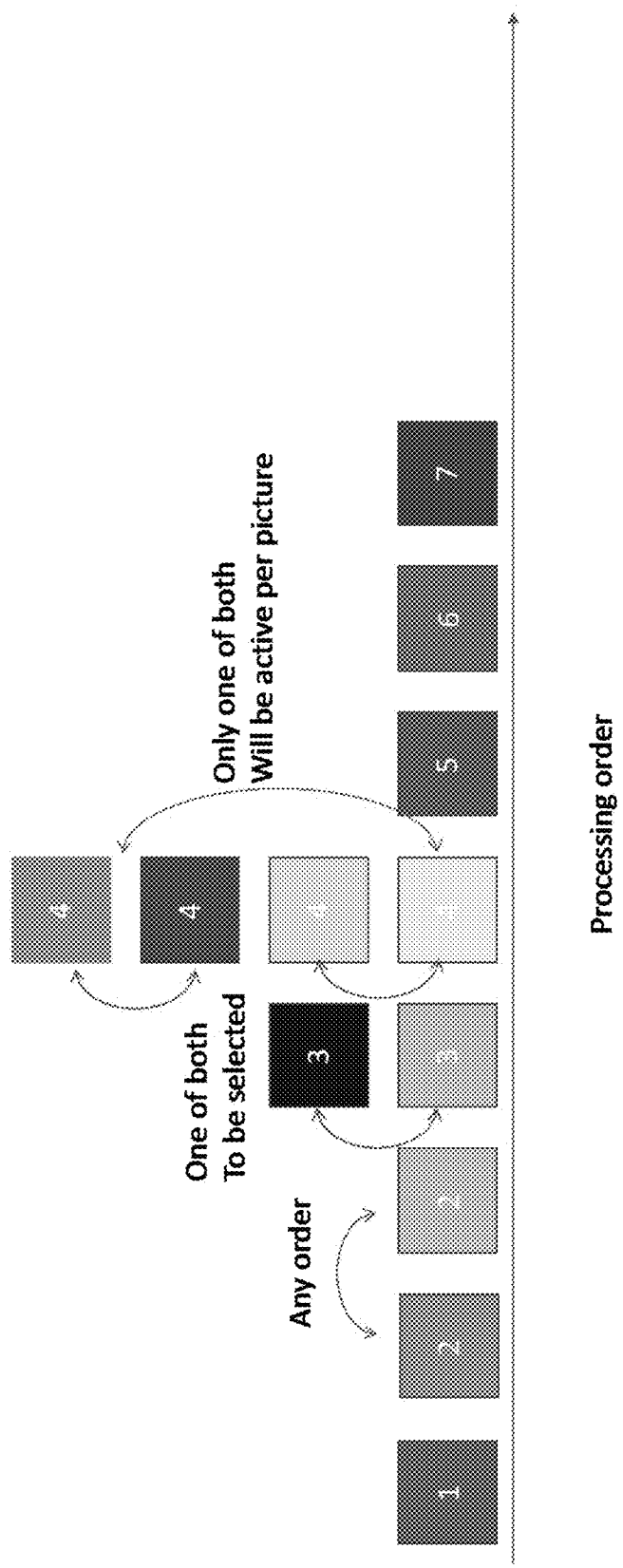
FIG. 7 illustrates a processing order of SEI messages according to an embodiment.

An example is shown in FIG. 7.

Based on the information the decoder/parser can derive the orderId and variables such as alternativeSEImessages, e.g. as follows:

```
Id=0
alternativeIdx=0
alternativeNum=0
for( i = 0; i < po_num_sei_messages_minus2 + 2; i++)
    if(po_sei_processing_indication[ i ]==0)
        orderId[ i ]= Id++;
        if(alternativeNum>0)
            alternativeIdx++;
        alternativeNum=0;
    else if(po_sei_processing_indication[ i ]==1)
        orderId[ i ]= Id;
        if(alternativeNum>0)
            alternativeIdx++;
        alternativeNum=0;
    else if(po_sei_processing_indication[ i ]==2)
        orderId[ i ]= Id;
        if(alternativeNum==0)
            alternativeSEImessages[alternativeIdx][alternativeNum++]= i − 1;
        alternativeSEImessages[alternativeIdx][alternativeNum++] = i;
    else if(po_sei_processing_indication[ i ]==2)
        orderId[ i ]= Id;
```

-continued

```
        if(alternativeNum>0)
            alternativeIdx++;
        alternativeNum=0;
```

Then the receiver/decoder choses among the set of alternativeIdx group of SEI messages only one of each group and for each SEI message j that is to be executed it is executed following the order specified by orderId [i].

The fact that some SEI messages have the same order Id and alternative but only one is active for a picture can be used for a receiver to understand what is the maximum complexity associated with the SEI message execution as indicated by the PRO SEI message.

According to a fourth group of embodiments, one important SEI message that can be included into the PRO SEI message is the Neural Network Post Filter (NNPF) SEI message. In this case, there is one particular aspect that is important for such an SEI message which is the complexity information. This information can be carried if the prefix solution is included but computing the overall complexity when more than one NNPF SEI message is present might be complex. In particular when there are alternatives as described before. Deriving the minimum complexity could be tricky and, in some cases, quick determination whether the PRO SEI message and associated SEI messages can be executed may be desirable.

As a further embodiment the PRO SEI message includes information about the minimum complexity associated with NNPF messages or min-max complexity of the NNPF messages associated with the PRO SEI message. An example is shown in the following:

| sei_processing_order( payloadSize ) { | Descriptor |
|---|---|
| po_num_sei_messages_minus2 | u(8) |
| for( i = 0; i < po_num_sei_messages_minus2 + 2; i++) { | |
| ... | u(1) |
| po_sei_prefix_flag[ i ] => a bit of payload of an SEI message included here | u(1) |
| po_sei_prefix_complete_matching_flag[ i ] => indicates whether the whole prefix is used for matching and finding the associated SEI message for the indicated order | u(1) |
| po_sei_payload_type[ i ] | u(12) |
| if ( po_sei_prefix_flag[ i ]) { | |
| po_num_prefix_bytes[ i ] | b(8) |
| if(po_sei_prefix_complete_matching_flag[ i ]) | |
| po_num_prefix_matching_bits[ i ] => number of bits to be matched | b(8) |
| for( j = 0; j < po_num_prefix_bytes[ i ]; j++ ) | |
| po_prefix_byte[ i ][ j ] | b(8) |
| }else { | |
| po_sei_type[ i ] => it indicates to which SEI message the ID refers to | u(1) |
| po_sei_id[ i ] => it indicates the ID of SEI message with type po_sei_type[ i ] that is associated to the PRO SEI with the order indicated in the following | ue(v) |
| } | |
| } | |
| po_sei_processing_indication[ i ] | u(3) |
| } | |
| po_nnpfc_complexity_info_present_flag | u(1) |
| if( po_nnpfc_complexity_info_present_flag ) { | |
| po_nnpfc_min_parameter_type_idc | u(2) |
| if( po_nnpfc_parameter_type_idc != 2 ) | |
| po_nnpfc_log2_parameter_min_bit_length_minus3 | u(2) |
| po_nnpfc_min_parameters_idc | u(6) |
| po_nnpfc_min_kmac_operations_idc | ue(v) |
| po_nnpfc_min_total_kilobyte_size | ue(v) |
| } | |
| } | |

The example above shows several parameters that show the min complexity that needs to be supported in order to be able to process the associated NNPF SEI messages. The complexity information can contain:

Whether integers or floats are used (for NN parameters: e.g. weights or bias values)

Length of the values (for NN parameters: e.g. weights or bias values)

Number of parameters

Number of maximum number of multiply-accumulate operations per sample for the less complex NNPF "path".

Size in kilobytes

Another example would give min and max values. As a further alternative, is this concept is combined with the first invention with subsets of PRO SEI messages, the max and/or min would be provided as per subset that is independently executable.

According to a fifth group of embodiments, there could be some processing involved before running/executing any of the SEI messages associated with the PRO SEI message.

In a further embodiment the PRO SEI message indicates whether some processing, for instance, associated with the Video Usability Information (VUI) needs to be performed before executing the SEI messages associated with the PRO SEI. An instantiation of such signaling is shown in the following:

| sei_processing_order( payloadSize ) { | Descriptor |
|---|---|
| po_vui_processing_flag | u(1) |
| po_num_sei_messages_minus2 | u(8) |
| for( i = 0; i < po_num_sei_messages_minus2 + 2; i++) { | |
| ... | u(1) |
| po_sei_prefix_flag[ i ] => a bit of payload of an SEI message included here | u(1) |
| po_sei_payload_type[ i ] | u(13) |
| if( po_sei_prefix_flag[ i ]) { | |
| po_num_prefix_bytes[ i ] | b(8) |
| for( j = 0; j < po_num_prefix_bytes[ i ]; j++ ) | |
| po_prefix_byte[ i ][ j ] | b(8) |
| }else { | |
| po_sei_type[ i ] => it indicates to which SEI message the ID refers to | u(1) |
| po_sei_id[ i ] => it indicates the ID of SEI message with type po_sei_type[ i ] that is associated to the PRO SEI with the order indicated in the following | ue(v) |
| } | |
| } | |
| po_sei_processing_order[ i ] | u(8) |
| } | |
| } | | po_vui_processing_flag indicates whether the processing associated with the VUI needs to be performed before any associated SEI message.

Alternatively the VUI processing could be carried out somewhere in between associated SEI messages instead of just as a first processing step and that would be indicated in the PRO SEI message.

In yet another aspect it is discussed how NNPF SEI messages are activated when these are included or referred to within a PRO SEI message. NNPF filters are typically described by SEI messages that describe the neural networks but when they are to be applied onto a decoded picture is handled by the so called activation SEI messages. When several NNPF filters are described within a PRO SEI message a group/bulk activation of all filters within a PRO SEI message would be desirable. However, when activating a NNPF filter, there are some parameters that need to be provided, such as whether the NNPF-generated picture that corresponds to a particular input picture derived for an NNPF is output by the NNPF process or not. Also, the number of input pictures or pictures of the set of input picture that need to be skipped when selecting input pictures for the NNPF could be described. Providing such an information as a per NNPF would lead to a big overhead; instead a set of options can be offered first (see the example on nnpfga_num_filter_params_minus1) and a then a mapping can be performed for each of the NNPF filters on the corresponding parameters (see in the example nnpfga_filter_param[i]) that are activated. An example is shown below.

| nn_post_filter_group_activation( payloadSize ) { | Descriptor |
|---|---|
| nnpfga_target_id => It points to a PRO SEI message | ue(v) |
| nnpfga_cancel_flag | u(1) |
| if( !nnpfga_cancel_flag ) { | |
| nnpfga_persistence_flag | u(1) |
| nnpfga_num_filter_params_minus1 | ue(v) |
| for( i = 0; i <= nnpfga_num_filter_params_minus1 ; i++) { | |
| nnpfga_target_base_flag[ i ] | u(1) |
| nnpfga_input_all_pics_flag[ i ] | u(1) |
| if( !nnpfga_input_all_pics_flag[ i ] ) { | |
| nnpfga_num_input_pics_minus1[ i ] | ue(v) |
| for( j = 0; j <= nnpfga_num_input_pics_minus1[ i ]; j++ ) | |
| nnpfga_input_pic_skip_count[ i ][ j ] | ue(v) |
| } | |

| nn_post_filter_group_activation( payloadSize ) { | Descriptor |
|---|---|
|     nnpfga_num_output_entries[ i ] | ue(v) |
|     for( j = 0; j < nnpfga_num_output_entries[ i ]; j++ ) | |
|         nnpfga_output_flag[ i ][ j ] | u(1) |
|     } | |
|     nnpfga_num_filters_minus2 => It indicates the number of NNPF in the PRO SEI message | ue(v) |
|     for( i = 0; i <= nnpfga_num_filters_minus2 + 1; i++ ) { | |
|         nnpfga_filter_param[ i ] | u(v) |
|     } | |
|   } | |
| } | | nnpfga_num_filter_params_minus1 specifies the number of set of filter parameters nnpfga_target_base_flag[i], nnpfga_input_all_pics_flag[i], nnpfga_input_pic_skip_count[i][j], nnpfga_num_output_entries[i], nnpfga_output_flag[i] [j] present in the neural network post filter group activation SEI message.

nnpfga_filter_param_idx[i] specifies the index, into the list of set of filter parameters, of the set of filter parameters that applies to the i-th NNPF filter activated by the i-th loop entry.

Note that also the set of parameters could be given only for the aspect discussed on output or only for the input or even separately for output and input, in the latter case requiring two syntax elements for indicating the input parameters and output parameters. As another alternative the group/bulk activation can only be done when all NNPF SEI messages share the same characteristics on output and input and then only one information is provided to be applied for all.

In other aspects, the decoder 100 reconstructs, from each inbound AU, the corresponding picture 16', wherein possible, but optional, implementation details which may apply individually or in combination, have been described above with respect to FIG. 2. Some options for the implementation of decoder and encoder are described in more details below.

A first one relates to the handling of decoded pictures 16' and their buffering a decoded picture buffer. The loop buffer 142 of FIG. 2 may include such DPB.

According to an embodiment, two types of reference pictures may be distinguished: short-term and long-term. The encoder does the same in emulating the DPB fill state of the decoder 100 at each point in time during decoding. A reference picture may be marked as "unused for reference" when it becomes no longer needed for prediction reference. The conversion among these three statuses (short-term, long-term, and unused for reference) is controlled by a decoded reference picture marking process. There are two alternative decoded reference picture marking mechanisms, the implicit sliding window process and the explicit memory management control operation (MMCO) process. For each currently decoded picture or each currently decoded AU, it is signalled in the data stream 14 as to which process shall be used for DPB management. The sliding window process marks a short-term reference picture as "unused for reference" when the number of reference frames is equal to a given maximum number (max-num-ref-frames in SPS). The short-term reference pictures are stored in a first-in, first-out manner so that the most recently decoded short-term pictures are kept in the DPB. The explicit MMCO process is controlled via multiple MMCO commands. If this mode is selected for a current AU or currently decoded picture, the bitstream contains for this, or in this, AU one or more of these commands. An MMCO command may any of 1) mark one or more short-term or long-term reference picture as "unused for reference," 2) mark all the pictures as "unused for reference," or 3) mark the current reference picture or an existing short-term reference picture as long-term, and assign a long-term picture index to that long-term picture. The reference picture marking operations as well as any output—for sake of presentation—and removal of pictures from the DPB may be performed after a picture has been decoded.

Some possible details of the reference picture marking mechanism of FIG. 10 are discussed below. 1) A first aspect relates to gaps in frame number and non-Existing pictures. Although not explained above, it might be that each reference picture 414 in the DPB 406 is associated with a frame number. Normally this number increases by one for each reference picture 414, but gaps in frame number may be allowed by setting a corresponding high level (such as sequence level) flag, which might be called parameter-gaps-in-frame-num-allowed-flag, to one for example in order to allow that an encoder or a MANE (media aware network element) can deliver a bitstream in which the frame numbers increase by more than one for a reference picture relative to the preceding reference picture in decoding order. This might be favourable in order to support temporal scalability. A sequence of AUs with gaps in the frame numbers may be received, and non-existing pictures to fill the gap may be created. The non-existing pictures are assigned with frame number values in the gap and are considered as reference pictures during decoded reference picture marking, but will not be used for output (hence not displayed). The non-existing pictures ensure that the status of the DPB, with respect to the frame numbers of the pictures residing in it, is the same for a decoder that received the pictures as for a decoder that did not receive the pictures.

Another possible aspect relates to the loss of a reference picture when using sliding Window. When a reference picture is lost, it may be possible to conceal the picture and to possibly report the loss to the encoder if a feedback channel is available given that the loss is detected. If gaps in frame number are disallowed, a discontinuity in the frame number values indicates an unintentional loss of a reference picture. If gaps in frame number are allowed, a discontinuity in frame number values may be caused by either intentional removal of temporal layers or subsequences or an accidental picture loss, and decoders should infer a picture loss only if a non-existing picture is referred in the inter prediction process. The picture order count of a concealed picture may not be known which can cause the decoder to use incorrect reference pictures without detecting any errors when decoding B-pictures.

An even further possible aspect relates to the loss of a reference picture with MMCO. When losing a reference picture that contains an MMCO command marking a short-term reference picture as "unused for reference," then the status of reference pictures in the DPB becomes incorrect and consequently, reference picture lists for a few pictures following the lost picture may become incorrect. If a picture containing MMCO commands related to long-term reference pictures is lost there is a risk that the number of long-term reference pictures in the DPB is different from what it would have been if the picture was received, resulting in an "incorrect" sliding window process for all the following pictures. That is, the encoder and decoder may contain a different number of short-term reference pictures resulting in out-of-sync behaviour of the sliding window process. What makes the situation even worse is that a decoder will not necessarily know that the sliding window process is out-of-sync.

In the following, MMCO commands are shown. One or more or all of the commands may apply to yield in different embodiments:

| memory_management_control_operation | Memory Management Control Operation |
| --- | --- |
| 0 | End memory management control operation syntax element loop |
| 1 | Mark a short-term reference picture as "unused for reference" |
| 2 | Mark a long-term reference picture as "unused for reference" |
| 3 | Mark a short-term reference picture as "used for long-term reference" and assign a long-term frame index to it |
| 4 | Specify the maximum long-term frame index and mark all long-term reference pictures having long-term frame indices greater than the maximum value as "unused for reference" |
| 5 | Mark all reference pictures as "unused for reference" and set the MaxLongTermFrameIdx variable to "no long-term frame indices" |
| 6 | Mark the current picture as "used for long-term reference" and assign a long-term frame index to it |

A further option for the implementation of decoder and encoder is described now, may optionally be combined with the one concerning the DPB management described before, and relates to entropy decoding of some syntax element such as the residual data in form of transform coefficients into the bitstream 14. Lossless entropy coding of lossy quantized transform coefficients is a crucial part of an efficient video codec. One such method is referred to as context-adaptive-variable-length-coding (CAVLC) in which the encoder switches between different variable length code (VLC) tables for various syntax elements, depending on the values of the previously transmitted syntax elements in the same slice in a context-adaptive fashion. Encoder and decoder may use the CAVLC. Due to the fact that each syntax element is coded into the bitstream 14 by writing a corresponding codeword into the bitstream which has been selected for that syntax element from the context-adaptively selected code table, each CAVLC encoded bit in the bitstream can be associated to a single syntax element. The relevant information about the transform coefficient levels in scan order to be present in bitstream 14 is, thus, available in a direct accessible form as syntax elements when CAVLC is used. Encoder and decoder may use CAVLC to signal the transform coefficients in the bitstream 14. The following syntax elements may be used, e.g. syntax elements having the following semantics:

- One syntax element indicating the total number of non-zero transform coefficient levels in a transform block (as indicated by CoeffToken)
- One or more syntax elements indicating the number of trailing one transform coefficient levels (as indicated by CoeffToken), e.g. a run of syntax elements occurring at the end of scanning the syntax elements in a scan order up to the last non-zero syntax element which are all one, and their sign (as indicated by trailing_ones_sign_flag)
- One or more syntax element per non-zero transform coefficient except the trailing one transform coefficients, which indicates the transform coefficient level value
- One syntax element indicating the total number of zero-valued transform coefficient levels
- Syntax elements indicting the number of consecutive transform coefficient levels in scan order with zero value from a current scan position onwards before a non-zero valued transform coefficient level is encountered.

It might alternatively or additionally be that the encoder might select between the usage of CABAC, thus context-adaptive binary arithmetic coding, and CAVLC and signal the selection in the bitstream 14 and that the decoder reads this signal and uses the indicated way of decoding the residual data.

A further option for the implementation of decoder and encoder is described now, may optionally be combined with any of the one concerning the DPB management and the one concerning CAVLC described before, and relates to a quarter pel interpolation filter. In order to allow inter-prediction at a finer granularity than the regular full-pel sample grid, a sample interpolation process is used to derive sample values at sub-pel sample positions which can range from half-pel positions to quarter-pel position. One method to carry out quarter-pel interpolation may be used by encoder and decoder and is as follows. First, a 6-tap FIR filter is used to generate sample values at half-pel positions followed by an averaging of the generated half-pel position sample values through interpolation to generate sample values at quarter-pel position for luma components.

Further embodiments are described in the following:

According to an embodiment, the apparatus may further comprise a decoded picture buffer (DPB) and be configured to decode a current AU sing inter-picture prediction from a referenced reference picture stored in the DPB to obtain a decoded picture, and insert the decoded picture into the DPB, assign to each reference picture stored in the DPB a classification as one of a short-term reference picture, a long-term reference picture and an unused-for-reference picture, read DPB mode information from the current AU, if the DPB mode information indicates a first mode, remove one or more reference pictures classified as a short-term picture, according to a FIFO strategy, from the DPB, if the DPB mode information indicates a second mode, read memory management control information comprising at least one command in the current AU and execute the at least one command so as to change the classification assigned to at least one of the reference pictures stored in the DPB, and use the classification of the reference pictures in the DPB, for managing reference picture removal 424 from the DPB.

In an embodiment, the apparatus may be configured to read from the current AU an indication whether the decoded picture is not used for inter-picture prediction; perform the insertion of the decoded picture into the DPB, if the decoded picture is not indicated to be not used for inter-picture prediction or not directly to be output, and directly output the decoded picture without buffering same in the DPB, if the decoded picture is indicated to be not used for inter-picture prediction and directly to be output.

According to an embodiment, the apparatus may be configured to assign a frame index to each reference picture in the DPB, classified to be a long-term picture, and use a predetermined reference picture in the DPB, classified to be a long-term picture, as the referenced reference picture in the DPB if the frame index assigned to the predetermined reference picture is referred to in the current AU.

In an embodiment, the apparatus may be configured to one or more of: if the at least one command in the current AU is a first command, re-classify a reference picture in the DPB, classified to be a short-term reference picture, as an unused-for-reference picture, if the at least one command in the current AU is a second command, re-classify a reference picture in the DPB, classified to be a long-term reference picture, as an unused-for-reference picture, if the at least one command in the current AU is a third command, re-classify a reference picture in the DPB, classified to be a short-term picture, as a long-term reference picture, and assign a frame index to the re-classified reference picture, if the at least one command in the current AU is a fourth command, set an upper frame index limit according to the fourth command, and re-classify all reference picture in the DPB, classified to be a long-term picture, and having assigned thereto a frame index exceeding the upper frame index limit, as an unused-for-reference picture, if the at least one command in the current AU is a sixth command, classify the current picture as a long-term picture, as an unused-for-reference picture, and assign a frame index to the re-classified reference picture.

According to an embodiment, the apparatus may be configured to remove any reference picture from the DPB, which is classified as an unused-for-reference picture, and which is no longer to be output.

In an embodiment the apparatus may be configured to read an entropy coding mode indicator from the data stream, and decode prediction residual data from the current AU using a context adaptive variable length coding mode if the entropy coding mode indicator indicates the context adaptive variable length coding mode, and using a context adaptive binary arithmetic coding mode if the entropy coding mode indicator indicates the context adaptive binary arithmetic coding mode.

According to an embodiment, the apparatus may be configured to derive quarter pel values in the referenced reference picture based on a motion vector in the current AU and using 6-tap FIR filter so as to derive half-pel values and averaging neighboring half-pel values.

In an embodiment, the apparatus may be configured to:
decode a current AU using inter-picture prediction from a referenced reference picture stored in the DPB to acquire a decoded picture, and to insert the decoded picture into the DPB,
assign to each reference picture stored in the DPB a classification as one of a short-term reference picture, a long-term reference picture and an unused-for-reference picture,
read DPB mode information from the current AU,
if the DPB mode information indicates a first mode, remove one or more reference pictures classified as a short-term picture, according to a first-in-first-out (FIFO) strategy, from the DPB,
if the DPB mode information indicates a second mode, read memory management control information comprising at least one command in the current AU and execute the at least one command so as to change the classification assigned to at least one of the reference pictures stored in the DPB, and use the classification of the reference pictures in the DPB, for managing reference picture removal from the DPB.

According to an embodiment, the apparatus may be configured to:
read from the current AU an indication whether the decoded picture is not used for inter-picture prediction;
perform the insertion of the decoded picture into the DPB, if the decoded picture is not indicated to be not used for inter-picture prediction or not directly to be output, and directly output the decoded picture without buffering same in the DPB, if the decoded picture is indicated to be not used for inter-picture prediction and directly to be output.

In an embodiment, the apparatus may be configured to:
assign a frame index to each reference picture in the DPB, classified to be a long-term picture, and
use a predetermined reference picture in the DPB, classified to be a long-term picture, as the referenced reference picture in the DPB if the frame index assigned to the predetermined reference picture is referred to in the current AU.

According to an embodiment, the apparatus may be configured to one or more of:
if the at least one command in the current AU is a first command,
re-classify a reference picture in the DPB, classified to be a short-term reference picture, as an unused-for-reference picture,
if the at least one command in the current AU is a second command,
re-classify a reference picture in the DPB, classified to be a long-term reference picture, as an unused-for-reference picture, if the at least one command in the current AU is a third command,
re-classify a reference picture in the DPB, classified to be a short-term picture, as a long-term reference picture, and assign a frame index to the re-classified reference picture,
if the at least one command in the current AU is a fourth command,
set an upper frame index limit according to the fourth command, and re-classify all reference picture in the DPB, classified to be a long-term picture, and having assigned thereto a frame index exceeding the upper frame index limit, as an unused-for-reference picture,
if the at least one command in the current AU is a sixth command,
classify the current picture as a long-term picture, as an unused-for-reference picture, and assign a frame index to the re-classified reference picture.

In an embodiment, the apparatus may be configured to:
remove any reference picture from the DPB, which is classified as an unused-for-reference picture, and which is no longer to be output.

More possibilities are described in the following:
1. PCM

The prediction, transform, quantization and entropy coding are bypassed, and the samples are directly represented by a pre-defined number of bits. When PCM is enabled the number of bits (minus1) used for representing the luma and chroma samples is indicated respectively. Besides, the minimum block sizes and maximum block sizes (as a difference to the minimum) for 2N×2N blocks for which PCM can best used are indicated. When a 2N×2N block is being parsed, if the sizes of that block are in between the described minimum and maximum values a flag indicates whether the PCM mode is used or not. When the PCM mode is used the PCM samples are byte aligned and luma samples of the block are directly represented/parsed in raster scan with the indicated PCM luma bit length and afterwards the chroma samples of the PCM block are represented/parsed in raster scan with the indicated PCM chroma bit length, being the first half of the chroma samples Cb and the remaining Cr samples. Furthermore, the CABAC decoding engine is terminated every time PCM flag is parsed and initialized after the decoding PCM syntax 2. Constrained Intra Prediction Intra prediction can only be predicted from neighbouring coding blocks coded using intra prediction modes. Neighboring samples of inter prediction modes are then considered as not available and are substituted as follows. If all neighboring samples are not available the value 1<< (bitDepth−1) is used for all samples. If at least one neighboring sample is available a search is performed first for the neighboring samples on the left (starting from the bottom one) and then continuing with the neighboring samples above (starting from the left) until a first sample is found that is available. All non available samples (because belonging to a inter mode block) are substituted with the found available neighboring sample for intra prediction. This mode is also allowed for directional intra modes that are different than DC mode.

3. Intra Mode Dep. Coeff. Scan Order.

The scan order of the coefficients in an intra coded block is dynamically changed based on the transform block sizes and intra modes. The scanning is carried out for each 4×4 subblocks/regions of the transform block (e.g., using only one coefficient region for the 4×4 transform block size, 4 coefficient regions for 8×8 transform blocks, 16 regions for 16×16 transform block size). The selection of the scanning method for intra modes is dependent on the transform block sizes. For transform block sizes of 16×16 and 32×32 the scanning is performed diagonally (starting at 0, 0->1, 0->0, 1->2, 0->1, 1->0, 2->3, 0 and so on—e.g. decreasing the y value and increasing the x value with step 1 at each step and when y equals 0 restarting with y having a value of x+1 and setting x to 0 while starting at value 0, 0). For transform block sizes of 4×4 (luma or chroma) and 8×8 (luma) the coefficient scanning order depends on the intra mode associated with a intra direction of the prediction of neighboring blocks. The vertical scan is used when the prediction direction is close to horizontal and the horizontal scan is used when the prediction direction is close to vertical. For other prediction directions, the diagonal up-right scan is used.

4. Transform Quantization Bypass Mode

For each coding unit, or coding block it can be indicated whether both transform and quantization are bypassed indicating that the residual signal from inter- or intra-picture prediction is directly entropy coded for that block. In that mode the in-loop filter is skipped.

The following embodiments or aspects are derivable from the above description, and the following embodiments or aspects, in turn, are further extendible by any of the above details and facts, individually or in combination.

Embodiment 1: An apparatus for video decoding,
wherein the apparatus is configured to receive a video data stream having pictures of a video encoded thereinto,
wherein the video data stream comprises a plurality of access units (AU), a plurality of SEI (supplemental enhancement information) messages and processing order information which defines a processing order of the plurality of SEI messages,
wherein the apparatus is configured to determine the processing order information to obtain information on the processing order of the plurality of SEI messages,
wherein the processing order information defines one or more subsets of SEI messages, wherein each of the one or more subsets comprises one or more SEI messages of the plurality of SEI messages,
wherein the apparatus is configured to process the plurality of SEI messages depending on the information on the one or more subsets defined by the processing order information.

Embodiment 2: An apparatus for video decoding according to embodiment 1,
wherein the processing order information comprises importance information (po_sei_importance_flag[i]; po_sei_importance_flag[numSEI]) for an SEI message of the one or more SEI messages of a subset of the one or more subsets, wherein the importance information for said SEI message indicates whether or not all SEI messages of said subset shall be ignored, if the apparatus for video decoding cannot interpret or understand said SEI message,
wherein the apparatus is configured to process the importance information for said SEI message (and, e.g., is configured to process or to not process the one or more SEI messages of said subset depending on the importance information).

Embodiment 3: An apparatus for video decoding according to embodiment 2,
wherein the importance information for said SEI message is an SEI message importance flag (po_sei_importance_flag[i]; po_sei_importance_flag[numSEI]).

Embodiment 4: An apparatus for video decoding according to embodiment 2 or 3,
wherein said subset comprises said SEI message and one or more other SEI messages of the plurality of SEI messages,
wherein the importance information for said SEI message indicates whether or not all SEI messages of said subset, comprising said SEI message and the one or more other SEI messages, shall be ignored, if the apparatus for video decoding cannot interpret or understand said SEI message,
wherein the apparatus is configured to process the importance information for said SEI message (and, e.g., is configured to process or to not process said SEI message and the one or more other SEI messages of said subset depending on the importance information).

Embodiment 5: An apparatus for video decoding according to one of embodiments 2 to 4,
wherein the one or more subsets defined by the processing order information are two or more subsets,
wherein the processing order information defines a processing order for the two or more subsets, such that said subset is succeeded by one or more further subsets of the two or more subsets in the processing order,
wherein the importance information for said SEI message indicates whether or not all SEI messages of the subset, comprising said SEI message, and all SEI messages of all subsets of the two or more subsets, succeeding said subset in the processing order, shall be ignored, if the apparatus for video decoding cannot interpret or understand said SEI message and if the importance information for said SEI message indicates that all SEI messages of said subset shall be ignored in this case, wherein the apparatus is configured to process the importance information for said SEI message (and, e.g., is configured to process or to not process all SEI messages of said subset and all SEI messages of all subsets succeeding said subset in the processing order depending on the importance information).

Embodiment 6: An apparatus for video decoding according to one of embodiments 2 to 4, wherein the one or more subsets defined by the processing order information are two or more subsets, wherein the processing order information defines a processing order for the two or more subsets, such that said subset is succeeded by one or more further subsets of the two or more subsets in the processing order, wherein the importance information for said SEI message does not indicate whether or not all SEI messages succeeding said subset in the processing order, shall be ignored, if the apparatus for video decoding cannot interpret or understand said SEI message and if the importance information for said SEI message indicates that all SEI messages of said subset shall be ignored in this case, wherein the apparatus is configured to process the importance information for said SEI message (and, e.g., is configured to process or to not process all SEI messages of said subset depending on the importance information, but not all SEI messages of all subsets succeeding said subset in the processing order).

Embodiment 7: An apparatus for video decoding according to one of embodiments 2 to 4, wherein the one or more subsets defined by the processing order information are two or more subsets, wherein the processing order information defines one or more dependencies for the two or more subsets, such that each of the one or more dependencies defines that a second one of the two or more subsets depends on a first one of the two or more subsets, wherein the importance information for said SEI message indicates whether or not all SEI messages of the subset, comprising said SEI message, and all SEI messages of all subsets of the two or more subsets, which depend on said subset according to the one or more dependencies, shall be ignored, if the apparatus for video decoding cannot interpret or understand said SEI message and if the importance information for said SEI message indicates that all SEI messages of said subset shall be ignored in this case, wherein the apparatus is configured to process the importance information for said SEI message (and, e.g., is configured to process or to not process all SEI messages of said subset and all SEI messages of all subsets which depend on said subset according to the one or more dependencies).

Embodiment 8: An apparatus for video decoding according to one of embodiments 2 to 4, wherein the one or more subsets defined by the processing order information are two or more subsets, wherein the processing order information defines one or more valid subset combinations for the two or more subsets, such that each of the one or more valid subset combinations comprises at least two subsets of the two or more subsets, wherein the apparatus for video decoding is configured to invalidate each subset of the plurality of subsets, if the apparatus for video decoding cannot interpret or understand an SEI message of said subset and if the importance information for said SEI message indicates that all SEI messages of said subset shall be ignored in this case, wherein all SEI messages of any other subset of the two or more subsets shall also be ignored, if said other subset does not belong to a valid subset combination of the one or more valid subset combinations where none of the subsets of the valid subset combination has been invalidated, wherein the apparatus is configured to process the processing order information (and, e.g., is configured to process or to not process the SEI messages of the two or more subsets depending on the one or more valid subset combinations).

Embodiment 9: An apparatus for video decoding according to one of embodiments 1 to 8, wherein the processing order information comprises an end of subset flag (po_end_of_subset_flag[i]) that indicates whether or not an SEI message of the plurality of SEI messages is a last SEI message of one of the one or more subsets, wherein the apparatus is configured to analyze the end of subset flag.

Embodiment 10: An apparatus for video decoding according to one of embodiments 1 to 9, wherein the processing order information comprises an SEI number indication indicating a number of SEI messages of a subset of the one or more subsets, wherein the apparatus is configured to analyze the SEI number indication.

Embodiment 11: An apparatus for video decoding according to one of embodiments 1 to 10, wherein the processing order information comprises a subset number indication indicating a number of subsets of the one or more subsets, wherein the apparatus is configured to analyze the subset number indication.

Embodiment 12: An apparatus for video decoding according to one of embodiments 1 to 11, wherein the processing order information defines at least two subsets as the one or more subsets.

Embodiment 13: An apparatus for video decoding according to one of embodiments 1 to 12, wherein the processing order information comprises information on an identifier (po_SEI_id[i]) for each SEI message of one or more SEI messages of the plurality of SEI messages, wherein the identifier of each SEI message of the one or more SEI messages is unique among the one or more SEI messages.

Embodiment 14: An apparatus for video decoding, wherein the apparatus is configured to receive a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the apparatus is configured to determine the processing order information to obtain information on the processing order of the plurality of SEI messages, wherein the processing order information comprises information on an identifier (po_SEI_id[i]) for each SEI message of one or more SEI messages of the plurality of SEI messages, wherein the identifier of each SEI message of the one or more SEI messages is unique among the one or more SEI messages.

Embodiment 15: An apparatus for video decoding according to embodiment 13 or 14, wherein the information on the identifier (po_SEI_id[i]) for each SEI message of the one or more SEI messages depends on a type indicator (po_SEI_type[i]) indicating a type of said SEI message and depends on a unique type-specific identifier indicating an identifier for said SEI message being unique among all SEI messages of a said type.

Embodiment 16: An apparatus for video decoding according to one of embodiments 13 to 15, wherein the video data stream comprises an indication indicating whether or not all of the plurality of SEI messages have a same type.

Embodiment 17: An apparatus for video decoding according to one of embodiments 13 to 16, wherein the plurality of SEI messages comprises a first (POW, processing order wrapper) SEI message, wherein the first SEI message comprises (e.g., wraps) a second SEI message of the plurality of SEI messages, wherein the apparatus is configured to determine the second SEI message being comprised (e.g., wrapped) by the first SEI message.

Embodiment 18: An apparatus for video decoding according to embodiment 17, wherein the first SEI message comprises an identifier, wherein the identifier of the first SEI message is the identifier for the second SEI message that identifies the second SEI message being comprised by the first SEI message, wherein the apparatus is configured to obtain the identifier.

Embodiment 19: An apparatus for video decoding according to one of embodiments 13 to 18, wherein the plurality of SEI messages comprises a first (POW, processing order wrapper) SEI message, wherein the first SEI message comprises an identifier (pow_id), which is the identifier for a second SEI message of the plurality of SEI messages that directly follows the first SEI message, wherein the apparatus is configured to obtain the identifier.

Embodiment 20: An apparatus for video decoding according to embodiment 19, wherein, if the identifier (pow_id) identifies the second SEI message which directly follows the first SEI message, wherein the second SEI message is located in a same NAL unit as the first SEI message and no other SEI message is located between the first SEI message and the second SEI message which directly follows.

Embodiment 21: An apparatus for video decoding according to one of embodiments 17 to 20, wherein the first SEI message comprises an indication (pow_included) indicating whether the identifier (pow_id) identifies the second SEI message which is wrapped within the first SEI message, or whether the identifier (pow_id) identifies the second SEI message which directly follows the first SEI message, wherein the apparatus is configured to determine said identifier and said indication.

Embodiment 22: An apparatus for video decoding according to one of embodiments 17 to 21, wherein the processing order information comprises a flag that indicates if an identifier (pow_id_in_wrapped_Sei_ flag) for the first SEI message is to be found in the first SEI message itself or in the second SEI message being wrapped in the first SEI message or being identified by the first SEI message, wherein the apparatus is configured to analyze the identifier.

Embodiment 23: An apparatus for video decoding according to one of embodiments 17 to 22, wherein the apparatus is configured to only process the first SEI message that is indicated by the processing order information and/or the second SEI message within the first SEI message, if the apparatus can understand or interpret the processing order information.

Embodiment 24: An apparatus for video decoding according to one of embodiments 17 to 23, wherein the first SEI message wraps or identifies at least two second SEI messages of the plurality of SEI messages, wherein, following a processing of the first SEI message by the apparatus, the apparatus is configured to process the at least two second SEI messages.

Embodiment 25: An apparatus for video decoding according to embodiment 24, wherein an order of the at least two second SEI messages in the first SEI message defines an order of processing, wherein the apparatus is configured to process the at least two second SEI messages in said order of processing.

Embodiment 26: An apparatus for video decoding according to one of embodiments 13 to 25, wherein the processing order information (e.g., a PRO SEI message) comprises the identifier of one of the plurality of SEI messages (e.g., another PRO SEI message) which comprises further processing order information, wherein the apparatus is configured to determine the further processing order information using the identifier of said one of the plurality of SEI messages.

Embodiment 26a: An apparatus for video decoding according to embodiment 26, wherein the further processing order information comprises importance information (po_sei_importance_flag[i]; po_sei_importance_flag[numSEI]) for an SEI message of the one or more SEI messages of the further processing order information, wherein the importance information for said SEI message indicates whether or not all SEI messages of said further processing order information shall be ignored, if the apparatus for video decoding cannot interpret or understand said SEI message, wherein the apparatus is configured to process the importance information for said SEI message.

Embodiment 27: An apparatus for video decoding according to one of embodiments 1 to 26a, wherein the processing order information comprises an indicator (po_sei_prefix_flag[i]) indicating at least one of:

if an associated SEI message of the plurality of SEI messages is identified by a portion of bytes or by a portion of bits of the associated SEI message, if the plurality of SEI messages is identified by another unique identifier,
wherein the apparatus is configured to analyze said indicator.

Embodiment 28: An apparatus for video decoding,
wherein the apparatus is configured to receive a video data stream having pictures of a video encoded thereinto,
wherein the video data stream comprises a plurality of access units (AU), a plurality of SEI (supplemental enhancement information) messages and processing order information which defines a processing order of the plurality of SEI messages,
wherein the apparatus is configured to determine the processing order information to obtain information on the processing order of the plurality of SEI messages,
wherein the processing order information comprises an indicator (po_sei_prefix_flag[i]) indicating at least one of:
if an associated SEI message of the plurality of SEI messages is identified by a portion of bytes or by a portion of bits of the associated SEI message, if the plurality of SEI messages is identified by another unique identifier,
wherein the apparatus is configured to analyze said indicator.

Embodiment 29: An apparatus for video decoding according to embodiment 27 or 28,
wherein the other unique identifier depends on a type indicator (po_SEI_type[i]) indicating a type of said SEI message and depends on a unique type-specific identifier indicating an identifier for said SEI message being unique among all SEI messages of a said type.

Embodiment 30: An apparatus for video decoding according to one of embodiments 27 to 29,
wherein, if the indicator (po_sei_prefix_flag[i]) is present, the processing order information indicates a number of associated bytes (po_num_prefix_bytes[i]) or associated bits to identify an SEI message among the plurality of SEI messages,
wherein the apparatus is configured to analyze the associated bytes or the associated bits of the SEI message to identify the SEI message.

Embodiment 31: An apparatus for video decoding according to embodiment 30,
wherein the number of associated bytes or associated bits of the SEI message to identify the SEI message is located at a beginning of the SEI message; or
wherein the number of associated bytes or associated bits of the SEI message to identify the SEI message is located at an end of the SEI message, or
wherein the number of associated bytes or associated bits of the SEI message to identify the SEI message is not located at a beginning of the SEI message and is not located at the end of the SEI message.

Embodiment 32: An apparatus for video decoding according to one of embodiments 27 to 31,
wherein the processing order information indicates that an SEI message of the plurality of SEI messages is identifier by an identifier and indicates that said SEI message is also identified by a subset of bytes or by a subset of bits of said SEI message.

Embodiment 33: An apparatus for video decoding according to one of embodiments 27 to 31,
wherein a variable indicates if an identification of an SEI message of the plurality of SEI messages is to be conducted using the identifier or is to be conducted using the subset of bytes or the subset of bits,
wherein the apparatus is configured to analyze the variable.

Embodiment 34: An apparatus for video decoding according to one of embodiments 27 to 33,
wherein the processing order information indicates complexity information for one or more SEI messages of the plurality of SEI messages,
wherein the apparatus is configured to analyze the complexity information.

Embodiment 35: An apparatus for video decoding according to embodiment 34,
wherein an SEI message of the plurality of SEI messages is a Neural Network Post Filter SEI message,
wherein the complexity information depends on the Neural Network Post Filter SEI message.

Embodiment 36: An apparatus for video decoding according to one of embodiments 1 to 35,
wherein the processing order information comprises subset information indicating a subset of bytes or a subset of bits of an SEI message of the plurality of SEI messages,
wherein the processing order information comprises portion information which portions of the subset of bytes or of the subset of bits are used to identify the SEI message,
wherein the apparatus is configured to analyze the subset information and the portion information.

Embodiment 37: An apparatus for video decoding,
wherein the apparatus is configured to receive a video data stream having pictures of a video encoded thereinto,
wherein the video data stream comprises a plurality of access units (AU), a plurality of SEI (supplemental enhancement information) messages and processing order information which defines a processing order of the plurality of SEI messages,
wherein the apparatus is configured to determine the processing order information to obtain information on the processing order of the plurality of SEI messages,
wherein the processing order information comprises subset information indicating a subset of bytes or a subset of bits of an SEI message of the plurality of SEI messages,
wherein the processing order information comprises portion information which portions of the subset of bytes or of the subset of bits are used to identify the SEI message,
wherein the apparatus is configured to analyze the subset information and the portion information.

Embodiment 38: An apparatus for video decoding according to embodiment 36 or 37,
wherein the processing order information comprises an indication (po_SEI_prefix_complete_matching_flag [i]) indicating whether all of the subset of bytes or the subset of bits of the SEI message is to be used to identify the SEI message or whether only the portion of the subset of bytes or the subset of bits of the SEI message is to be used to identify the SEI message.

Embodiment 39: An apparatus for video decoding according to one of embodiments 36 to 38,
wherein the portion information comprises a length indication (po_num_prefix_matching_bits [i]) to indicate how many bytes or how many bits of the subset of bytes or of the subset of bits shall be used to identify the SEI message, if the processing order information indicates that only a portion of the subset of bytes or the subset of bits of the SEI is to be used to identify the SEI message, wherein the apparatus is configured to analyze the length indication.

Embodiment 40: An apparatus for video decoding according one of embodiments 36 to 39, wherein the portion information comprises a masking pattern to indicate which fields or bytes or bits of the subset of bytes or of the subset of bits shall be used to identify the SEI message, if the processing order information indicates that only a portion of the subset of bytes or the subset of bits of the SEI is to be used to identify the SEI message, wherein the apparatus is configured to analyze masking pattern.

Embodiment 41: An apparatus for video decoding according to one of embodiments 1 to 40, wherein the processing order information comprises an identifier identifying another processing order information for referencing the other processing order information (e.g., such that said processing order information inherits said other processing order information, or, e.g., such that said other processing order information inherits said processing order information);

wherein the apparatus is configured to determine from the processing order information the identifier identifying the other processing order information.

Embodiment 42: An apparatus for video decoding, wherein the apparatus is configured to receive a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the apparatus is configured to determine the processing order information to obtain information on the processing order of the plurality of SEI messages, wherein the processing order information comprises an identifier identifying another processing order information for referencing the other processing order information (e.g., such that said processing order information inherits said other processing order information, or, e.g., such that said other processing order information inherits said processing order information);

wherein the apparatus is configured to determine from the processing order information the identifier identifying the other processing order information.

Embodiment 43: An apparatus for video decoding according to embodiment 41 or 42, wherein a processing order of at least one SEI message of the plurality of SEI messages, which is comprised by (e.g., wrapped) or identified by the other processing order information depends on the processing order information which comprises the identifier that identifies said other processing order information, wherein the apparatus is configured to determine the processing order of said at least one SEI message.

Embodiment 44: An apparatus for video decoding according to one of embodiments 1 to 43, wherein the processing order information assigns the processing order to said SEI message of the plurality of SEI messages by indicating that the processing order of the SEI message is equal to the processing order of a previously indicated SEI message, or by indicating that the processing order of the SEI message is one value higher than the processing order of the previously indicated SEI message, or by indicating that the processing order of the SEI message is equal to the processing order of the previously indicated SEI message and only one of both SEI messages needs to be processed;

wherein the apparatus is configured to determine from the processing order information the processing order of said SEI message.

Embodiment 45: An apparatus for video decoding, wherein the apparatus is configured to receive a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the apparatus is configured to determine the processing order information to obtain information on the processing order of the plurality of SEI messages, wherein the processing order information assigns the processing order to said SEI message of the plurality of SEI messages by indicating that the processing order of the SEI message is equal to the processing order of a previously indicated SEI message, or by indicating that the processing order of the SEI message is one value higher than the processing order of the previously indicated SEI message, or by indicating that the processing order of the SEI message is equal to the processing order of the previously indicated SEI message and only one of both SEI messages needs to be processed;

wherein the apparatus is configured to determine from the processing order information the processing order of said SEI message.

Embodiment 46: An apparatus for video decoding according to embodiment 44 or 45, wherein the processing order information comprises a processing order indication (po_sei_processing_indication [i]) which indicates which of at least one of the following options applies for the SEI message:

that the processing order of the SEI message is one value higher than the processing order of the previously indicated SEI message, that the processing order of the SEI message is equal to the processing order of a previously indicated SEI message, and that both SEI messages are not alternatives and shall both be processed, that the processing order of the SEI message is equal to the processing order of a previously indicated SEI message, and that both SEI messages are alternatives and that one of both SEI messages shall be processed, that the processing order of the SEI message is equal to the processing order of a previously indicated SEI message, and that only one of both SEI messages is active for a picture, wherein the apparatus is configured to determine from the processing order information the processing order indication for said SEI message.

Embodiment 47: An apparatus for video decoding according to one of embodiments 1 to 46, wherein the processing order information comprises complexity information on a complexity of processing one or more SEI messages of the plurality of SEI messages, wherein the apparatus is configured to determine the information on the complexity of processing the one or more SEI messages from the processing order information.

Embodiment 48: An apparatus for video decoding, wherein the apparatus is configured to receive a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the apparatus is configured to determine the processing order information to obtain information on the processing order of the plurality of SEI messages, wherein the processing order information comprises complexity information on a complexity of processing one or more SEI messages of the plurality of SEI messages, wherein the apparatus is configured to determine the information on the complexity of processing the one or more SEI messages from the processing order information.

Embodiment 49: An apparatus for video decoding according to embodiment 47 or 48, wherein the processing order information comprises information on one or more Neural Network Post Filter SEI messages of the plurality of SEI messages, wherein the complexity information comprises information on a complexity of processing the one or more Neural Network Post Filter SEI messages.

Embodiment 50: An apparatus for video decoding according to one of embodiments 47 to 49.

wherein the apparatus is configured to determine a maximum complexity for SEI message processing from the processing order of two or more SEI messages of the plurality of SEI messages.

Embodiment 51: An apparatus for video decoding according to embodiment 47 to 50, wherein the complexity information is provided for at least one subset of the one or more SEI messages.

Embodiment 52: An apparatus for video decoding according to one of embodiments 51 wherein the one or more SEI messages are two or more SEI messages, wherein the processing order information comprises information on at least one of a smallest maximum complexity and a largest maximum complexity of processing a subset of the two or more SEI messages, wherein the smallest maximum complexity and the largest maximum complexity depend on a maximum complexity of a processing of different subsets of the two or more SEI messages, wherein the apparatus is configured to determine the smallest maximum complexity and the largest maximum complexity.

Embodiment 53: An apparatus for video decoding according to one of embodiments 47 to 52, wherein the complexity information in the PRO SEI message for the one or more Neural Network Post Filter SEI messages comprises one or more of the following:

a number of parameter values of the complexity information, a length of the parameter values of the complexity information, a data type of the parameter values of the complexity information (e.g., integer values or float or double values), a size of the complexity information (e.g., a size in kilobytes), a number of maximum number of multiply-accumulate operations, e.g., per sample.

Embodiment 54: An apparatus for video decoding according to one of embodiments 1 to 53, wherein the processing order information comprises additional processing information indicating if additional processing shall be processed before, between or after processing one or more SEI messages of the plurality of SEI messages or as an alternative to processing at least one SEI message of the plurality of SEI messages, wherein the apparatus is configured to process additional processing depending on the additional processing information.

Embodiment 55: An apparatus for video decoding, wherein the apparatus is configured to receive a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the apparatus is configured to determine the processing order information to obtain information on the processing order of the plurality of SEI messages, wherein the processing order information comprises additional processing information indicating if additional processing shall be processed before, between or after processing one or more SEI messages of the plurality of SEI messages or as an alternative to processing at least one of the plurality of SEI messages, wherein the apparatus is configured to process additional processing depending on the additional processing information.

Embodiment 56: An apparatus for video decoding according to embodiment 54 or wherein the additional processing information specifies that Video Usability Information needs to be processed before, between or after processing the one or more SEI messages or as an alternative to processing the at least one SEI message, wherein the apparatus is configured to process the Video Usability Information depending on the additional processing information.

Embodiment 57: An apparatus for video decoding according to one of embodiments 1 to 56, wherein the processing order information comprises information on a group of filters (e.g., NNPFs) or comprises one or more references to the information on the group of filters, wherein the apparatus is configured to apply one or more or all of the group of filters using the information on the group of filters.

Embodiment 58: An apparatus for video decoding, wherein the apparatus is configured to receive a video data stream having pictures of a video encoded thereinto, wherein the video data stream comprises a plurality of access units (AU), a plurality of SEI (supplemental enhancement information) messages and processing order information which defines a processing order of the plurality of SEI messages,
wherein the apparatus is configured to determine the processing order information to obtain information on the processing order of the plurality of SEI messages,
wherein the video data stream comprises information on a group of filters (e.g., NNPFs) or comprises one or more references to the information on the group of filters,
wherein the apparatus is configured to apply one or more or all of the group of filters using the information on the group of filters.

Embodiment 59: An apparatus for video decoding according to embodiment 57 or 58, wherein the group of filters is a group of image filters or video filters.

Embodiment 60: An apparatus for video decoding according to one of embodiments 57 to 59,
wherein the group of filters is a group of Neural Network Post Filters (NNPFs).

Embodiment 61. An apparatus for video decoding according to one of embodiments 57 to 60,
wherein the group of filters comprises two or more filters.

Embodiment 62: An apparatus for video decoding according to one of embodiments 57 to 61,
wherein the processing order information comprises a set of filter parameters,
wherein the apparatus is configured to determine one or more filter parameters of the set of filters, and is configured to apply the group of filters using the one or more filter parameters.

Embodiment 63: An apparatus for video decoding according to 62,
wherein the processing order information comprises for each filter of the group of filters a reference to those filter parameters of the set of filter parameters that apply for said filter.

Embodiment 64: An apparatus for video decoding according to embodiment 62 or 63,
wherein the set of filter parameters comprises at least one of a set of filter input parameters and a set of filter output parameters. (For example: input pictures to be used by the filter and whether for an input picture of a set of input pictures an output picture is generated by the filter.)

Embodiment 65: An apparatus for video decoding according to one of embodiments 1 to 64,
wherein the video data stream comprises a processing order message which comprises the processing order information.

Embodiment 66: An apparatus for video decoding according to embodiment 65,
wherein the processing order message is a processing order supplemental enhancement information (PRO SEI) message.

Embodiment 67: An apparatus for video decoding according to one of embodiments 1 to 66,
wherein the apparatus is configured to:
decode a current AU using inter-picture prediction from a referenced reference picture stored in the DPB to acquire a decoded picture, and to insert the decoded picture into the DPB,
assign to each reference picture stored in the DPB a classification as one of a short-term reference picture, a long-term reference picture and an unused-for-reference picture,
read DPB mode information from the current AU,
if the DPB mode information indicates a first mode, remove one or more reference pictures classified as a short-term picture, according to a first-in-first-out (FIFO) strategy, from the DPB,
if the DPB mode information indicates a second mode, read memory management control information comprising at least one command in the current AU and process the at least one command so as to change the classification assigned to at least one of the reference pictures stored in the DPB, and use the classification of the reference pictures in the DPB, for managing reference picture removal from the DPB.

Embodiment 68: An apparatus for video decoding according to embodiment 67,
wherein the apparatus is configured to read from the current AU an indication whether the decoded picture is not used for inter-picture prediction;
wherein the apparatus is configured to perform the insertion of the decoded picture into the DPB, if the decoded picture is not indicated to be not used for inter-picture prediction or not directly to be output, and directly output the decoded picture without buffering same in the DPB, if the decoded picture is indicated to be not used for inter-picture prediction and directly to be output.

Embodiment 69: An apparatus for video decoding according to embodiment 67 or 68,
wherein the apparatus is configured to assign a frame index to each reference picture in the DPB, classified to be a long-term picture, and
wherein the apparatus is configured to use a predetermined reference picture in the DPB, classified to be a long-term picture, as the referenced reference picture in the DPB if the frame index assigned to the predetermined reference picture is referred to in the current AU.

Embodiment 70: An apparatus for video decoding according to one of embodiments 67 to 69,
wherein the apparatus is configured to remove any reference picture from the DPB, which is classified as an unused-for-reference picture, and which is no longer to be output.

Embodiment 71: An apparatus for video decoding according to one of embodiments 1 to 70,
wherein the apparatus is configured to read an entropy coding mode indicator from the video data stream, and
wherein the apparatus is configured to decode prediction residual data from a current AU using a context adaptive variable length coding mode if the entropy coding mode indicator indicates the context adaptive variable length coding mode, and using a context adaptive binary arithmetic coding mode if the entropy coding mode indicator indicates the context adaptive binary arithmetic coding mode,
wherein the apparatus is configured to, in decoding the prediction residual data from the current AU using the context adaptive variable length coding mode, use:
a first syntax element indicating a total number of non-zero transform coefficient levels in a transform block,
a second syntax element indicating a total number of zero-valued transform coefficient levels in the transform block,
third syntax elements indicting a number of consecutive transform coefficient levels in a scan order with zero value from a current scan position onwards before a non-zero transform coefficient level is encountered,
one or more fourth syntax elements for each non-zero valued transform coefficient except trailing one transform coefficients, which one or more fourth syntax elements indicate a transform coefficient level value of the respective non-zero valued transform coefficient, and one or more fifth syntax elements indicating a sign of the trailing one transform coefficient levels.

Embodiment 72: An apparatus for video decoding according to one of embodiments 1 to 66,
- wherein the apparatus is configured such that one or more or all of the following applies:
- when PCM is enabled, the prediction, transform, quantization and entropy coding are bypassed, and the samples are directly represented by a pre-defined number of bits,
- when PCM is enabled, the number of bits (e.g., minus1) used for representing the luma and chroma samples are derived respectively,
- besides, the minimum block sizes and maximum block sizes (as a difference to the minimum) for 2N×2N blocks for which PCM can best used are derived,
- when a 2N×2N block is being parsed, if the sizes of that block are in between the described minimum and maximum values a flag indicates whether the PCM mode is used or not,
- when the PCM mode is used, the PCM samples are byte aligned and luma samples of the block are directly derived/parsed in raster scan with the indicated PCM luma bit length and afterwards the chroma samples of the PCM block are represented/parsed in raster scan with the indicated PCM chroma bit length, being the first half of the chroma samples Cb and the remaining Cr samples,
- the CABAC decoding engine is terminated every time PCM flag is parsed and initialized after the decoding PCM syntax.

Embodiment 73: An apparatus for video decoding according to one of embodiments 1 to 66 or according to embodiment 72,
- wherein the apparatus is configured such that one or more or all of the following applies:
- intra prediction only can only be predicted from neighbouring coding blocks coded using intra prediction modes,
- neighboring samples of inter prediction modes are derived as not available and are substituted such that,
- if all neighboring samples are not available the value 1<<(bitDepth−1) is used for all samples,
- if at least one neighboring sample is available a search is performed first for the neighboring samples on the left (starting from the bottom one) and then continuing with the neighboring samples above (starting from the left) until a first sample is found that is available,
- all non-available samples (because belonging to a inter mode block) are substituted with the found available neighboring sample for intra prediction, wherein this mode is also allowed for directional intra modes that are different than DC mode.

Embodiment 74: An apparatus for video decoding according to one of embodiments 1 to 66 or according to embodiment 72 or 73,
- wherein the apparatus is configured such that one or more or all of the following applies:
- the scan order of the coefficients in an intra coded block is dynamically changed based on the transform block sizes and intra modes,
- the scanning is carried out for each 4×4 subblocks/regions of the transform block (e.g., using only one coefficient region for the 4×4 transform block size, 4 coefficient regions for 8×8 transform blocks, 16 regions for 16×16 transform block size),
- the selection of the scanning method for intra modes is dependent on the transform block sizes. For transform block sizes of 16×16 and 32×32 the scanning is performed diagonally (starting at 0, 0->1, 0->0, 1->2, 0->1, 1->0, 2->3, 0 and so on—e.g. decreasing the y value and increasing the x value with step 1 at each step and when y equals 0 restarting with y having a value of x+1 and setting x to 0 while starting at value 0, 0),
- for transform block sizes of 4×4 (luma or chroma) and 8×8 (luma) the coefficient scanning order depends on the intra mode associated with a intra direction of the prediction of neighboring blocks,
- the vertical scan is used when the intra prediction direction is close to horizontal and the horizontal scan is used when the intra prediction direction is close to vertical,
- for other prediction directions, the diagonal up-right scan is used.

Embodiment 75: An apparatus for video decoding according to one of embodiments 1 to 66 or according to embodiment 72 or 73 or 74,
- wherein the apparatus is configured such that:
- for each coding unit, or coding block it can be derived whether both transform and quantization are bypassed indicating that the residual signal from inter- or intra-picture prediction is directly entropy coded for that block, wherein in that mode the in-loop filter is skipped.

Embodiment 76: An apparatus for video encoding, to encode a video into a video data stream,
- wherein the apparatus for video encoding is configured to encode pictures of a video into a video data stream in a coding order as a sequence of access units (AU),
- wherein the apparatus for video encoding is configured to generate the video data stream, such that the video data stream comprises a plurality of access units (AU), a plurality of SEI (supplemental enhancement information) messages and processing order information which defines a processing order of the plurality of SEI messages,
- wherein the apparatus for video encoding is configured to generate the video data stream, such that the processing order information defines one or more subsets of SEI messages, wherein each of the one or more subsets comprises one or more SEI messages of the plurality of SEI messages.

Embodiment 77: An apparatus for video encoding according to embodiment 76,
- wherein the apparatus for video encoding is configured to generate the video data stream, such that the processing order information comprises importance information (po_sei_importance_flag[i]; po_sei_importance_flag [numSEI]) for an SEI message of the one or more SEI messages of a subset of the one or more subsets, wherein the importance information for said SEI message indicates whether or not all SEI messages of said subset shall be ignored, if an apparatus for video decoding cannot interpret or understand said SEI message.

Embodiment 78: An apparatus for video encoding according to embodiment 77,
- wherein the apparatus for video encoding is configured to generate the video data stream, such that the importance information for said SEI message is an SEI message importance flag (po_sei_importance_flag[i]; po_sei_importance_flag[numSEI]).

Embodiment 79: An apparatus for video encoding according to embodiment 77 or 78,
  wherein the apparatus for video encoding is configured to generate the video data stream, such that said subset comprises said SEI message and one or more other SEI messages of the plurality of SEI messages,
  wherein the apparatus for video encoding is configured to generate the video data stream, such that the importance information for said SEI message indicates whether or not all SEI messages of said subset, comprising said SEI message and the one or more other SEI messages, shall be ignored, if the apparatus for video decoding cannot interpret or understand said SEI message.

Embodiment 80: An apparatus for video encoding according to one of embodiments 77 to 79,
  wherein the apparatus for video encoding is configured to generate the video data stream, such that the one or more subsets defined by the processing order information are two or more subsets,
  wherein the apparatus for video encoding is configured to generate the video data stream, such that the processing order information defines a processing order for the two or more subsets, such that said subset is succeeded by one or more further subsets of the two or more subsets in the processing order,
  wherein the apparatus for video encoding is configured to generate the video data stream, such that the importance information for said SEI message indicates whether or not all SEI messages of the subset, comprising said SEI message, and all SEI messages of all subsets of the two or more subsets, succeeding said subset in the processing order, shall be ignored, if the apparatus for video decoding cannot interpret or understand said SEI message and if the importance information for said SEI message indicates that all SEI messages of said subset shall be ignored in this case.

Embodiment 81: An apparatus for video encoding according to one of embodiments 77 to 79,
  wherein the apparatus for video encoding is configured to generate the video data stream, such that the one or more subsets defined by the processing order information are two or more subsets,
  wherein the apparatus for video encoding is configured to generate the video data stream, such that the processing order information defines a processing order for the two or more subsets, such that said subset is succeeded by one or more further subsets of the two or more subsets in the processing order,
  wherein the apparatus for video encoding is configured to generate the video data stream, such that the importance information for said SEI message does not indicate whether or not all SEI messages succeeding said subset in the processing order, shall be ignored, if the apparatus for video decoding cannot interpret or understand said SEI message and if the importance information for said SEI message indicates that all SEI messages of said subset shall be ignored in this case.

Embodiment 82: An apparatus for video encoding according to one of embodiments 77 to 79,
  wherein the apparatus for video encoding is configured to generate the video data stream, such that the one or more subsets defined by the processing order information are two or more subsets,
  wherein the apparatus for video encoding is configured to generate the video data stream, such that the processing order information defines one or more dependencies for the two or more subsets, such that each of the one or more dependencies defines that a second one of the two or more subsets depends on a first one of the two or more subsets,
  wherein the apparatus for video encoding is configured to generate the video data stream, such that the importance information for said SEI message indicates whether or not all SEI messages of the subset, comprising said SEI message, and all SEI messages of all subsets of the two or more subsets, which depend on said subset according to the one or more dependencies, shall be ignored, if the apparatus for video decoding cannot interpret or understand said SEI message and if the importance information for said SEI message indicates that all SEI messages of said subset shall be ignored in this case.

Embodiment 83: An apparatus for video encoding according to one of embodiments 77 to 79
  wherein the apparatus for video encoding is configured to generate the video data stream, such that the one or more subsets defined by the processing order information are two or more subsets,
  wherein the apparatus for video encoding is configured to generate the video data stream, such that the processing order information defines one or more valid subset combinations for the two or more subsets, such that each of the one or more valid subset combinations comprises at least two subsets of the two or more subsets,
  wherein the apparatus for video decoding is to invalidate each subset of the plurality of subsets, if the apparatus for video decoding cannot interpret or understand an SEI message of said subset and if the importance information for said SEI message indicates that all SEI messages of said subset shall be ignored in this case,
  wherein the apparatus for video encoding is configured to generate the video data stream, such that all SEI messages of any other subset of the two or more subsets shall also be ignored, if said other subset does not belong to a valid subset combination of the one or more valid subset combinations where none of the subsets of the valid subset combination has been invalidated.

Embodiment 84: An apparatus for video encoding according to one of embodiments 76 to 83,
  wherein the apparatus for video encoding is configured to generate the video data stream, such that the processing order information comprises an end of subset flag (po_end_of_subset_flag[i]) that indicates whether or not an SEI message of the plurality of SEI messages is a last SEI message of one of the one or more subsets.

Embodiment 85: An apparatus for video encoding according to one of embodiments 76 to 84,
  wherein the apparatus for video encoding is configured to generate the video data stream, such that the processing order information comprises an SEI number indication indicating a number of SEI messages of a subset of the one or more subsets.

Embodiment 86: An apparatus for video encoding according to one of embodiments 76 to 85,
  wherein the apparatus for video encoding is configured to generate the video data stream, such that the processing order information comprises a subset number indication indicating a number of subsets of the one or more subsets.

Embodiment 87: An apparatus for video encoding according to one of embodiments 76 to 86,
wherein the apparatus for video encoding is configured to generate the video data stream, such that the processing order information defines at least two subsets as the one or more subsets.

Embodiment 88: An apparatus for video encoding according to one of embodiments 76 to 87,
wherein the apparatus for video encoding is configured to generate the video data stream, such that the processing order information comprises information on an identifier (po_SEI_id[i]) for each SEI message of one or more SEI messages of the plurality of SEI messages, wherein the identifier of each SEI message of the one or more SEI messages is unique among the one or more SEI messages.

Embodiment 89: An apparatus for video encoding, to encode a video into a video data stream,
wherein the apparatus for video encoding is configured to encode pictures of a video into a video data stream in a coding order as a sequence of access units (AU),
wherein the apparatus for video encoding is configured to generate the video data stream, such that the video data stream comprises a plurality of access units (AU), a plurality of SEI (supplemental enhancement information) messages and processing order information which defines a processing order of the plurality of SEI messages,
wherein the processing order information comprises information on an identifier (po_SEI_id[i]) for each SEI message of one or more SEI messages of the plurality of SEI messages, wherein the identifier of each SEI message of the one or more SEI messages is unique among the one or more SEI messages.

Embodiment 90: An apparatus for video encoding according to embodiment 88 or 89,
wherein the apparatus for video encoding is configured to generate the video data stream, such that the information on the identifier (po_SEI_id[i]) for each SEI message of the one or more SEI messages depends on a type indicator (po_SEI_type[i]) indicating a type of said SEI message and depends on a unique type-specific identifier indicating an identifier for said SEI message being unique among all SEI messages of a said type.

Embodiment 91: An apparatus for video encoding according to one of embodiments 88 to 90,
wherein the apparatus for video encoding is configured to generate the video data stream, such that the video data stream comprises an indication indicating whether or not all of the plurality of SEI messages have a same type.

Embodiment 92: An apparatus for video encoding according to one of embodiments 88 to 91,
wherein the apparatus for video encoding is configured to generate the video data stream, such that the plurality of SEI messages comprises a first (POW, processing order wrapper) SEI message,
wherein the apparatus for video encoding is configured to generate the video data stream, such that the first SEI message comprises (e.g., wraps) a second SEI message of the plurality of SEI messages.

Embodiment 93: An apparatus for video encoding according to embodiment 92,
wherein the apparatus for video encoding is configured to generate the video data stream, such that the first SEI message comprises an identifier,
wherein the apparatus for video encoding is configured to generate the video data stream, such that the identifier of the first SEI message is the identifier for the second SEI message that identifies the second SEI message being comprised by the first SEI message.

Embodiment 94: An apparatus for video encoding according to one of embodiments 88 to 93,
wherein the apparatus for video encoding is configured to generate the video data stream, such that the plurality of SEI messages comprises a first (POW, processing order wrapper) SEI message,
wherein the apparatus for video encoding is configured to generate the video data stream, such that the first SEI message comprises an identifier (pow_id), which is the identifier for a second SEI message of the plurality of SEI messages that directly follows the first SEI message.

Embodiment 95: An apparatus for video encoding according to embodiment 94,
wherein the apparatus for video encoding is configured to generate the video data stream, such that, if the identifier (pow_id) identifies the second SEI message which directly follows the first SEI message, wherein the second SEI message is located in a same NAL unit as the first SEI message and no other SEI message is located between the first SEI message and the second SEI message which directly follows.

Embodiment 96: An apparatus for video encoding according to one of embodiments 92 to 95,
wherein the apparatus for video encoding is configured to generate the video data stream, such that the first SEI message comprises an indication (pow_included) indicating whether the identifier (pow_id) identifies the second SEI message which is wrapped within the first SEI message, or whether the identifier (pow_id) identifies the second SEI message which directly follows the first SEI message.

Embodiment 97: An apparatus for video encoding according to one of embodiments 92 to 96,
wherein the apparatus for video encoding is configured to generate the video data stream, such that the processing order information comprises a flag that indicates if an identifier (pow_id_in_wrapped_Sei_flag) for the first SEI message is to be found in the first SEI message itself or in the second SEI message being wrapped in the first SEI message or being identified by the first SEI message.

Embodiment 98: An apparatus for video encoding according to one of embodiments 92 to 97,
wherein the apparatus for video encoding is configured to generate the video data stream, such that the video data stream indicates that an apparatus for video decoding is configured to only process the first SEI message that is indicated by the processing order information and/or the second SEI message within the first SEI message, if the apparatus for video decoding can understand or interpret the processing order information.

Embodiment 99: An apparatus for video encoding according to one of embodiments 92 to 98,
wherein the apparatus for video encoding is configured to generate the video data stream, such that the first SEI message wraps or identifies at least two second SEI messages of the plurality of SEI messages.

Embodiment 100: An apparatus for video encoding according to embodiment 99,
wherein the apparatus for video encoding is configured to generate the video data stream, such that an order of the at least two second SEI messages in the first SEI message defines an order of processing.

Embodiment 101: An apparatus for video encoding according to one of embodiments 88 to 100,
  wherein the apparatus for video encoding is configured to generate the video data stream, such that the processing order information (e.g., a PRO SEI message) comprises the identifier of one of the plurality of SEI messages (e.g., another PRO SEI message) which comprises further processing order information.

Embodiment 101a: An apparatus for video encoding according to embodiment 101,
  wherein the apparatus for video encoding is configured to generate the video data stream, such that the further processing order information comprises importance information (po_sei_importance_flag[i]; po_sei_importance_flag[numSEI]) for an SEI message of the one or more SEI messages of the further processing order information, wherein the importance information for said SEI message indicates whether or not all SEI messages of said further processing order information shall be ignored, if the apparatus for video decoding cannot interpret or understand said SEI message.

Embodiment 102: An apparatus for video encoding according to one of embodiments 76 to 101a,
  wherein the apparatus for video encoding is configured to generate the video data stream, such that the processing order information comprises an indicator (po_sei_prefix_flag[i]) indicating at least one of:
  if an associated SEI message of the plurality of SEI messages is identified by a portion of bytes or by a portion of bits of the associated SEI message, if the plurality of SEI messages is identified by another unique identifier.

Embodiment 103: An apparatus for video encoding, to encode a video into a video data stream,
  wherein the apparatus for video encoding is configured to encode pictures of a video into a video data stream in a coding order as a sequence of access units (AU),
  wherein the apparatus for video encoding is configured to generate the video data stream, such that the video data stream comprises a plurality of access units (AU), a plurality of SEI (supplemental enhancement information) messages and processing order information which defines a processing order of the plurality of SEI messages,
  wherein the apparatus for video encoding is configured to generate the video data stream, such that the processing order information comprises an indicator (po_sei_prefix_flag[i]) indicating at least one of:
  if an associated SEI message of the plurality of SEI messages is identified by a portion of bytes or by a portion of bits of the associated SEI message,
  if the plurality of SEI messages is identified by another unique identifier.

Embodiment 104: An apparatus for video encoding according to embodiment 102 or 103,
  wherein the apparatus for video encoding is configured to generate the video data stream, such that the other unique identifier depends on a type indicator (po_SEI_type[i]) indicating a type of said SEI message and depends on a unique type-specific identifier indicating an identifier for said SEI message being unique among all SEI messages of a said type.

Embodiment 105: An apparatus for video encoding according to one of embodiments 102 to 104,
  wherein the apparatus for video encoding is configured to generate the video data stream, such that, if the indicator (po_sei_prefix_flag[i]) is present, the processing order information indicates a number of associated bytes (po_num_prefix_bytes[i]) or associated bits to identify an SEI message among the plurality of SEI messages.

Embodiment 106: An apparatus for video encoding according to embodiment 105,
  wherein the apparatus for video encoding is configured to generate the video data stream, such that the number of associated bytes or associated bits of the SEI message to identify the SEI message is located at a beginning of the SEI message; or
  wherein the apparatus for video encoding is configured to generate the video data stream, such that the number of associated bytes or associated bits of the SEI message to identify the SEI message is located at an end of the SEI message, or
  wherein the apparatus for video encoding is configured to generate the video data stream, such that the number of associated bytes or associated bits of the SEI message to identify the SEI message is not located at a beginning of the SEI message and is not located at the end of the SEI message.

Embodiment 107: An apparatus for video encoding according to one of embodiments 102 to 106,
  wherein the apparatus for video encoding is configured to generate the video data stream, such that the processing order information indicates that an SEI message of the plurality of SEI messages is identified by an identifier and indicates that said SEI message is also identified by a subset of bytes or by a subset of bits of said SEI message.

Embodiment 108: An apparatus for video encoding according to one of embodiments 102 to 106,
  wherein the apparatus for video encoding is configured to generate the video data stream, such that a variable indicates if an identification of an SEI message of the plurality of SEI messages is to be conducted using the identifier or is to be conducted using the subset of bytes or the subset of bits.

Embodiment 109: An apparatus for video encoding according to one of embodiments 102 to 108,
  wherein the apparatus for video encoding is configured to generate the video data stream, such that the processing order information indicates complexity information for one or more SEI messages of the plurality of SEI messages.

Embodiment 110: An apparatus for video decoding according to embodiment 109,
  wherein the apparatus for video encoding is configured to generate the video data stream, such that an SEI message of the plurality of SEI messages is a Neural Network Post Filter SEI message,
  wherein the apparatus for video encoding is configured to generate the video data stream, such that the complexity information depends on the Neural Network Post Filter SEI message.

Embodiment 111: An apparatus for video decoding according to one of embodiments 76 to 110,
  wherein the apparatus for video encoding is configured to generate the video data stream, such that the processing order information comprises subset information indicating a subset of bytes or a subset of bits of an SEI message of the plurality of SEI messages, wherein the apparatus for video encoding is configured to generate the video data stream, such that the processing order information comprises portion information which portions of the subset of bytes or of the subset of bits are used to identify the SEI message.

Embodiment 112: An apparatus for video encoding, to encode a video into a video data stream,
wherein the apparatus for video encoding is configured to encode pictures of a video into a video data stream in a coding order as a sequence of access units (AU),
wherein the apparatus for video encoding is configured to generate the video data stream, such that the video data stream comprises a plurality of access units (AU), a plurality of SEI (supplemental enhancement information) messages and processing order information which defines a processing order of the plurality of SEI messages,
wherein the apparatus for video encoding is configured to generate the video data stream, such that the processing order information comprises portion information which portions of the subset of bytes or of the subset of bits are used to identify the SEI message.

Embodiment 113: An apparatus for video encoding according to embodiment 111 or 112,
wherein the apparatus for video encoding is configured to generate the video data stream, such that the processing order information comprises an indication (po_SEI_prefix_complete_matching_flag[i]) indicating whether all of the subset of bytes or the subset of bits of the SEI message is to be used to identify the SEI message or whether only the portion of the subset of bytes or the subset of bits of the SEI message is to be used to identify the SEI message.

Embodiment 114: An apparatus for video encoding according to one of embodiments 111 to 113,
wherein the apparatus for video encoding is configured to generate the video data stream, such that the portion information comprises a length indication (po_num_prefix_matching_bits [i]) to indicate how many bytes or how many bits of the subset of bytes or of the subset of bits shall be used to identify the SEI message, if the processing order information indicates that only a portion of the subset of bytes or the subset of bits of the SEI is to be used to identify the SEI message.

Embodiment 115: An apparatus for video encoding according one of embodiments 111 to 114,
wherein the apparatus for video encoding is configured to generate the video data stream, such that the portion information comprises a masking pattern to indicate which fields or bytes or bits of the subset of bytes or of the subset of bits shall be used to identify the SEI message, if the processing order information indicates that only a portion of the subset of bytes or the subset of bits of the SEI is to be used to identify the SEI message.

Embodiment 116: An apparatus for video encoding according to one of embodiments 76 to 115,
wherein the processing order information comprises an identifier identifying another processing order information for referencing the other processing order information (e.g., such that said processing order information inherits said other processing order information, or, e.g., such that said other processing order information inherits said processing order information).

Embodiment 117: An apparatus for video encoding, to encode a video into a video data stream,
wherein the apparatus for video encoding is configured to encode pictures of a video into a video data stream in a coding order as a sequence of access units (AU),
wherein the apparatus for video encoding is configured to generate the video data stream, such that the video data stream comprises a plurality of access units (AU), a plurality of SEI (supplemental enhancement information) messages and processing order information which defines a processing order of the plurality of SEI messages,
wherein the apparatus for video encoding is configured to generate the video data stream, such that the processing order information comprises an identifier identifying another processing order information for referencing the other processing order information (e.g., such that said processing order information inherits said other processing order information, or, e.g., such that said other processing order information inherits said processing order information).

Embodiment 118: An apparatus for video encoding according to embodiment 116 or 117,
wherein the apparatus for video encoding is configured to generate the video data stream, such that a processing order of at least one SEI message of the plurality of SEI messages, which is comprised by (e.g., wrapped) or identified by the other processing order information depends on the processing order information which comprises the identifier that identifies said other processing order information.

Embodiment 119: An apparatus for video encoding according to one of embodiments 76 to 118,
wherein the processing order information assigns the processing order to said SEI message of the plurality of SEI messages
by indicating that the processing order of the SEI message is equal to the processing order of a previously indicated SEI message, or
by indicating that the processing order of the SEI message is one value higher than the processing order of the previously indicated SEI message, or
by indicating that the processing order of the SEI message is equal to the processing order of the previously indicated SEI message and only one of both SEI messages needs to be processed.

Embodiment 120: An apparatus for video encoding, to encode a video into a video data stream,
wherein the apparatus for video encoding is configured to encode pictures of a video into a video data stream in a coding order as a sequence of access units (AU),
wherein the apparatus for video encoding is configured to generate the video data stream, such that the video data stream comprises a plurality of access units (AU), a plurality of SEI (supplemental enhancement information) messages and processing order information which defines a processing order of the plurality of SEI messages,
wherein the apparatus for video encoding is configured to generate the video data stream, such that the processing order information assigns the processing order to said SEI message of the plurality of SEI messages
by indicating that the processing order of the SEI message is equal to the processing order of a previously indicated SEI message, or
by indicating that the processing order of the SEI message is one value higher than the processing order of the previously indicated SEI message, or by indicating that the processing order of the SEI message is equal to the processing order of the previously indicated SEI message and only one of both SEI messages needs to be processed.

Embodiment 121: An apparatus for video encoding according to embodiment 119 or 120,
- wherein the apparatus for video encoding is configured to generate the video data stream, such that the processing order information comprises a processing order indication (po_sei_processing_indication [i]) which indicates which of at least one of the following options applies for the SEI message:
- that the processing order of the SEI message is one value higher than the processing order of the previously indicated SEI message,
- that the processing order of the SEI message is equal to the processing order of a previously indicated SEI message, and that both SEI messages are not alternatives and shall both be processed,
- that the processing order of the SEI message is equal to the processing order of a previously indicated SEI message, and that both SEI messages are alternatives and that one of both SEI messages shall be processed,
- that the processing order of the SEI message is equal to the processing order of a previously indicated SEI message, and that only one of both SEI messages is active for a picture.

Embodiment 122: An apparatus for video encoding according to one of embodiments 76 to 121,
- wherein the apparatus for video encoding is configured to generate the video data stream, such that the processing order information comprises complexity information on a complexity of processing one or more SEI messages of the plurality of SEI messages.

Embodiment 123: An apparatus for video encoding, to encode a video into a video data stream,
- wherein the apparatus for video encoding is configured to encode pictures of a video into a video data stream in a coding order as a sequence of access units (AU),
- wherein the apparatus for video encoding is configured to generate the video data stream, such that the video data stream comprises a plurality of access units (AU), a plurality of SEI (supplemental enhancement information) messages and processing order information which defines a processing order of the plurality of SEI messages,
- wherein the apparatus for video encoding is configured to generate the video data stream, such that the processing order information comprises complexity information on a complexity of processing one or more SEI messages of the plurality of SEI messages.

Embodiment 124: An apparatus for video encoding according to embodiment 122 or 123,
- wherein the apparatus for video encoding is configured to generate the video data stream, such that the processing order information comprises information on one or more Neural Network Post Filter SEI messages of the plurality of SEI messages,
- wherein the apparatus for video encoding is configured to generate the video data stream, such that the complexity information comprises information on a complexity of processing the one or more Neural Network Post Filter SEI messages.

Embodiment 125: An apparatus for video encoding according to one of embodiments 122 to 124,
- wherein the apparatus for video encoding is configured to generate the video data stream, such that the video data stream comprises an indication on a maximum complexity for SEI message processing from the processing order of two or more SEI messages of the plurality of SEI messages.

Embodiment 126: An apparatus for video encoding according to embodiment 122 to 125,
- wherein the apparatus for video encoding is configured to generate the video data stream, such that the complexity information is provided for at least one subset of the one or more SEI messages.

Embodiment 127: An apparatus for video encoding according to one of embodiments 126,
- wherein the apparatus for video encoding is configured to generate the video data stream, such that the one or more SEI messages are two or more SEI messages,
- wherein the apparatus for video encoding is configured to generate the video data stream, such that the processing order information comprises information on at least one of a smallest maximum complexity and a largest maximum complexity of processing a subset of the two or more SEI messages, wherein the smallest maximum complexity and the largest maximum complexity depend on a maximum complexity of a processing of different subsets of the two or more SEI messages.

Embodiment 128: An apparatus for video encoding according to one of embodiments 122 to 127,
- wherein the apparatus for video encoding is configured to generate the video data stream, such that the complexity information in the PRO SEI message for the one or more Neural Network Post Filter SEI messages comprises one or more of the following:
- a number of parameter values of the complexity information,
- a length of the parameter values of the complexity information,
- a data type of the parameter values of the complexity information (e.g., integer values or float or double values),
- a size of the complexity information (e.g., a size in kilobytes),
- a number of maximum number of multiply-accumulate operations, e.g., per sample.

Embodiment 129: An apparatus for video encoding according to one of embodiments 76 to 128,
- wherein the apparatus for video encoding is configured to generate the video data stream, such that the processing order information comprises additional processing information indicating if additional processing shall be processed before, between or after processing one or more SEI messages of the plurality of SEI messages or as an alternative to processing at least one SEI message of the plurality of SEI messages.

Embodiment 130: An apparatus for video encoding, to encode a video into a video data stream,
- wherein the apparatus for video encoding is configured to encode pictures of a video into a video data stream in a coding order as a sequence of access units (AU),
- wherein the apparatus for video encoding is configured to generate the video data stream, such that the video data stream comprises a plurality of access units (AU), a plurality of SEI (supplemental enhancement information) messages and processing order information which defines a processing order of the plurality of SEI messages,
- wherein the apparatus for video encoding is configured to generate the video data stream, such that the processing order information comprises additional processing information indicating if additional processing shall be processed before, between or after processing one or more SEI messages of the plurality of SEI messages or as an alternative to processing at least one of the plurality of SEI messages.

Embodiment 131: An apparatus for video encoding according to embodiment 129 or 130,
wherein the apparatus for video encoding is configured to generate the video data stream, such that the additional processing information specifies that Video Usability Information needs to be processed before, between or after processing the one or more SEI messages or as an alternative to processing the at least one SEI message,
wherein the apparatus is configured to process the Video Usability Information depending on the additional processing information.

Embodiment 132: An apparatus for video encoding according to one of embodiments 76 to 131,
wherein the apparatus for video encoding is configured to generate the video data stream, such that the processing order information comprises information on a group of filters (e.g., NNPFs) or comprises one or more references to the information on the group of filters.

Embodiment 133: An apparatus for video encoding, to encode a video into a video data stream,
wherein the apparatus for video encoding is configured to encode pictures of a video into a video data stream in a coding order as a sequence of access units (AU),
wherein the apparatus for video encoding is configured to generate the video data stream, such that the video data stream comprises a plurality of access units (AU), a plurality of SEI (supplemental enhancement information) messages and processing order information which defines a processing order of the plurality of SEI messages,
wherein the apparatus for video encoding is configured to generate the video data stream, such that the video data stream comprises information on a group of filters (e.g., NNPFs) or comprises one or more references to the information on the group of filters.

Embodiment 134: An apparatus for video encoding according to embodiment 132 or 133,
wherein the apparatus for video encoding is configured to generate the video data stream, such that the group of filters is a group of image filters or video filters.

Embodiment 135: An apparatus for video encoding according to one of embodiments 132 to 134,
wherein the apparatus for video encoding is configured to generate the video data stream, such that the group of filters is a group of Neural Network Post Filters (NNPFs).

Embodiment 136: An apparatus for video encoding according to one of embodiments 132 to 135,
wherein the apparatus for video encoding is configured to generate the video data stream, such that the group of filters comprises two or more filters.

Embodiment 137: An apparatus for video encoding according to one of embodiments 132 to 136,
wherein the apparatus for video encoding is configured to generate the video data stream, such that the processing order information comprises a set of filter parameters.

Embodiment 138: An apparatus for video encoding according to 137,
wherein the apparatus for video encoding is configured to generate the video data stream, such that the processing order information comprises for each filter of the group of filters a reference to those filter parameters of the set of filter parameters that apply for said filter.

Embodiment 139: An apparatus for video encoding according to embodiment 137 or 138,
wherein the apparatus for video encoding is configured to generate the video data stream, such that the set of filter parameters comprises at least one of a set of filter input parameters and a set of filter output parameters.

Embodiment 140: An apparatus for video encoding according to one of embodiments 76 to 139,
wherein the apparatus for video encoding is configured to generate the video data stream, such that the video data stream comprises a processing order message which comprises the processing order information.

Embodiment 141: An apparatus for video encoding according to embodiment 140,
wherein the apparatus for video encoding is configured to generate the video data stream, such that the processing order message is a processing order supplemental enhancement information (PRO SEI) message.

Embodiment 142: An apparatus for video encoding according to one of embodiments 76 to 141,
wherein the apparatus for video encoding is configured to, in encoding the AUs,
encode a current picture using inter-picture prediction from a referenced reference picture stored in a DPB into a current AU, and
insert a decoded version of the current picture in the DPB into the DPB,
assign to each reference picture stored in the DPB a classification as one of a short-term reference picture, a long-term reference picture and an unused-for-reference picture,
write DPB mode information into the current AU,
if the DPB mode information indicates a first mode, remove one or more reference pictures classified as a short-term picture, according to a FIFO strategy, from the DPB,
if the DPB mode information indicates a second mode, write memory management control information comprising at least one command into the current AU, the command being instructive to change the classification assigned to at least one of the reference pictures stored in the DPB, wherein the classification of the reference pictures in the DPB, is used for managing reference picture removal from the DPB.

Embodiment 143: An apparatus for video encoding according to embodiment 142,
wherein the apparatus for video encoding is configured to write into the current AU an indication whether the decoded picture is not used for inter-picture prediction;
wherein the decoded picture is to be inserted into the DPB, if the decoded picture is not indicated to be not used for inter-picture prediction or not directly to be output, and the decoded picture is to be directly output without buffering same in the DPB, if the decoded picture is indicated to be not used for inter-picture prediction and directly to be output.

Embodiment 144: An apparatus for video encoding according to embodiment 142 or 143,
wherein a frame index is to be assigned to each reference picture in the CPB, classified to be a long-term picture, and
a predetermined reference picture in the CPB, classified to be a long-term picture, is to be used as the referenced reference picture in the DPB if the frame index assigned to the predetermined reference picture is referred to in the current AU.

Embodiment 145: An apparatus for video encoding according to one of embodiments 142 to 144,
  wherein any reference picture, which is classified as an unused-for-reference picture, and which is no longer to be output, is to be removed from the DPB.

Embodiment 146: An apparatus for video encoding according to one of embodiments 76 to 145,
  wherein the apparatus is configured to encode an entropy coding mode indicator into the video data stream, so that the entropy coding mode indicator indicates a context adaptive variable length coding mode or a context adaptive binary arithmetic coding mode and
  wherein the apparatus is configured to encode prediction residual data into a current AU using the context adaptive variable length coding mode if the entropy coding mode indicator indicates the context adaptive variable length coding mode, and using the context adaptive binary arithmetic coding mode if the entropy coding mode indicator indicates the context adaptive binary arithmetic coding mode,
  wherein the apparatus is configured to, in encoding the prediction residual data into the current AU using the context adaptive variable length coding mode, use
  a first syntax element indicating a total number of non-zero transform coefficient levels in a transform block,
  a second syntax element indicating a total number of zero-valued transform coefficient levels in the transform block,
  third syntax elements indicting a number of consecutive transform coefficient levels in a scan order with zero value from a current scan position onwards before a non-zero transform coefficient level is encountered,
  one or more fourth syntax elements for each non-zero valued transform coefficient except trailing one transform coefficients, which one or more fourth syntax elements indicate a transform coefficient level value of the respective non-zero valued transform coefficient, and
  one or more fifth syntax elements indicating a sign of the trailing one transform coefficient levels.

Embodiment 147: An apparatus for video encoding according to one of embodiments 76 to 141,
  wherein the apparatus for video encoding is configured to generate the video data stream, such that one or more or all of the following applies:
  when PCM is enabled, the prediction, transform, quantization and entropy coding are bypassed, and the samples are directly represented by a pre-defined number of bits,
  when PCM is enabled, the number of bits (e.g., minus1) used for representing the luma and chroma samples are indicated respectively,
  besides, the minimum block sizes and maximum block sizes (as a difference to the minimum) for 2N×2N blocks for which PCM can best used are indicated,
  when a 2N×2N block is being parsed, if the sizes of that block are in between the described minimum and maximum values a flag indicates whether the PCM mode is used or not,
  when the PCM mode is used, the PCM samples are byte aligned and luma samples of the block are directly represented/parsed in raster scan with the indicated PCM luma bit length and afterwards the chroma samples of the PCM block are represented/parsed in raster scan with the indicated PCM chroma bit length, being the first half of the chroma samples Cb and the remaining Cr samples,
  the CABAC decoding engine is terminated every time PCM flag is parsed and initialized after the decoding PCM syntax.

Embodiment 148. An apparatus for video encoding according to one of embodiments 76 to 141 or according to embodiment 147,
  wherein the apparatus for video encoding is configured to generate the video data stream, such that one or more or all of the following applies:
  intra prediction only can only be predicted from neighbouring coding blocks coded using intra prediction modes,
  neighboring samples of inter prediction modes are considered as not available and are substituted such that,
  if all neighboring samples are not available the value 1<<(bitDepth−1) is used for all samples,
  if at least one neighboring sample is available a search is performed first for the neighboring samples on the left (starting from the bottom one) and then continuing with the neighboring samples above (starting from the left) until a first sample is found that is available,
  all non-available samples (because belonging to a inter mode block) are substituted with the found available neighboring sample for intra prediction, wherein this mode is also allowed for directional intra modes that are different than DC mode.

Embodiment 149: An apparatus for video encoding according to one of embodiments 76 to 141 or according to embodiment 147 or 148,
  wherein the apparatus for video encoding is configured to generate the video data stream, such that one or more or all of the following applies:
  the scan order of the coefficients in an intra coded block is dynamically changed based on the transform block sizes and intra modes,
  the scanning is carried out for each 4×4 subblocks/regions of the transform block (e.g., using only one coefficient region for the 4×4 transform block size, 4 coefficient regions for 8×8 transform blocks, 16 regions for 16×16 transform block size),
  the selection of the scanning method for intra modes is dependent on the transform block sizes. For transform block sizes of 16×16 and 32×32 the scanning is performed diagonally (starting at 0, 0->1, 0->0, 1->2, 0->1, 1->0, 2->3, 0 and so on—e.g. decreasing the y value and increasing the x value with step 1 at each step and when y equals 0 restarting with y having a value of x+1 and setting x to 0 while starting at value 0, 0),
  for transform block sizes of 4×4 (luma or chroma) and 8×8 (luma) the coefficient scanning order depends on the intra mode associated with a intra direction of the prediction of neighboring blocks,
  the vertical scan is used when the intra prediction direction is close to horizontal and the horizontal scan is used when the intra prediction direction is close to vertical, for other prediction directions, the diagonal up-right scan is used.

Embodiment 150: An apparatus for video encoding according to one of embodiments 76 to 141 or according to embodiment 147 or 148 or 149,
  wherein the apparatus for video encoding is configured to generate the video data stream, such that:
  for each coding unit, or coding block it can be indicated whether both transform and quantization are bypassed indicating that the residual signal from inter- or intra-picture prediction is directly entropy coded for that block, wherein in that mode the in-loop filter is skipped.

Embodiment 151: A video data stream, having pictures of a video encoded thereinto,
wherein the video data stream comprises an encoding of pictures of a video in a coding order as a sequence of access units (AU),
wherein the video data stream comprises a plurality of access units (AU), a plurality of SEI (supplemental enhancement information) messages and processing order information which defines a processing order of the plurality of SEI messages,
wherein the processing order information defines one or more subsets of SEI messages, wherein each of the one or more subsets comprises one or more SEI messages of the plurality of SEI messages.

Embodiment 152: A video data stream according to embodiment 151,
wherein the processing order information comprises importance information (po_sei_importance_flag[i]; po_sei_importance_flag[numSEI]) for an SEI message of the one or more SEI messages of a subset of the one or more subsets, wherein the importance information for said SEI message indicates whether or not all SEI messages of said subset shall be ignored, if an apparatus for video decoding cannot interpret or understand said SEI message.

Embodiment 153: A video data stream according to embodiment 152,
wherein the importance information for said SEI message is an SEI message importance flag (po_sei_importance_flag[i]; po_sei_importance_flag[numSEI]).

Embodiment 154: A video data stream according to embodiment 152 or 153,
wherein said subset comprises said SEI message and one or more other SEI messages of the plurality of SEI messages,
wherein the importance information for said SEI message indicates whether or not all SEI messages of said subset, comprising said SEI message and the one or more other SEI messages, shall be ignored, if the apparatus for video decoding cannot interpret or understand said SEI message.

Embodiment 155: A video data stream according to one of embodiments 152 to 154,
wherein the one or more subsets defined by the processing order information are two or more subsets,
wherein the processing order information defines a processing order for the two or more subsets, such that said subset is succeeded by one or more further subsets of the two or more subsets in the processing order,
wherein the importance information for said SEI message indicates whether or not all SEI messages of the subset, comprising said SEI message, and all SEI messages of all subsets of the two or more subsets, succeeding said subset in the processing order, shall be ignored, if the apparatus for video decoding cannot interpret or understand said SEI message and if the importance information for said SEI message indicates that all SEI messages of said subset shall be ignored in this case.

Embodiment 156: A video data stream according to one of embodiments 152 to 154,
wherein the one or more subsets defined by the processing order information are two or more subsets,
wherein the processing order information defines a processing order for the two or more subsets, such that said subset is succeeded by one or more further subsets of the two or more subsets in the processing order,
wherein the importance information for said SEI message does not indicate whether or not all SEI messages succeeding said subset in the processing order, shall be ignored, if the apparatus for video decoding cannot interpret or understand said SEI message and if the importance information for said SEI message indicates that all SEI messages of said subset shall be ignored in this case.

Embodiment 157: A video data stream according to one of embodiments 152 to 154,
wherein the one or more subsets defined by the processing order information are two or more subsets,
wherein the processing order information defines one or more dependencies for the two or more subsets, such that each of the one or more dependencies defines that a second one of the two or more subsets depends on a first one of the two or more subsets,
wherein the importance information for said SEI message indicates whether or not all SEI messages of the subset, comprising said SEI message, and all SEI messages of all subsets of the two or more subsets, which depend on said subset according to the one or more dependencies, shall be ignored, if the apparatus for video decoding cannot interpret or understand said SEI message and if the importance information for said SEI message indicates that all SEI messages of said subset shall be ignored in this case.

Embodiment 158: A video data stream according to one of embodiments 152 to 154,
wherein the one or more subsets defined by the processing order information are two or more subsets,
wherein the processing order information defines one or more valid subset combinations for the two or more subsets, such that each of the one or more valid subset combinations comprises at least two subsets of the two or more subsets,
wherein the apparatus for video decoding is to invalidate each subset of the plurality of subsets, if the apparatus for video decoding cannot interpret or understand an SEI message of said subset and if the importance information for said SEI message indicates that all SEI messages of said subset shall be ignored in this case,
wherein all SEI messages of any other subset of the two or more subsets shall also be ignored, if said other subset does not belong to a valid subset combination of the one or more valid subset combinations where none of the subsets of the valid subset combination has been invalidated.

Embodiment 159: A video data stream according to one of embodiments 151 to 158,
wherein the processing order information comprises an end of subset flag (po_end_of_subset_flag[i]) that indicates whether or not an SEI message of the plurality of SEI messages is a last SEI message of one of the one or more subsets.

Embodiment 160: A video data stream according to one of embodiments 151 to 159,
wherein the processing order information comprises an SEI number indication indicating a number of SEI messages of a subset of the one or more subsets.

Embodiment 161: A video data stream according to one of embodiments 151 to 160, wherein the processing order information comprises a subset number indication indicating a number of subsets of the one or more subsets.

Embodiment 162: A video data stream according to one of embodiments 151 to 161,
  wherein the processing order information defines at least two subsets as the one or more subsets.

Embodiment 163: A video data stream according to one of embodiments 151 to 162,
  wherein the processing order information comprises information on an identifier (po_SEI_id[i]) for each SEI message of one or more SEI messages of the plurality of SEI messages, wherein the identifier of each SEI message of the one or more SEI messages is unique among the one or more SEI messages.

Embodiment 164: A video data stream, having pictures of a video encoded thereinto,
  wherein the video data stream comprises an encoding of pictures of a video in a coding order as a sequence of access units (AU),
  wherein the video data stream comprises a plurality of access units (AU), a plurality of SEI (supplemental enhancement information) messages and processing order information which defines a processing order of the plurality of SEI messages,
  wherein the processing order information comprises information on an identifier (po_SEI_id[i]) for each SEI message of one or more SEI messages of the plurality of SEI messages, wherein the identifier of each SEI message of the one or more SEI messages is unique among the one or more SEI messages.

Embodiment 165: A video data stream according to embodiment 163 or 164,
  wherein the information on the identifier (po_SEI_id[i]) for each SEI message of the one or more SEI messages depends on a type indicator (po_SEI_type[i]) indicating a type of said SEI message and depends on a unique type-specific identifier indicating an identifier for said SEI message being unique among all SEI messages of a said type.

Embodiment 166: A video data stream according to one of embodiments 163 to 165,
  wherein the video data stream comprises an indication indicating whether or not all of the plurality of SEI messages have a same type.

Embodiment 167: A video data stream according to one of embodiments 163 to 166,
  wherein the plurality of SEI messages comprises a first (POW, processing order wrapper) SEI message,
  wherein the first SEI message comprises (e.g., wraps) a second SEI message of the plurality of SEI messages.

Embodiment 168: A video data stream according to embodiment 167,
  wherein the first SEI message comprises an identifier,
  wherein the identifier of the first SEI message is the identifier for the second SEI message that identifies the second SEI message being comprised by the first SEI message.

Embodiment 169: A video data stream according to one of embodiments 163 to 168,
  wherein the plurality of SEI messages comprises a first (POW, processing order wrapper) SEI message,
  wherein the first SEI message comprises an identifier (pow_id), which is the identifier for a second SEI message of the plurality of SEI messages that directly follows the first SEI message.

Embodiment 170: A video data stream according to embodiment 169,
  wherein, if the identifier (pow_id) identifies the second SEI message which directly follows the first SEI message, wherein the second SEI message is located in a same NAL unit as the first SEI message and no other SEI message is located between the first SEI message and the second SEI message which directly follows.

Embodiment 171: A video data stream according to one of embodiments 167 to 170,
  wherein the first SEI message comprises an indication (pow_included) indicating whether the identifier (pow_id) identifies the second SEI message which is wrapped within the first SEI message, or whether the identifier (pow_id) identifies the second SEI message which directly follows the first SEI message.

Embodiment 172: A video data stream according to one of embodiments 167 to 171,
  wherein the processing order information comprises a flag that indicates if an identifier (pow_id_in_wrapped_Sei_flag) for the first SEI message is to be found in the first SEI message itself or in the second SEI message being wrapped in the first SEI message or being identified by the first SEI message.

Embodiment 173: A video data stream according to one of embodiments 167 to 172,
  wherein the video data stream indicates that an apparatus for video decoding is configured to only process the first SEI message that is indicated by the processing order information and/or the second SEI message within the first SEI message, if the apparatus for video decoding can understand or interpret the processing order information.

Embodiment 174: A video data stream according to one of embodiments 167 to 173,
  wherein the first SEI message wraps or identifies at least two second SEI messages of the plurality of SEI messages.

Embodiment 175: A video data stream according to embodiment 174,
  wherein an order of the at least two second SEI messages in the first SEI message defines an order of processing.

Embodiment 176: A video data stream according to one of embodiments 167 to 175,
  wherein the processing order information (e.g., a PRO SEI message) comprises the identifier of one of the plurality of SEI messages (e.g., another PRO SEI message) which comprises further processing order information.

Embodiment 176a: A video data stream according to claim 176,
  wherein the further processing order information comprises importance information (po_sei_importance_flag[i]; po_sei_importance_flag[numSEI]) for an SEI message of the one or more SEI messages of the further processing order information, wherein the importance information for said SEI message indicates whether or not all SEI messages of said further processing order information shall be ignored, if the apparatus for video decoding cannot interpret or understand said SEI message.

Embodiment 177: A video data stream according to one of embodiments 151 to 176a,
  wherein the processing order information comprises an indicator (po_sei_prefix_flag[i]) indicating at least one of:

if an associated SEI message of the plurality of SEI messages is identified by a portion of bytes or by a portion of bits of the associated SEI message, if the plurality of SEI messages is identified by another unique identifier.

Embodiment 178: A video data stream, having pictures of a video encoded thereinto, wherein the video data stream comprises an encoding of pictures of a video in a coding order as a sequence of access units (AU), wherein the video data stream comprises a plurality of access units (AU), a plurality of SEI (supplemental enhancement information) messages and processing order information which defines a processing order of the plurality of SEI messages, wherein the processing order information comprises an indicator (po_sei_prefix_flag[i]) indicating at least one of:

if an associated SEI message of the plurality of SEI messages is identified by a portion of bytes or by a portion of bits of the associated SEI message, if the plurality of SEI messages is identified by another unique identifier.

Embodiment 179: A video data stream according to embodiment 177 or 178, wherein the other unique identifier depends on a type indicator (po_SEI_type[i]) indicating a type of said SEI message and depends on a unique type-specific identifier indicating an identifier for said SEI message being unique among all SEI messages of a said type.

Embodiment 180: A video data stream according to one of embodiments 177 to 179, wherein, if the indicator (po_sei_prefix_flag[i]) is present, the processing order information indicates a number of associated bytes (po_num_prefix_bytes[i]) or associated bits to identify an SEI message among the plurality of SEI messages.

Embodiment 181: A video data stream according to embodiment 180, wherein the number of associated bytes or associated bits of the SEI message to identify the SEI message is located at a beginning of the SEI message; or wherein the number of associated bytes or associated bits of the SEI message to identify the SEI message is located at an end of the SEI message, or wherein the number of associated bytes or associated bits of the SEI message to identify the SEI message is not located at a beginning of the SEI message and is not located at the end of the SEI message.

Embodiment 182: A video data stream according to one of embodiments 177 to 181, wherein the processing order information indicates that an SEI message of the plurality of SEI messages is identified by an identifier and indicates that said SEI message is also identified by a subset of bytes or by a subset of bits of said SEI message.

Embodiment 183: A video data stream according to one of embodiments 177 to 181, wherein a variable indicates if an identification of an SEI message of the plurality of SEI messages is to be conducted using the identifier or is to be conducted using the subset of bytes or the subset of bits.

Embodiment 184: A video data stream according to one of embodiments 177 to 183, wherein the processing order information indicates complexity information for one or more SEI messages of the plurality of SEI messages.

Embodiment 185: A video data stream according to embodiment 184, wherein an SEI message of the plurality of SEI messages is a Neural Network Post Filter SEI message, wherein the complexity information depends on the Neural Network Post Filter SEI message.

Embodiment 186: A video data stream according to one of embodiments 151 to 185, wherein the processing order information comprises subset information indicating a subset of bytes or a subset of bits of an SEI message of the plurality of SEI messages, wherein the processing order information comprises portion information which portions of the subset of bytes or of the subset of bits are used to identify the SEI message.

Embodiment 187: A video data stream, having pictures of a video encoded thereinto, wherein the video data stream comprises an encoding of pictures of a video in a coding order as a sequence of access units (AU), wherein the video data stream comprises a plurality of access units (AU), a plurality of SEI (supplemental enhancement information) messages and processing order information which defines a processing order of the plurality of SEI messages, wherein the processing order information comprises portion information which portions of the subset of bytes or of the subset of bits are used to identify the SEI message.

Embodiment 188: A video data stream according to embodiment 186 or 187, wherein the processing order information comprises an indication (po_SEI_prefix_complete_matching_flag [i]) indicating whether all of the subset of bytes or the subset of bits of the SEI message is to be used to identify the SEI message or whether only the portion of the subset of bytes or the subset of bits of the SEI message is to be used to identify the SEI message.

Embodiment 189: A video data stream according to one of embodiments 186 to 188, wherein the portion information comprises a length indication (po_num_prefix_matching_bits [i]) to indicate how many bytes or how many bits of the subset of bytes or of the subset of bits shall be used to identify the SEI message, if the processing order information indicates that only a portion of the subset of bytes or the subset of bits of the SEI is to be used to identify the SEI message.

Embodiment 190: A video data stream according one of embodiments 186 to 189, wherein the portion information comprises a masking pattern to indicate which fields or bytes or bits of the subset of bytes or of the subset of bits shall be used to identify the SEI message, if the processing order information indicates that only a portion of the subset of bytes or the subset of bits of the SEI is to be used to identify the SEI message.

Embodiment 191: A video data stream according to one of embodiments 151 to 190, wherein the processing order information comprises an identifier identifying another processing order information for referencing the other processing order information (e.g., such that said processing order information inherits said other processing order information, or, e.g., such that said other processing order information inherits said processing order information.

Embodiment 192: A video data stream, having pictures of a video encoded thereinto,
  wherein the video data stream comprises an encoding of pictures of a video in a coding order as a sequence of access units (AU),
  wherein the video data stream comprises a plurality of access units (AU), a plurality of SEI (supplemental enhancement information) messages and processing order information which defines a processing order of the plurality of SEI messages,
  wherein the processing order information comprises an identifier identifying another processing order information for referencing the other processing order information (e.g., such that said processing order information inherits said other processing order information, or, e.g., such that said other processing order information inherits said processing order information).

Embodiment 193: A video data stream according to embodiment 191 or 192,
  wherein a processing order of at least one SEI message of the plurality of SEI messages, which is comprised by (e.g., wrapped) or identified by the other processing order information depends on the processing order information which comprises the identifier that identifies said other processing order information.

Embodiment 194: A video data stream according to one of embodiments 151 to 193,
  wherein the processing order information assigns the processing order to said SEI message of the plurality of SEI messages
  by indicating that the processing order of the SEI message is equal to the processing order of a previously indicated SEI message, or
  by indicating that the processing order of the SEI message is one value higher than the processing order of the previously indicated SEI message, or
  by indicating that the processing order of the SEI message is equal to the processing order of the previously indicated SEI message and only one of both SEI messages needs to be processed.

Embodiment 195: A video data stream, having pictures of a video encoded thereinto,
  wherein the video data stream comprises an encoding of pictures of a video in a coding order as a sequence of access units (AU),
  wherein the video data stream comprises a plurality of access units (AU), a plurality of SEI (supplemental enhancement information) messages and processing order information which defines a processing order of the plurality of SEI messages,
  wherein the processing order information assigns the processing order to said SEI message of the plurality of SEI messages
  by indicating that the processing order of the SEI message is equal to the processing order of a previously indicated SEI message, or
  by indicating that the processing order of the SEI message is one value higher than the processing order of the previously indicated SEI message, or
  by indicating that the processing order of the SEI message is equal to the processing order of the previously indicated SEI message and only one of both SEI messages needs to be processed.

Embodiment 196: A video data stream according to embodiment 194 or 195,
  wherein the processing order information comprises a processing order indication (po_sei_processing_indication [i]) which indicates which of at least one of the following options applies for the SEI message:
    that the processing order of the SEI message is one value higher than the processing order of the previously indicated SEI message,
    that the processing order of the SEI message is equal to the processing order of a previously indicated SEI message, and that both SEI messages are not alternatives and shall both be processed,
    that the processing order of the SEI message is equal to the processing order of a previously indicated SEI message, and that both SEI messages are alternatives and that one of both SEI messages shall be processed,
    that the processing order of the SEI message is equal to the processing order of a previously indicated SEI message, and that only one of both SEI messages is active for a picture.

Embodiment 197: A video data stream according to one of embodiments 151 to 196,
  wherein the processing order information comprises complexity information on a complexity of processing one or more SEI messages of the plurality of SEI messages.

Embodiment 198: A video data stream, having pictures of a video encoded thereinto,
  wherein the video data stream comprises an encoding of pictures of a video in a coding order as a sequence of access units (AU),
  wherein the video data stream comprises a plurality of access units (AU), a plurality of SEI (supplemental enhancement information) messages and processing order information which defines a processing order of the plurality of SEI messages,
  wherein the processing order information comprises complexity information on a complexity of processing one or more SEI messages of the plurality of SEI messages.

Embodiment 199: A video data stream according to embodiment 197 or 198,
  wherein the processing order information comprises information on one or more Neural Network Post Filter SEI messages of the plurality of SEI messages,
  wherein the complexity information comprises information on a complexity of processing the one or more Neural Network Post Filter SEI messages.

Embodiment 200: A video data stream according to one of embodiments 197 to 199,
  wherein the video data stream comprises an indication on a maximum complexity for SEI message processing from the processing order of two or more SEI messages of the plurality of SEI messages.

Embodiment 201: A video data stream according to embodiment 197 to 200,
  wherein the complexity information is provided for at least one subset of the one or more SEI messages.

Embodiment 202: A video data stream according to one of embodiments 201,
  wherein the one or more SEI messages are two or more SEI messages,
  wherein the processing order information comprises information on at least one of a smallest maximum complexity and a largest maximum complexity of processing a subset of the two or more SEI messages, wherein the smallest maximum complexity and the largest maximum complexity depend on a maximum complexity of a processing of different subsets of the two or more SEI messages.

Embodiment 203: A video data stream according to one of embodiments 197 to 202, wherein the complexity information in the PRO SEI message for the one or more Neural Network Post Filter SEI messages comprises one or more of the following:
a number of parameter values of the complexity information,
a length of the parameter values of the complexity information,
a data type of the parameter values of the complexity information (e.g., integer values or float or double values),
a size of the complexity information (e.g., a size in kilobytes),
a number of maximum number of multiply-accumulate operations, e.g., per sample.

Embodiment 204: A video data stream according to one of embodiments 151 to 203,
wherein the processing order information comprises additional processing information indicating if additional processing shall be processed before, between or after processing one or more SEI messages of the plurality of SEI messages or as an alternative to processing at least one SEI message of the plurality of SEI messages.

Embodiment 205: A video data stream, having pictures of a video encoded thereinto,
wherein the video data stream comprises an encoding of pictures of a video in a coding order as a sequence of access units (AU),
wherein the video data stream comprises a plurality of access units (AU), a plurality of SEI (supplemental enhancement information) messages and processing order information which defines a processing order of the plurality of SEI messages,
wherein the processing order information comprises additional processing information indicating if additional processing shall be processed before, between or after processing one or more SEI messages of the plurality of SEI messages or as an alternative to processing at least one of the plurality of SEI messages.

Embodiment 206: A video data stream according to embodiment 204 or 205,
wherein the additional processing information specifies that Video Usability Information needs to be processed before, between or after processing the one or more SEI messages or as an alternative to processing the at least one SEI message,
wherein the apparatus is configured to process the Video Usability Information depending on the additional processing information.

Embodiment 207: A video data stream according to one of embodiments 151 to 206,
wherein the processing order information comprises information on a group of filters (e.g., NNPFs) or comprises one or more references to the information on the group of filters.

Embodiment 208: A video data stream, having pictures of a video encoded thereinto,
wherein the video data stream comprises an encoding of pictures of a video in a coding order as a sequence of access units (AU),
wherein the video data stream comprises a plurality of access units (AU), a plurality of SEI (supplemental enhancement information) messages and processing order information which defines a processing order of the plurality of SEI messages,
wherein the video data stream comprises information on a group of filters (e.g., NNPFs) or comprises one or more references to the information on the group of filters.

Embodiment 209: A video data stream according to embodiment 207 or 208, wherein the group of filters is a group of image filters or video filters.

Embodiment 210: A video data stream according to one of embodiments 207 to 209,
wherein the group of filters is a group of Neural Network Post Filters (NNPFs).

Embodiment 211: A video data stream according to one of embodiments 207 to 210,
wherein the group of filters comprises two or more filters.

Embodiment 212: A video data stream according to one of embodiments 207 to 211,
wherein the processing order information comprises a set of filter parameters.

Embodiment 213: A video data stream according to 212,
wherein the processing order information comprises for each filter of the group of filters a reference to those filter parameters of the set of filter parameters that apply for said filter.

Embodiment 214: A video data stream according to embodiment 212 or 213,
wherein the set of filter parameters comprises at least one of a set of filter input parameters and a set of filter output parameters.

Embodiment 215: A video data stream according to one of embodiments 151 to 214,
wherein the video data stream comprises a processing order message which comprises the processing order information.

Embodiment 216: A video data stream according to embodiment 215,
wherein the processing order message is a processing order supplemental enhancement information (PRO SEI) message.

Embodiment 217: A video data stream according to one of embodiments 151 to 116.
wherein, in encoding the AUs, the video is encoded into the video data stream by
encoding a current picture using inter-picture prediction from a referenced reference picture stored in a DPB into a current AU, and
inserting a decoded version of the current picture in the DPB into the DPB,
assigning to each reference picture stored in the DPB a classification as one of a short-term reference picture, a long-term reference picture and an unused-for-reference picture,
writing DPB mode information into the current AU,
if the DPB mode information indicates a first mode, removing one or more reference pictures classified as a short-term picture, according to a FIFO strategy, from the DPB,
if the DPB mode information indicates a second mode, writing memory management control information comprising at least one command into the current AU, the command being instructive to change the classification assigned to at least one of the reference pictures stored in the DPB, wherein the classification of the reference pictures in the DPB, is used for managing reference picture removal from the DPB.

Embodiment 218: A video data stream according to embodiment 217,
  wherein the video is encoded into the video data stream by writing into the current AU an indication whether the decoded picture is not used for inter-picture prediction;
  wherein the decoded picture is to be inserted into the DPB, if the decoded picture is not indicated to be not used for inter-picture prediction or not directly to be output, and the decoded picture is to be directly output without buffering same in the DPB, if the decoded picture is indicated to be not used for inter-picture prediction and directly to be output.

Embodiment 219: A video data stream according to embodiment 217 or 218,
  wherein a frame index is to be assigned to each reference picture in the CPB, classified to be a long-term picture, and
  a predetermined reference picture in the CPB, classified to be a long-term picture, is to be used as the referenced reference picture in the DPB if the frame index assigned to the predetermined reference picture is referred to in the current AU.

Embodiment 220: A video data stream according to one of embodiments 217 to 219,
  wherein any reference picture, which is classified as an unused-for-reference picture, and which is no longer to be output, is to be removed from the DPB.

Embodiment 221: A video data stream according to one of embodiments 151 to 220,
  wherein the video is encoded into the video data stream by
  encoding an entropy coding mode indicator into the video data stream, so that the entropy coding mode indicator indicates a context adaptive variable length coding mode or a context adaptive binary arithmetic coding mode and
  encoding prediction residual data into a current AU using the context adaptive variable length coding mode if the entropy coding mode indicator indicates the context adaptive variable length coding mode, and using the context adaptive binary arithmetic coding mode if the entropy coding mode indicator indicates the context adaptive binary arithmetic coding mode,
  wherein the encoding the prediction residual data into the current AU using the context adaptive variable length coding mode comprises using:
  a first syntax element indicating a total number of non-zero transform coefficient levels in a transform block,
  a second syntax element indicating a total number of zero-valued transform coefficient levels in the transform block,
  third syntax elements indicting a number of consecutive transform coefficient levels in a scan order with zero value from a current scan position onwards before a non-zero transform coefficient level is encountered,
  one or more fourth syntax elements for each non-zero valued transform coefficient except trailing one transform coefficients, which one or more fourth syntax elements indicate a transform coefficient level value of the respective non-zero valued transform coefficient, and
  one or more fifth syntax elements indicating a sign of the trailing one transform coefficient levels.

Embodiment 222: A video data stream according to one of embodiments 151 to 216,
  wherein the video is encoded into the video data stream, such that one or more or all of the following applies:
  when PCM is enabled, the prediction, transform, quantization and entropy coding are bypassed, and the samples are directly represented by a pre-defined number of bits,
  when PCM is enabled, the number of bits (e.g., minus1) used for representing the luma and chroma samples are indicated respectively,
  besides, the minimum block sizes and maximum block sizes (as a difference to the minimum) for 2N×2N blocks for which PCM can best used are indicated,
  when a 2N×2N block is being parsed, if the sizes of that block are in between the described minimum and maximum values a flag indicates whether the PCM mode is used or not,
  when the PCM mode is used, the PCM samples are byte aligned and luma samples of the block are directly represented/parsed in raster scan with the indicated PCM luma bit length and afterwards the chroma samples of the PCM block are represented/parsed in raster scan with the indicated PCM chroma bit length, being the first half of the chroma samples Cb and the remaining Cr samples,
  the CABAC decoding engine is terminated every time PCM flag is parsed and initialized after the decoding PCM syntax Embodiment 223: A video data stream according to one of embodiments 151 to 216 or according to embodiment 222,
  wherein the video is encoded into the video data stream, such that one or more or all of the following applies:
  intra prediction only can only be predicted from neighbouring coding blocks coded using intra prediction modes,
  neighboring samples of inter prediction modes are considered as not available and are substituted such that,
  if all neighboring samples are not available the value 1<<(bitDepth−1) is used for all samples,
  if at least one neighboring sample is available a search is performed first for the neighboring samples on the left (starting from the bottom one) and then continuing with the neighboring samples above (starting from the left) until a first sample is found that is available,
  all non-available samples (because belonging to a inter mode block) are substituted with the found available neighboring sample for intra prediction, wherein this mode is also allowed for directional intra modes that are different than DC mode.

Embodiment 224: A video data stream according to one of embodiments 151 to 216 or according to embodiment 222 or 223,
  wherein the video is encoded into the video data stream, such that one or more or all of the following applies:
  the scan order of the coefficients in an intra coded block is dynamically changed based on the transform block sizes and intra modes,
  the scanning is carried out for each 4×4 subblocks/regions of the transform block (e.g., using only one coefficient region for the 4×4 transform block size, 4 coefficient regions for 8×8 transform blocks, 16 regions for 16×16 transform block size),
  the selection of the scanning method for intra modes is dependent on the transform block sizes. For transform block sizes of 16×16 and 32×32 the scanning is performed diagonally (starting at 0, 0->1, 0->0, 1->2, 0->1, 1->0, 2->3, 0 and so on—e.g. decreasing the y value and increasing the x value with step 1 at each step and when y equals 0 restarting with y having a value of x+1 and setting x to 0 while starting at value 0, 0), for transform block sizes of 4×4 (luma or chroma) and 8×8 (luma) the coefficient scanning order depends on the intra mode associated with a intra direction of the prediction of neighboring blocks, the vertical scan is used when the intra prediction direction is close to horizontal and the horizontal scan is used when the intra prediction direction is close to vertical, for other prediction directions, the diagonal up-right scan is used.

Embodiment 225: A video data stream according to one of embodiments 151 to 216 or according to embodiment 222 or 223 or 224 wherein the video is encoded into the video data stream, such that:

for each coding unit, or coding block it can be indicated whether both transform and quantization are bypassed indicating that the residual signal from inter- or intra-picture prediction is directly entropy coded for that block, wherein in that mode the in-loop filter is skipped.

Embodiment 226: A non-transitory computer readable medium comprising the video data stream according to one of embodiments 151 to 225.

Embodiment 227: A method for video decoding, wherein the method comprises receiving a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the method comprises determining the processing order information to obtain information on the processing order of the plurality of SEI messages, wherein the processing order information defines one or more subsets of SEI messages, wherein each of the one or more subsets comprises one or more SEI messages of the plurality of SEI messages, wherein the method comprises processing the plurality of SEI messages depending on the information on the one or more subsets defined by the processing order information.

Embodiment 228: A method for video decoding, wherein the method comprises receiving a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the method comprises determining the processing order information to obtain information on the processing order of the plurality of SEI messages, wherein the processing order information comprises information on an identifier (po_SEI_id[i]) for each SEI message of two or more SEI messages of the plurality of SEI messages, wherein the identifier of each SEI message of the two or more SEI messages is unique among the two or more SEI messages.

Embodiment 229: A method for video decoding, wherein the method comprises receiving a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the method comprises determining the processing order information to obtain information on the processing order of the plurality of SEI messages, wherein the processing order information comprises an indicator (po_sei_prefix_flag[i]) indicating whether an associated SEI message of the plurality of SEI messages is identified by a portion of bytes or by a portion of bits of the associated SEI message, or whether the plurality of SEI messages is identified by another unique identifier, wherein the method comprises analyzing said indicator.

Embodiment 230: A method for video decoding, wherein the method comprises receiving a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the method comprises determining the processing order information to obtain information on the processing order of the plurality of SEI messages, wherein the processing order information comprises subset information indicating a subset of bytes or a subset of bits of an SEI message of the plurality of SEI messages, wherein the processing order information comprises portion information which portions of the subset of bytes or of the subset of bits are used to identify the SEI message, wherein the method comprises analyzing the subset information and the portion information.

Embodiment 231: A method for video decoding, wherein the method comprises receiving a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the method comprises determining the processing order information to obtain information on the processing order of the plurality of SEI messages, wherein the processing order information comprises an identifier identifying another processing order information for referencing the other processing order information (e.g., such that said processing order information inherits said other processing order information, or, e.g., such that said other processing order information inherits said processing order information);

wherein the method comprises determining from the processing order information the identifier identifying the other processing order information.

Embodiment 232: A method for video decoding, wherein the method comprises receiving a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the method comprises determining the processing order information to obtain information on the processing order of the plurality of SEI messages, wherein the processing order information assigns the processing order to said SEI message of the plurality of SEI messages by indicating that the processing order of the SEI message is equal to the processing order of a previously indicated SEI message, or by indicating that the processing order of the SEI message is one value higher than the processing order of the previously indicated SEI message, or by indicating that the processing order of the SEI message is equal to the processing order of the previously indicated SEI message and only one of both SEI messages needs to be processed;

wherein the method comprises determining from the processing order information the processing order of said SEI message.

Embodiment 233: A method for video decoding, wherein the method comprises receiving a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the method comprises determining the processing order information to obtain information on the processing order of the plurality of SEI messages, wherein the processing order information comprises complexity information on a complexity of processing one or more SEI messages of the plurality of SEI messages, wherein the method comprises determining the information on the complexity of processing the one or more SEI messages from the processing order information.

Embodiment 234: A method for video decoding, wherein the method comprises receiving a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the method comprises determining the processing order information to obtain information on the processing order of the plurality of SEI messages, wherein the processing order information comprises additional processing information indicating if additional processing shall be processed before, between or after processing one or more SEI messages of the plurality of SEI messages or as an alternative to processing at least one of the plurality of SEI messages, wherein the method comprises processing additional processing depending on the additional processing information.

Embodiment 235: A method for video decoding, wherein the method comprises receiving a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the method comprises determining the processing order information to obtain information on the processing order of the plurality of SEI messages, wherein the processing order information comprises information on a group of filters (e.g., NNPFs) or comprises one or more references to the information on the group of filters, wherein the method comprises applying one or more or all of the group of filters using the information on the group of filters.

Embodiment 236: A method for video encoding, to encode a video into a video data stream, wherein the method comprises encoding pictures of a video into a video data stream in a coding order as a sequence of access units (AU), wherein the method comprises generating the video data stream, such that the video data stream comprises a plurality of access units (AU), a plurality of SEI (supplemental enhancement information) messages and processing order information which defines a processing order of the plurality of SEI messages, wherein the method comprises generating the video data stream, such that the processing order information defines one or more subsets of SEI messages, wherein each of the one or more subsets comprises one or more SEI messages of the plurality of SEI messages.

Embodiment 237: A method for video encoding, to encode a video into a video data stream, wherein the method comprises encoding pictures of a video into a video data stream in a coding order as a sequence of access units (AU), wherein the method comprises generating the video data stream, such that the video data stream comprises a plurality of access units (AU), a plurality of SEI (supplemental enhancement information) messages and processing order information which defines a processing order of the plurality of SEI messages, wherein the processing order information comprises information on an identifier (po_SEI_id[i]) for each SEI message of two or more SEI messages of the plurality of SEI messages, wherein the identifier of each SEI message of the two or more SEI messages is unique among the two or more SEI messages.

Embodiment 238: A method for video encoding, to encode a video into a video data stream, wherein the method comprises encoding pictures of a video into a video data stream in a coding order as a sequence of access units (AU), wherein the method comprises generating the video data stream, such that the video data stream comprises a plurality of access units (AU), a plurality of SEI (supplemental enhancement information) messages and processing order information which defines a processing order of the plurality of SEI messages, wherein the method comprises generating the video data stream, such that the processing order information comprises an indicator (po_sei_prefix_flag[i]) indicating whether an associated SEI message of the plurality of SEI messages is identified by a portion of bytes or by a portion of bits of the associated SEI message, or whether the plurality of SEI messages is identified by another unique identifier.

Embodiment 239: A method for video encoding, to encode a video into a video data stream, wherein the method comprises encoding pictures of a video into a video data stream in a coding order as a sequence of access units (AU), wherein the method comprises generating the video data stream, such that the video data stream comprises a plurality of access units (AU), a plurality of SEI (supplemental enhancement information) messages and processing order information which defines a processing order of the plurality of SEI messages, wherein the method comprises generating the video data stream, such that the processing order information comprises portion information which portions of the subset of bytes or of the subset of bits are used to identify the SEI message.

Embodiment 240: A method for video encoding, to encode a video into a video data stream,
wherein the method comprises encoding pictures of a video into a video data stream in a coding order as a sequence of access units (AU),
wherein the method comprises generating the video data stream, such that the video data stream comprises a plurality of access units (AU), a plurality of SEI (supplemental enhancement information) messages and processing order information which defines a processing order of the plurality of SEI messages,
wherein the method comprises generating the video data stream, such that the processing order information comprises an identifier identifying another processing order information for referencing the other processing order information (e.g., such that said processing order information inherits said other processing order information, or, e.g., such that said other processing order information inherits said processing order information).

Embodiment 241: A method for video encoding, to encode a video into a video data stream,
wherein the method comprises encoding pictures of a video into a video data stream in a coding order as a sequence of access units (AU),
wherein the method comprises generating the video data stream, such that the video data stream comprises a plurality of access units (AU), a plurality of SEI (supplemental enhancement information) messages and processing order information which defines a processing order of the plurality of SEI messages,
wherein the method comprises generating the video data stream, such that the processing order information assigns the processing order to said SEI message of the plurality of SEI messages
by indicating that the processing order of the SEI message is equal to the processing order of a previously indicated SEI message, or
by indicating that the processing order of the SEI message is one value higher than the processing order of the previously indicated SEI message, or
by indicating that the processing order of the SEI message is equal to the processing order of the previously indicated SEI message and only one of both SEI messages needs to be processed.

Embodiment 242: A method for video encoding, to encode a video into a video data stream,
wherein the method comprises encoding pictures of a video into a video data stream in a coding order as a sequence of access units (AU),
wherein the method comprises generating the video data stream, such that the video data stream comprises a plurality of access units (AU), a plurality of SEI (supplemental enhancement information) messages and processing order information which defines a processing order of the plurality of SEI messages,
wherein the method comprises generating the video data stream, such that the processing order information comprises complexity information on a complexity of processing one or more SEI messages of the plurality of SEI messages.

Embodiment 243: A method for video encoding, to encode a video into a video data stream,
wherein the method comprises encoding pictures of a video into a video data stream in a coding order as a sequence of access units (AU),
wherein the method comprises generating the video data stream, such that the video data stream comprises a plurality of access units (AU), a plurality of SEI (supplemental enhancement information) messages and processing order information which defines a processing order of the plurality of SEI messages,
wherein the method comprises generating the video data stream, such that the processing order information comprises additional processing information indicating if additional processing shall be processed before, between or after processing one or more SEI messages of the plurality of SEI messages or as an alternative to processing at least one of the plurality of SEI messages.

Embodiment 244: A method for video encoding, to encode a video into a video data stream,
wherein the method comprises encoding pictures of a video into a video data stream in a coding order as a sequence of access units (AU),
wherein the method comprises generating the video data stream, such that the video data stream comprises a plurality of access units (AU), a plurality of SEI (supplemental enhancement information) messages and processing order information which defines a processing order of the plurality of SEI messages,
wherein the method comprises generating the video data stream, such that the processing order information comprises information on a group of filters (e.g., NNPFs) or comprises one or more references to the information on the group of filters.

Embodiment 245: A computer program for implementing the method of one of embodiments 227 to 244 when being executed on a computer or signal processor.

Embodiment 246: A non-transitory computer-readable medium comprising the computer program of embodiment 245.

Embodiment 247: A system comprising.
the apparatus for video encoding according to one of embodiments 76 to 150, wherein the apparatus for video encoding is configured to encode the video into the video data stream, and
the apparatus for video decoding according to one of embodiments 1 to 75, wherein the apparatus for video decoding is configured to decode the video data stream.

It is to be understood that in this specification, the signals on lines are sometimes named by the reference numerals for the lines or are sometimes indicated by the reference numerals themselves, which have been attributed to the lines. Therefore, the notation is such that a line having a certain signal is indicating the signal itself. A line can be a physical line in a hardwired implementation. In a computerized implementation, however, a physical line does not exist, but the signal represented by the line is transmitted from one calculation module to the other calculation module.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

An embodiment of the invention provides an apparatus for video decoding, wherein the apparatus is configured to receive a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the apparatus is configured to determine the processing order information to obtain information on the processing order of the plurality of SEI messages, wherein the processing order information comprises information on an identifier (po_SEI_id[i]) for each SEI message of one or more SEI messages of the plurality of SEI messages, wherein the identifier of each SEI message of the one or more SEI messages is unique among the one or more SEI messages, wherein the apparatus is configured to decode a current AU using inter-picture prediction from a referenced reference picture stored in the DPB to acquire a decoded picture, and to insert the decoded picture into the DPB, assign to each reference picture stored in the DPB a classification as one of a short-term reference picture, a long-term reference picture and an unused-for-reference picture, read DPB mode information from the current AU, if the DPB mode information indicates a first mode, remove one or more reference pictures classified as a short-term picture, according to a first-in-first-out (FIFO) strategy, from the DPB, if the DPB mode information indicates a second mode, read memory management control information comprising at least one command in the current AU and process the at least one command so as to change the classification assigned to at least one of the reference pictures stored in the DPB, and use the classification of the reference pictures in the DPB, for managing reference picture removal from the DPB.

An embodiment of the invention provides an apparatus for video decoding according to the immediately preceding embodiment wherein the information on the identifier (po_SEI_id[i]) for each SEI message of the one or more SEI messages depends on a type indicator (po_SEI_type[i]) indicating a type of said SEI message and depends on a unique type-specific identifier indicating an identifier for said SEI message being unique among all SEI messages of a said type.

An embodiment of the invention provides an apparatus for video decoding according to the embodiment preceding the immediately embodiment wherein the video data stream comprises an indication indicating whether or not all of the plurality of SEI messages have a same type.

An embodiment of the invention provides an apparatus for video decoding according to the embodiment preceding the two immediately embodiments wherein the plurality of SEI messages comprises a first (POW, processing order wrapper) SEI message, wherein the first SEI message comprises a second SEI message of the plurality of SEI messages, wherein the apparatus is configured to determine the second SEI message being comprised by the first SEI message.

An embodiment of the invention provides an apparatus for video decoding according to the immediately preceding embodiment wherein the first SEI message comprises an identifier,
wherein the identifier of the first SEI message is the identifier for the second SEI message that identifies the second SEI message being comprised by the first SEI message, wherein the apparatus is configured to obtain the identifier.

An embodiment of the invention provides an apparatus for video decoding according to the embodiment preceding the immediately embodiment wherein the first SEI message wraps or identifies at least two second SEI messages of the plurality of SEI messages, wherein, following a processing of the first SEI message by the apparatus, the apparatus is configured to process the at least two second SEI messages.

An embodiment of the invention provides an apparatus for video decoding according to the embodiment preceding the five immediately embodiments wherein the processing order information comprises the identifier of one of the plurality of SEI messages which comprises further processing order information, wherein the apparatus is configured to determine the further processing order information using the identifier of said one of the plurality of SEI messages.

An embodiment of the invention provides an apparatus for video decoding according to the immediately preceding embodiment wherein the further processing order information comprises importance information (po_sei_importance_flag[i]; po_sei_importance_flag[numSEI]) for an SEI message of the one or more SEI messages of the further processing order information, wherein the importance information for said SEI message indicates whether or not all SEI messages of said further processing order information shall be ignored, if the apparatus for video decoding cannot interpret or understand said SEI message, wherein the apparatus is configured to process the importance information for said SEI message.

An embodiment of the invention provides an apparatus for video decoding according to the embodiment preceding the seven immediately embodiments wherein the processing order information comprises an identifier identifying another processing order information for referencing the other processing order information; wherein the apparatus is configured to determine from the processing order information the identifier identifying the other processing order information.

An embodiment of the invention provides an apparatus for video decoding according to the immediately preceding embodiment wherein a processing order of at least one SEI message of the plurality of SEI messages, which is comprised by or identified by the other processing order information depends on the processing order information which comprises the identifier that identifies said other processing order information, wherein the apparatus is configured to determine the processing order of said at least one SEI message.

An embodiment of the invention provides an apparatus for video decoding according to the embodiment preceding the nine immediately embodiments wherein the processing order information assigns the processing order to said SEI message of the plurality of SEI messages by indicating that the processing order of the SEI message is equal to the processing order of a previously indicated SEI message, or by indicating that the processing order of the SEI message is one value higher than the processing order of the previously indicated SEI message, or by indicating that the processing order of the SEI message is equal to the processing order of the previously indicated SEI message and only one of both SEI messages needs to be processed; wherein the apparatus is configured to determine from the processing order information the processing order of said SEI message.

An embodiment of the invention provides an apparatus for video decoding according to the immediately preceding embodiment wherein the processing order information comprises a processing order indication (po_sei_processing_indication [i]) which indicates which of at least one of the following options applies for the SEI message that the processing order of the SEI message is one value higher than the processing order of the previously indicated SEI message, that the processing order of the SEI message is equal to the processing order of a previously indicated SEI message, and that both SEI messages are not alternatives and shall both be processed, that the processing order of the SEI message is equal to the processing order of a previously indicated SEI message, and that both SEI messages are alternatives and that one of both SEI messages shall be processed, that the processing order of the SEI message is equal to the processing order of a previously indicated SEI message, and that only one of both SEI messages is active for a picture, wherein the apparatus is configured to determine from the processing order information the processing order indication for said SEI message.

An embodiment of the invention provides an apparatus for video decoding according to the embodiment preceding the eleven immediately embodiments wherein the processing order information comprises additional processing information indicating if additional processing shall be processed before, between or after processing one or more SEI messages of the plurality of SEI messages or as an alternative to processing at least one SEI message of the plurality of SEI messages, wherein the apparatus is configured to process additional processing depending on the additional processing information.

An embodiment of the invention provides an apparatus for video decoding according to the immediately preceding embodiment wherein the additional processing information specifies that Video Usability Information needs to be processed before, between or after processing the one or more SEI messages or as an alternative to processing the at least one SEI message, wherein the apparatus is configured to process the Video Usability Information depending on the additional processing information.

An embodiment of the invention provides an apparatus for video decoding according to the embodiment preceding the thirteen immediately embodiments wherein the video data stream comprises a processing order message which comprises the processing order information.

An embodiment of the invention provides an apparatus for video decoding according to the immediately preceding embodiment wherein the processing order message is a processing order supplemental enhancement information (PRO SEI) message.

An embodiment of the invention provides an apparatus for video decoding, wherein the apparatus is configured to receive a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the apparatus is configured to determine the processing order information to obtain information on the processing order of the plurality of SEI messages, wherein the processing order information comprises an indicator (po_sei_prefix_flag[i]) indicating at least one of if an associated SEI message of the plurality of SEI messages is identified by a portion of bytes or by a portion of bits of the associated SEI message, if the plurality of SEI messages is identified by another unique identifier, wherein the apparatus is configured to analyze said indicator, wherein the apparatus is configured to decode a current AU using inter-picture prediction from a referenced reference picture stored in the DPB to acquire a decoded picture, and to insert the decoded picture into the DPB, assign to each reference picture stored in the DPB a classification as one of a short-term reference picture, a long-term reference picture and an unused-for-reference picture, read DPB mode information from the current AU, if the DPB mode information indicates a first mode, remove one or more reference pictures classified as a short-term picture, according to a first-in-first-out (FIFO) strategy, from the DPB, if the DPB mode information indicates a second mode, read memory management control information comprising at least one command in the current AU and process the at least one command so as to change the classification assigned to at least one of the reference pictures stored in the DPB, and use the classification of the reference pictures in the DPB, for managing reference picture removal from the DPB.

An embodiment of the invention provides an apparatus for video decoding according to the immediately preceding embodiment wherein the other unique identifier depends on a type indicator (po_SEI_type[i]) indicating a type of said SEI message and depends on a unique type-specific identifier indicating an identifier for said SEI message being unique among all SEI messages of a said type.

An embodiment of the invention provides an apparatus for video decoding according to the embodiment proceeding the immediately preceding embodiment wherein, if the indicator (po_sei_prefix_flag[i]) is present, the processing order information indicates a number of associated bytes (po_num_prefix_bytes[i]) or associated bits to identify an SEI message among the plurality of SEI messages, wherein the apparatus is configured to analyze the associated bytes or the associated bits of the SEI message to identify the SEI message.

An embodiment of the invention provides an apparatus for video decoding according to the embodiment preceding the two immediately embodiments wherein the processing order information indicates that an SEI message of the plurality of SEI messages is identifier by an identifier and indicates that said SEI message is also identified by a subset of bytes or by a subset of bits of said SEI message.

An embodiment of the invention provides an apparatus for video decoding according to the embodiment preceding the three immediately embodiments wherein a variable indicates if an identification of an SEI message of the plurality of SEI messages is to be conducted using the identifier or is to be conducted using the subset of bytes or the subset of bits, wherein the apparatus is configured to analyze the variable.

An embodiment of the invention provides an apparatus for video decoding, wherein the apparatus is configured to receive a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the apparatus is configured to determine the processing order information to obtain information on the processing order of the plurality of SEI messages, wherein the processing order information comprises subset information indicating a subset of bytes or a subset of bits of an SEI message of the plurality of SEI messages, wherein the processing order information comprises portion information which portions of the subset of bytes or of the subset of bits are used to identify the SEI message, wherein the apparatus is configured to analyze the subset information and the portion information, wherein the apparatus is configured to decode a current AU using inter-picture prediction from a referenced reference picture stored in the DPB to acquire a decoded picture, and to insert the decoded picture into the DPB, assign to each reference picture stored in the DPB a classification as one of a short-term reference picture, a long-term reference picture and an unused-for-reference picture, read DPB mode information from the current AU, if the DPB mode information indicates a first mode, remove one or more reference pictures classified as a short-term picture, according to a first-in-first-out (FIFO) strategy, from the DPB, if the DPB mode information indicates a second mode, read memory management control information comprising at least one command in the current AU and process the at least one command so as to change the classification assigned to at least one of the reference pictures stored in the DPB, and use the classification of the reference pictures in the DPB, for managing reference picture removal from the DPB.

An embodiment of the invention provides an apparatus for video decoding according to the immediately preceding embodiment wherein the processing order information comprises an indication (po_SEI_prefix_complete_matching_flag[i]) indicating whether all of the subset of bytes or the subset of bits of the SEI message is to be used to identify the SEI message or whether only the portion of the subset of bytes or the subset of bits of the SEI message is to be used to identify the SEI message.

An embodiment of the invention provides an apparatus for video decoding according to the embodiment preceding immediately preceding embodiment wherein the portion information comprises a length indication (po_num_prefix_matching_bits [i]) to indicate how many bytes or how many bits of the subset of bytes or of the subset of bits shall be used to identify the SEI message, if the processing order information indicates that only a portion of the subset of bytes or the subset of bits of the SEI is to be used to identify the SEI message, wherein the apparatus is configured to analyze the length indication.

An embodiment of the invention provides an apparatus for video decoding according to the embodiment preceding the two immediately embodiments wherein the portion information comprises a masking pattern to indicate which fields or bytes or bits of the subset of bytes or of the subset of bits shall be used to identify the SEI message, if the processing order information indicates that only a portion of the subset of bytes or the subset of bits of the SEI is to be used to identify the SEI message, wherein the apparatus is configured to analyze masking pattern.

An embodiment of the invention provides an for video decoding, wherein the apparatus is configured to receive a video data stream having pictures of a video encoded thereinto, wherein the video data stream comprises a plurality of access units (AU), a plurality of SEI (supplemental enhancement information) messages and processing order information which defines a processing order of the plurality of SEI messages, wherein the apparatus is configured to determine the processing order information to obtain information on the processing order of the plurality of SEI messages, wherein the video data stream comprises information on a group of filters or comprises one or more references to the information on the group of filters, wherein the apparatus is configured to apply one or more or all of the group of filters using the information on the group of filters, wherein the apparatus is configured to decode a current AU using inter-picture prediction from a referenced reference picture stored in the DPB to acquire a decoded picture, and to insert the decoded picture into the DPB, assign to each reference picture stored in the DPB a classification as one of a short-term reference picture, a long-term reference picture and an unused-for-reference picture, read DPB mode information from the current AU, if the DPB mode information indicates a first mode, remove one or more reference pictures classified as a short-term picture, according to a first-in-first-out (FIFO) strategy, from the DPB, if the DPB mode information indicates a second mode, read memory management control information comprising at least one command in the current AU and process the at least one command so as to change the classification assigned to at least one of the reference pictures stored in the DPB, and use the classification of the reference pictures in the DPB, for managing reference picture removal from the DPB.

An embodiment of the invention provides an apparatus for video decoding according to the immediately preceding embodiment wherein the group of filters is a group of image filters or video filters.

An embodiment of the invention provides an apparatus for video decoding according to the embodiment preceding the immediately preceding embodiment wherein the group of filters is a group of Neural Network Post Filters (NNPFs).

An embodiment of the invention provides an apparatus for video decoding according to the embodiment preceding the two immediately preceding embodiments wherein the processing order information comprises a set of filter parameters, wherein the apparatus is configured to determine one or more filter parameters of the set of filters, and is configured to apply the group of filters using the one or more filter parameters.

An embodiment of the invention provides an apparatus for video decoding according to the immediately preceding embodiment wherein the processing order information comprises for each filter of the group of filters a reference to those filter parameters of the set of filter parameters that apply for said filter.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCE

[1] SEI processing order SEI message in VVC (draft 5), S. McCarthy, M. M. Hannuksela, Y.-K. Wang, JVET-AE2027.

We claim:

1. An apparatus for video decoding,
wherein the apparatus is configured to receive a video data stream having pictures of a video encoded thereinto,
wherein the video data stream comprises a plurality of access units (AU), a plurality of SEI (supplemental enhancement information) messages and processing order information which defines a processing order of the plurality of SEI messages,
wherein the apparatus is configured to determine the processing order information to obtain information on the processing order of the plurality of SEI messages,
wherein the processing order information comprises information on an identifier (po_SEI_id[i]) for each SEI message of one or more SEI messages of the plurality of SEI messages, wherein the identifier of each SEI message of the one or more SEI messages is unique among the one or more SEI messages,
wherein the apparatus is configured to, in decoding the prediction residual data from the current AU using the context adaptive variable length coding mode, use:
a first syntax element indicating a total number of non-zero transform coefficient levels in a transform block,
a second syntax element indicating a total number of zero-valued transform coefficient levels in the transform block,
third syntax elements indicting a number of consecutive transform coefficient levels in a scan order with zero value from a current scan position onwards before a non-zero transform coefficient level is encountered,
one or more fourth syntax elements for each non-zero valued transform coefficient except trailing one transform coefficients, which one or more fourth syntax elements indicate a transform coefficient level value of the respective non-zero valued transform coefficient, and
one or more fifth syntax elements indicating a sign of the trailing one transform coefficient levels.

2. The apparatus for video decoding according to claim 1, wherein the information on the identifier (po_SEI_id[i]) for each SEI message of the one or more SEI messages depends on a type indicator (po_SEI_type[i]) indicating a type of said SEI message and depends on a unique type-specific identifier indicating an identifier for said SEI message being unique among all SEI messages of a said type.

3. The apparatus for video decoding according to claim 1, wherein the video data stream comprises an indication indicating whether or not all of the plurality of SEI messages have a same type.

4. The apparatus for video decoding according to claim 1, wherein the plurality of SEI messages comprises a first (POW, processing order wrapper) SEI message,
wherein the first SEI message comprises a second SEI message of the plurality of SEI messages,
wherein the apparatus is configured to determine the second SEI message being comprised by the first SEI message.

5. The apparatus for video decoding according to claim 4, wherein the first SEI message comprises an identifier,
wherein the identifier of the first SEI message is the identifier for the second SEI message that identifies the second SEI message being comprised by the first SEI message,
wherein the apparatus is configured to obtain the identifier.

6. The apparatus for video decoding according to claim 4, wherein the first SEI message wraps or identifies at least two second SEI messages of the plurality of SEI messages, wherein, following a processing of the first SEI message by the apparatus, the apparatus is configured to process the at least two second SEI messages.

7. The apparatus for video decoding according to claim 1,
wherein the processing order information comprises the identifier of one of the plurality of SEI messages which comprises further processing order information,
wherein the apparatus is configured to determine the further processing order information using the identifier of said one of the plurality of SEI messages.

8. The apparatus for video decoding according to claim 7,
wherein the further processing order information comprises importance information (po_sei_importance_flag[i]; po_sei_importance_flag[numSEI]) for an SEI message of the one or more SEI messages of the further processing order information, wherein the importance information for said SEI message indicates whether or not all SEI messages of said further processing order information shall be ignored, if the apparatus for video decoding cannot interpret or understand said SEI message,
wherein the apparatus is configured to process the importance information for said SEI message.

9. An apparatus for video decoding according to claim 1,
wherein the processing order information comprises an identifier identifying another processing order information for referencing the other processing order information;
wherein the apparatus is configured to determine from the processing order information the identifier identifying the other processing order information.

10. The apparatus for video decoding according to claim 9,
wherein a processing order of at least one SEI message of the plurality of SEI messages, which is comprised by or identified by the other processing order information depends on the processing order information which comprises the identifier that identifies said other processing order information,
wherein the apparatus is configured to determine the processing order of said at least one SEI message.

11. The apparatus for video decoding according to claim 1,
wherein the processing order information assigns the processing order to said SEI message of the plurality of SEI messages
by indicating that the processing order of the SEI message is equal to the processing order of a previously indicated SEI message, or
by indicating that the processing order of the SEI message is one value higher than the processing order of the previously indicated SEI message, or
by indicating that the processing order of the SEI message is equal to the processing order of the previously indicated SEI message and only one of both SEI messages needs to be processed;
wherein the apparatus is configured to determine from the processing order information the processing order of said SEI message.

12. The apparatus for video decoding according to claim 11,
wherein the processing order information comprises a processing order indication (po_sei_processing_indication[i]) which indicates which of at least one of the following options applies for the SEI message:
that the processing order of the SEI message is one value higher than the processing order of the previously indicated SEI message,
that the processing order of the SEI message is equal to the processing order of a previously indicated SEI message, and that both SEI messages are not alternatives and shall both be processed,
that the processing order of the SEI message is equal to the processing order of a previously indicated SEI message, and that both SEI messages are alternatives and that one of both SEI messages shall be processed,
that the processing order of the SEI message is equal to the processing order of a previously indicated SEI message, and that only one of both SEI messages is active for a picture,
wherein the apparatus is configured to determine from the processing order information the processing order indication for said SEI message.

13. The apparatus for video decoding according to claim 1,
wherein the processing order information comprises additional processing information indicating if additional processing shall be processed before, between or after processing one or more SEI messages of the plurality of SEI messages or as an alternative to processing at least one SEI message of the plurality of SEI messages,
wherein the apparatus is configured to process additional processing depending on the additional processing information.

14. The apparatus for video decoding according to claim 13,
wherein the additional processing information specifies that Video Usability Information needs to be processed before, between or after processing the one or more SEI messages or as an alternative to processing the at least one SEI message,
wherein the apparatus is configured to process the Video Usability Information depending on the additional processing information.

15. The apparatus for video decoding according to claim 1,
wherein the video data stream comprises a processing order message which comprises the processing order information.

16. The apparatus for video decoding according to claim 15,
wherein the processing order message is a processing order supplemental enhancement information (PRO SEI) message.

17. An apparatus for video decoding,
wherein the apparatus is configured to receive a video data stream having pictures of a video encoded thereinto,
wherein the video data stream comprises a plurality of access units (AU), a plurality of SEI (supplemental enhancement information) messages and processing order information which defines a processing order of the plurality of SEI messages,
wherein the apparatus is configured to determine the processing order information to obtain information on the processing order of the plurality of SEI messages,
wherein the processing order information comprises an indicator (po_sei_prefix_flag[i]) indicating at least one of:

if an associated SEI message of the plurality of SEI messages is identified by a portion of bytes or by a portion of bits of the associated SEI message,
if the plurality of SEI messages is identified by another unique identifier,
wherein the apparatus is configured to analyze said indicator,
wherein the apparatus is configured to, in decoding the prediction residual data from the current AU using the context adaptive variable length coding mode, use:
a first syntax element indicating a total number of non-zero transform coefficient levels in a transform block,
a second syntax element indicating a total number of zero-valued transform coefficient levels in the transform block,
third syntax elements indicting a number of consecutive transform coefficient levels in a scan order with zero value from a current scan position onwards before a non-zero transform coefficient level is encountered,
one or more fourth syntax elements for each non-zero valued transform coefficient except trailing one transform coefficients, which one or more fourth syntax elements indicate a transform coefficient level value of the respective non-zero valued transform coefficient, and
one or more fifth syntax elements indicating a sign of the trailing one transform coefficient levels.

18. The apparatus for video decoding according to claim 17,
wherein the other unique identifier depends on a type indicator (po_SEI_type[i]) indicating a type of said SEI message and depends on a unique type-specific identifier indicating an identifier for said SEI message being unique among all SEI messages of a said type.

19. The apparatus for video decoding according to claim 17,
wherein, if the indicator (po_sei_prefix_flag[i]) is present, the processing order information indicates a number of associated bytes (po_num_prefix_bytes[i]) or associated bits to identify an SEI message among the plurality of SEI messages,
wherein the apparatus is configured to analyze the associated bytes or the associated bits of the SEI message to identify the SEI message.

20. The apparatus for video decoding according to claim 17,
wherein the processing order information indicates that an SEI message of the plurality of SEI messages is identifier by an identifier and indicates that said SEI message is also identified by a subset of bytes or by a subset of bits of said SEI message.

21. The apparatus for video decoding according to claim 17,
wherein a variable indicates if an identification of an SEI message of the plurality of SEI messages is to be conducted using the identifier or is to be conducted using the subset of bytes or the subset of bits,
wherein the apparatus is configured to analyze the variable.

22. An apparatus for video decoding,
wherein the apparatus is configured to receive a video data stream having pictures of a video encoded thereinto,
wherein the video data stream comprises a plurality of access units (AU), a plurality of SEI (supplemental enhancement information) messages and processing order information which defines a processing order of the plurality of SEI messages,
wherein the apparatus is configured to determine the processing order information to obtain information on the processing order of the plurality of SEI messages,
wherein the processing order information comprises subset information indicating a subset of bytes or a subset of bits of an SEI message of the plurality of SEI messages,
wherein the processing order information comprises portion information which portions of the subset of bytes or of the subset of bits are used to identify the SEI message,
wherein the apparatus is configured to analyze the subset information and the portion information,
wherein the apparatus is configured to, in decoding the prediction residual data from the current AU using the context adaptive variable length coding mode, use:
a first syntax element indicating a total number of non-zero transform coefficient levels in a transform block,
a second syntax element indicating a total number of zero-valued transform coefficient levels in the transform block,
third syntax elements indicting a number of consecutive transform coefficient levels in a scan order with zero value from a current scan position onwards before a non-zero transform coefficient level is encountered,
one or more fourth syntax elements for each non-zero valued transform coefficient except trailing one transform coefficients, which one or more fourth syntax elements indicate a transform coefficient level value of the respective non-zero valued transform coefficient, and
one or more fifth syntax elements indicating a sign of the trailing one transform coefficient levels.

23. The apparatus for video decoding according to claim 22,
wherein the processing order information comprises an indication (po_SEI_prefix_complete_matching_flag[i]) indicating whether all of the subset of bytes or the subset of bits of the SEI message is to be used to identify the SEI message or whether only the portion of the subset of bytes or the subset of bits of the SEI message is to be used to identify the SEI message.

24. The apparatus for video decoding according to claim 22,
wherein the portion information comprises a length indication (po_num_prefix_matching_bits[i]) to indicate how many bytes or how many bits of the subset of bytes or of the subset of bits shall be used to identify the SEI message, if the processing order information indicates that only a portion of the subset of bytes or the subset of bits of the SEI is to be used to identify the SEI message,
wherein the apparatus is configured to analyze the length indication.

25. The apparatus for video decoding according to claim 22,
wherein the portion information comprises a masking pattern to indicate which fields or bytes or bits of the subset of bytes or of the subset of bits shall be used to identify the SEI message, if the processing order information indicates that only a portion of the subset of bytes or the subset of bits of the SEI is to be used to identify the SEI message, wherein the apparatus is configured to analyze masking pattern.

26. An apparatus for video decoding,
wherein the apparatus is configured to receive a video data stream having pictures of a video encoded thereinto,
wherein the video data stream comprises a plurality of access units (AU), a plurality of SEI (supplemental enhancement information) messages and processing order information which defines a processing order of the plurality of SEI messages,
wherein the apparatus is configured to determine the processing order information to obtain information on the processing order of the plurality of SEI messages,
wherein the video data stream comprises information on a group of filters or comprises one or more references to the information on the group of filters,
wherein the apparatus is configured to apply one or more or all of the group of filters using the information on the group of filters,
wherein the apparatus is configured to, in decoding the prediction residual data from the current AU using the context adaptive variable length coding mode, use:
  a first syntax element indicating a total number of non-zero transform coefficient levels in a transform block,
  a second syntax element indicating a total number of zero-valued transform coefficient levels in the transform block,
  third syntax elements indicting a number of consecutive transform coefficient levels in a scan order with zero value from a current scan position onwards before a non-zero transform coefficient level is encountered,
  one or more fourth syntax elements for each non-zero valued transform coefficient except trailing one transform coefficients, which one or more fourth syntax elements indicate a transform coefficient level value of the respective non-zero valued transform coefficient, and
  one or more fifth syntax elements indicating a sign of the trailing one transform coefficient levels.

27. The apparatus for video decoding according to claim 26,
wherein the group of filters is a group of image filters or video filters.

28. The apparatus for video decoding according to claim 26,
wherein the group of filters is a group of Neural Network Post Filters (NNPFs).

29. The apparatus for video decoding according to claim 26,
wherein the processing order information comprises a set of filter parameters,
wherein the apparatus is configured to determine one or more filter parameters of the set of filters, and is configured to apply the group of filters using the one or more filter parameters.

30. The apparatus for video decoding according to claim 29,
wherein the processing order information comprises for each filter of the group of filters a reference to those filter parameters of the set of filter parameters that apply for said filter.

* * * * *